(12) United States Patent
Sleeman et al.

(10) Patent No.: US 11,987,442 B2
(45) Date of Patent: May 21, 2024

(54) SKID MOUNTED STORAGE SYSTEM WITH COLLAPSIBLE SILO FOR FLOWABLE MATERIAL

(71) Applicants: WESTCAP AG CORP., Winkler (CA); Marlea Sleeman, Edmonton (CA)

(72) Inventors: Marlea Sleeman, Edmonton (CA); Lonny James Thiessen, Winkler (CA); Roland Dean Thiessen, Winkler (CA)

(73) Assignee: 543077 Alberta Ltd., Edmonton (CA)

( * ) Notice: Subject to any disclaimer, the term of this patent is extended or adjusted under 35 U.S.C. 154(b) by 679 days.

(21) Appl. No.: 17/257,948

(22) PCT Filed: Jul. 22, 2019

(86) PCT No.: PCT/CA2019/051006
§ 371 (c)(1),
(2) Date: Jan. 5, 2021

(87) PCT Pub. No.: WO2020/019064
PCT Pub. Date: Jan. 30, 2020

(65) Prior Publication Data
US 2021/0309450 A1    Oct. 7, 2021

Related U.S. Application Data

(60) Provisional application No. 62/701,891, filed on Jul. 23, 2018, provisional application No. 62/809,341, filed on Feb. 22, 2019.

(51) Int. Cl.
*B65D 88/52*    (2006.01)
*B65D 88/32*    (2006.01)
(Continued)

(52) U.S. Cl.
CPC ............. *B65D 88/52* (2013.01); *B65D 88/32* (2013.01); *B65G 3/04* (2013.01); *B65G 47/19* (2013.01);
(Continued)

(58) Field of Classification Search
CPC .......... A01F 25/14; A01F 25/00; A01F 25/18; A01F 25/183; A01F 25/186; A01F 25/20;
(Continued)

(56) References Cited

U.S. PATENT DOCUMENTS 1,570,172 A * 1/1926 Murt .................... B65D 88/32
                                                    198/954
2,851,290 A    9/1958 Hanson
(Continued)

FOREIGN PATENT DOCUMENTS

| CA | 2718595 | 4/2012 |
| CA | 2851290 | 5/2013 |

(Continued)

OTHER PUBLICATIONS

US 8,905,137 B2, 12/2014, Zhang et al. (withdrawn)

*Primary Examiner* — Glenn F Myers
(74) *Attorney, Agent, or Firm* — Ryan W. Dupuis; Kyle R. Satterthwaite; Ade & Company Inc.

(57) ABSTRACT

A collapsible storage system for flowable material, for example granular material, includes a base frame and an upper frame which is movable between a collapsed position and a working position spaced above the collapsed position. A plurality of storage silos are supported in a row, each including a hopper discharge cone on the base frame and a collapsible tubular wall assembly connected between the discharge cone and the upper frame. Redundant loading conveyors are provided in communication with the silos across the upper frame for loading and redundant unloading (Continued)

conveyors are provided in communication with the silos across the base frame.

25 Claims, 23 Drawing Sheets

(51) Int. Cl.
*B65G 3/04* (2006.01)
*B65G 47/19* (2006.01)
*B65G 65/32* (2006.01)
*E04H 7/22* (2006.01)
*E04H 7/24* (2006.01)

(52) U.S. Cl.
CPC ............... *B65G 65/32* (2013.01); *E04H 7/22* (2013.01); *E04H 7/24* (2013.01); *B65G 2201/042* (2013.01); *B65G 2814/032* (2013.01)

(58) Field of Classification Search
CPC . A01F 25/2018; B65D 88/1631; B65D 88/26; B65D 88/22; B65D 88/30; B65D 88/52; B65D 88/32; B65D 88/005; B65D 88/16; B65D 88/1612; B65D 88/1618; B65D 88/1625; B65D 88/528; B65D 88/526; B65D 90/14; B65D 90/16; B65D 90/08; B65D 90/024; B65D 90/046; B65D 90/04; B65D 90/041; B65D 2588/54; B65D 2590/043; E04H 7/22; B65G 47/18; B65G 47/19; B65G 3/04; B65G 65/30; B65G 65/32; B65G 2201/042; B65G 2201/04; B65G 2814/032
See application file for complete search history.

(56) References Cited

U.S. PATENT DOCUMENTS

| | | | |
|---|---|---|---|
| 2,860,091 A | | 11/1958 | Rosenberg |
| 2,931,409 A | | 4/1960 | Unthank |
| 2,953,504 A | | 9/1960 | Bole et al. |
| 3,107,712 A | * | 10/1963 | Bergeretto ........... B65D 21/086 |
| | | | 220/666 |
| 3,664,072 A | | 5/1972 | Lieckfeld |
| 3,917,236 A | * | 11/1975 | Hanson ................. B28C 5/34 |
| | | | 366/9 |
| 4,966,310 A | | 10/1990 | Hawkins |
| 5,199,589 A | | 4/1993 | Noble |
| 5,653,354 A | | 8/1997 | Olson |
| 5,897,012 A | | 4/1999 | Sortwell |
| 6,968,946 B2 | | 11/2005 | Shuert |
| 7,114,909 B2 | | 10/2006 | McCrory et al. |
| 7,140,516 B2 | | 11/2006 | Bothor et al. |
| 7,252,309 B2 | | 8/2007 | Soon et al. |
| 7,309,205 B2 | | 12/2007 | McCrory et al. |
| 7,434,721 B2 | | 10/2008 | Feltz |
| 7,997,623 B2 | | 8/2011 | Williams |
| D688,349 S | | 8/2013 | Oren et al. |
| D688,350 S | | 8/2013 | Oren et al. |
| D688,351 S | | 8/2013 | Oren et al. |
| D688,772 S | | 8/2013 | Oren et al. |
| 8,505,780 B2 | | 8/2013 | Oren |
| 8,585,341 B1 | | 11/2013 | Oren et al. |
| 8,616,370 B2 | | 12/2013 | Allegretti et al. |
| 8,651,792 B2 | | 2/2014 | Friesen |
| 8,668,430 B2 | | 3/2014 | Oren et al. |
| 8,820,560 B2 | | 9/2014 | Nolan |
| 8,827,118 B2 | | 9/2014 | Oren |
| 8,887,914 B2 | | 11/2014 | Allegretti et al. |
| 8,926,252 B2 | | 1/2015 | McIver et al. |
| 8,931,996 B2 | | 1/2015 | Friesen et al. |
| 8,944,740 B2 | | 2/2015 | Teichrob et al. |
| 9,016,373 B2 | | 4/2015 | VanDelden |
| 9,016,378 B2 | | 4/2015 | Zhang et al. |
| 9,051,801 B1 | | 6/2015 | Mintz |
| 9,162,603 B2 | | 10/2015 | Oren |
| RE45,788 E | | 11/2015 | Oren et al. |
| 9,248,772 B2 | | 2/2016 | Oren |
| RE45,914 E | | 3/2016 | Oren et al. |
| 9,315,294 B2 | | 4/2016 | Herman et al. |
| 9,358,916 B2 | | 6/2016 | Oren |
| 9,421,899 B2 | | 8/2016 | Oren |
| 9,428,348 B2 | | 8/2016 | Teichrob et al. |
| 9,475,671 B2 | | 10/2016 | Adler et al. |
| 9,499,335 B2 | | 11/2016 | McIver et al. |
| 9,499,348 B2 | | 11/2016 | Teichrob et al. |
| 9,580,238 B2 | | 2/2017 | Friesen et al. |
| D783,772 S | | 4/2017 | Stegemoeller, III et al. |
| 9,617,066 B2 | | 4/2017 | Oren |
| 9,643,789 B2 | | 5/2017 | Teichrob et al. |
| 9,676,554 B2 | * | 6/2017 | Glynn .................... B65G 47/19 |
| 9,682,815 B2 | | 6/2017 | Oren |
| 9,718,610 B2 | | 8/2017 | Oren |
| 9,776,813 B2 | * | 10/2017 | McMahon ........... B65G 63/008 |
| 9,840,371 B2 | | 12/2017 | Ho et al. |
| 9,914,602 B2 | | 3/2018 | Oren |
| 9,932,181 B2 | | 4/2018 | Oren |
| 9,938,093 B2 | | 4/2018 | Sherwood et al. |
| 9,957,108 B2 | | 5/2018 | Ho et al. |
| D819,920 S | | 6/2018 | Friesen |
| 9,993,093 B2 | | 6/2018 | Berry |
| D824,131 S | | 7/2018 | Friesen |
| 10,065,814 B2 | | 9/2018 | Herman et al. |
| D875,266 S | | 2/2020 | Qiu |
| 2004/0074922 A1 | | 4/2004 | Bothor et al. |
| 2005/0230390 A1 | | 10/2005 | Glenn |
| 2008/0179054 A1 | | 7/2008 | McGough et al. |
| 2008/0179324 A1 | | 7/2008 | McGough et al. |
| 2010/0187192 A1 | | 7/2010 | Ness |
| 2011/0024435 A1 | | 2/2011 | MacNabb |
| 2013/0004272 A1 | | 1/2013 | Mintz |
| 2013/0108402 A1 | | 5/2013 | Herman et al. |
| 2013/0142601 A1 | | 6/2013 | McIver et al. |
| 2013/0206415 A1 | | 8/2013 | Sheesley |
| 2013/0206753 A1 | * | 8/2013 | Zhang ................. B65D 90/205 |
| | | | 220/9.2 |
| 2013/0209204 A1 | | 8/2013 | Sheesley |
| 2014/0020892 A1 | | 1/2014 | Oren et al. |
| 2014/0023465 A1 | | 1/2014 | Oren et al. |
| 2014/0041322 A1 | | 2/2014 | Pham et al. |
| 2014/0044508 A1 | | 2/2014 | Luharuka et al. |
| 2014/0083554 A1 | | 3/2014 | Harris |
| 2014/0097182 A1 | | 4/2014 | Sheesley |
| 2014/0109992 A1 | | 4/2014 | Ness |
| 2014/0166647 A1 | | 6/2014 | Sheesley et al. |
| 2014/0169920 A1 | | 6/2014 | Herman et al. |
| 2014/0203046 A1 | | 7/2014 | Allegretti |
| 2014/0246341 A1 | | 9/2014 | Oren |
| 2014/0286716 A1 | | 9/2014 | Cochrum et al. |
| 2014/0299226 A1 | | 10/2014 | Oren et al. |
| 2014/0305769 A1 | | 10/2014 | Eiden et al. |
| 2015/0044003 A1 | | 2/2015 | Pham |
| 2015/0044004 A1 | | 2/2015 | Pham |
| 2015/0086307 A1 | | 3/2015 | Stefan |
| 2015/0166135 A1 | | 6/2015 | Pham |
| 2015/0166260 A1 | | 6/2015 | Pham |
| 2015/0284194 A1 | | 10/2015 | Oren et al. |
| 2015/0375930 A1 | | 12/2015 | Oren et al. |
| 2016/0009489 A1 | | 1/2016 | Lofton et al. |
| 2016/0031658 A1 | | 2/2016 | Oren et al. |
| 2016/0039433 A1 | | 2/2016 | Oren et al. |
| 2016/0130095 A1 | | 5/2016 | Oren et al. |
| 2016/0185522 A1 | | 6/2016 | Herman et al. |
| 2016/0236880 A1 | | 8/2016 | Herman et al. |
| 2016/0244268 A1 | | 8/2016 | Ritter |
| 2016/0251152 A1 | | 9/2016 | Krupa |
| 2016/0264354 A1 | | 9/2016 | Herman et al. |
| 2017/0021318 A1 | | 1/2017 | McIver et al. |
| 2017/0297835 A1 | | 10/2017 | Friesen |
| 2017/0313499 A1 | | 11/2017 | Hughes et al. |
| 2017/0334654 A1 | | 11/2017 | Friesen |
| 2018/0002066 A1 | | 1/2018 | Allegretti et al. |
| 2018/0002120 A1 | | 1/2018 | Alegretti et al. |

(56) References Cited

U.S. PATENT DOCUMENTS

| | | |
|---|---|---|
| 2018/0065814 A1 | 3/2018 | Eiden et al. |
| 2018/0072491 A1 | 3/2018 | D'Agostino et al. |
| 2018/0075547 A1 | 3/2018 | Pere et al. |
| 2018/0201437 A1 | 7/2018 | Surjaatmadja et al. |
| 2018/0257857 A1 | 9/2018 | Fisher et al. |
| 2018/0297503 A1 | 10/2018 | Hughes et al. |
| 2019/0119038 A1* | 4/2019 | Kornelsen ............ B65G 11/146 |

FOREIGN PATENT DOCUMENTS

| | | | |
|---|---|---|---|
| CA | 2777284 | 10/2013 | |
| CA | 2936005 | 8/2015 | |
| CA | 2883423 | 8/2016 | |
| EP | 1690810 | 8/2006 | |
| GB | 1269060 A * | 10/1968 | ........... B65D 88/005 |
| WO | 2010111252 | 9/2010 | |
| WO | 2014028317 | 2/2014 | |
| WO | 2014066514 | 5/2014 | |
| WO | 2016023079 | 2/2016 | |
| WO | 2017027034 | 2/2017 | |
| WO | 2017049264 | 3/2017 | |
| WO | 2017095423 | 6/2017 | |
| WO | 2018052961 | 3/2018 | |
| WO | 2018081902 | 5/2018 | |

* cited by examiner

SKID MOUNTED STORAGE SYSTEM WITH COLLAPSIBLE SILO FOR FLOWABLE MATERIAL

FIELD OF THE INVENTION

The present invention relates to a storage system supported on a portable base frame, for example defining a skid base, which supports one or more storage silos thereon having tubular wall assemblies arranged to be collapsible in height and suitable for containing and discharging flowable materials therefrom, for example granular materials such as proppant used in oilfield fracking operations, liquid materials, or powdered materials.

BACKGROUND

In a hydraulic fracturing operation in the oil and gas industry, a fracturing fluid including granular materials such as sand, known as proppant, is pumped into a well to create and prop open fractures in the ground. Hydraulic fracturing operations are commonly performed in remote locations, require large amounts of granular material to be readily available on demand, and may occur over a limited time period. Accordingly, while it is desirable to have storage facilities readily available at these remote locations which are capable of storing the large amounts of granular material, it is desirable for the storage facilities to be readily portable for transport between different oilfield sites. A similar need for storage facilities which accommodate large volumes of flowable materials which being readily portable also exists in industrial, agricultural and other applications.

SUMMARY OF THE INVENTION

According to a first aspect of the present invention there is provided a collapsible storage system for flowable material comprising:
  a base frame supporting at least one discharge mechanism thereon, said discharge mechanism comprising a rigid wall extending downwardly from an upper perimeter edge to a bottom end locating at least one discharge opening therein;
  an upper frame supported above the base frame such that the upper frame is movable relative to the base frame between a working position spaced above said at least one discharge mechanism and a collapsed position spaced below the working position; and
  a tubular wall assembly in association with said at least one discharge mechanism, said tubular wall assembly extending from a bottom end connected to the upper perimeter edge of the discharge mechanism to a top end connected to the upper frame so as to be extendable in overall height relative to the base frame with the upper frame between said working position and said collapsed position, in which a hollow interior of said tubular wall assembly is in open communication with the discharge mechanism to define a storage silo in the working position thereof.

According to another aspect of the present invention there is provided a kit for a collapsible storage system for use with a tubular wall assembly defining an upright perimeter wall of a collapsible storage silo for storing flowable material, the system comprising:
  a base frame;
  a discharge mechanism mountable on the base frame for discharging of the flowable materials therethrough; and
  an upper frame connectable to the base frame so as to be movable relative to the base frame between a collapsed position and a working position in which the upper frame is raised in elevation relative to the collapsed position;
  the upper frame being adapted to suspend the tubular wall assembly therefrom such that (i) the tubular wall assembly is in open communication with the discharge mechanism to define the collapsible storage silo in the working position of the upper frame, and (ii) the tubular wall assembly is collapsible in overall height relative to the base frame with the upper frame as the upper frame moves from the working position to the collapsed position.

According to a preferred embodiment, the kit further includes the tubular wall assembly.

In a preferred embodiment, the discharge mechanism comprises a hopper in which the rigid wall tapers downwardly and inwardly from the upper perimeter edge to the bottom end which locates said at least one discharge opening therein.

According to another aspect of the invention there is provided a storage system for flowable materials comprising:
  a base frame which is elongate in a longitudinal direction between opposing ends of the assembly along a bottom of the assembly;
  a plurality of hopper cones supported on the base frame in a single row extending in the longitudinal direction of the base frame, each hopper cone comprising a rigid wall tapering downwardly and inwardly from an upper perimeter edge to a bottom end locating at least one discharge opening therein;
  an upper frame extending in the longitudinal direction of the base frame at a location spaced above the base frame;
  a lifting assembly supporting the upper frame above the base frame such that the upper frame is movable relative to the base frame between a working position spaced above the hopper cones and a collapsed position spaced below the working position;
  a tubular wall assembly formed of flexible material in association with each hopper cone, each tubular wall assembly extending from a bottom end connected to the upper perimeter edge of the associated hopper cone and a top end connected to the upper frame so as to be movable with the upper frame between the working position and the collapsed position.

According to a preferred embodiment of the present invention, the combination of rigid hopper cones on a common base frame together with a tubular wall assemblies of flexible material extending upwardly therefrom provides a storage system which can be readily collapsed for ease of transport while also enabling large amounts of flowable material, for example sand, to be readily discharged on demand as required in a hydraulic fracturing well operation.

The storage system may further comprise a plurality of intermediate frames at respective intermediate locations between the hopper cones and the upper frame in the working position, in which each intermediate frame comprises a rigid support hoop extending about a circumference of each tubular wall assembly in which the intermediate frames are connected to the tubular wall assemblies so as to be suspended from the tubular wall assemblies at the respective intermediate locations in the working position. When the tubular wall assembly comprises a continuous liner membrane defining an inner surface of the tubular wall assembly and a second layer of reinforcing material having a higher tensile strength than the liner member surrounding the liner membrane between the top and bottom ends of the tubular wall assembly, preferably the intermediate frames are preferably connected to and suspended on the second layer of reinforcing material.

The storage system may further include two loading conveyor assemblies supported on the upper frame to extend in the longitudinal direction of the base frame alongside one another in which each loading conveyor assembly is in communication with each of the collapsible storage silos. Preferably a discharge passage is supported on the upper frame in association with each tubular wall assembly so as to be centrally located relative to the tubular wall assembly, in which each of the two loading conveyor assemblies communicates with each storage silo through the discharge passage associated with that storage silo.

The storage system may further include two unloading conveyors supported on the base frame to extend in the longitudinal direction of the base frame alongside one another in which each hopper cone is arranged to discharge material onto each of the unloading conveyors. In this instance, each hopper cone preferably includes a conical outer wall and a divider supported within the conical outer wall which is oriented in the longitudinal direction of the base member for defining a pair of laterally spaced apart discharge openings in the conical outer wall on opposing sides of the divider which communicate with the two unloading conveyors respectively.

According to a preferred embodiment, when the hoppers below the respective tubular wall assemblies of the storage system have a downwardly tapering outer wall supported on the base frame by a plurality of support legs at circumferentially spaced apart positions about a perimeter of the hopper, an end pair of the supports legs at each of the opposing sides of the hopper in the longitudinal direction of the base frame may be spaced apart from one another at a greater distance than a distance between remaining ones of the support legs. In this instance, the unloading conveyor assembly extends longitudinally along the base frame between the support legs of each end pair of support legs.

Another independent aspect of the present invention which may be used in combination with any one or more aspects of the invention noted above or below includes the tubular wall assembly being formed of flexible material.

Another independent aspect of the present invention which may be used in combination with any one or more aspects of the invention noted above or below includes the discharge mechanism of said at least one silo comprising a hopper in which the rigid wall tapers downwardly and inwardly from the upper perimeter edge to the bottom end which locates said at least one discharge opening therein.

Another independent aspect of the present invention which may be used in combination with any one or more aspects of the invention noted above or below includes the base frame being elongate in a longitudinal direction between opposing ends of the system along a bottom of the system, wherein said at least one storage silo comprises a plurality of storage silos defining respective hoppers supported on the base frame in a single row extending in the longitudinal direction of the base frame.

Another independent aspect of the present invention which may be used in combination with any one or more aspects of the invention noted above or below includes a plurality of intermediate frames at respective intermediate locations between the discharge mechanism of said at least one storage silo and the upper frame in the working position, each intermediate frame comprising a rigid support hoop extending about a circumference of the tubular wall assembly of said at least one storage silo in which the intermediate frames, and a plurality of telescopic support posts each comprising a plurality of telescoping sections connected between the base frame and the upper frame, each intermediate frame being supported on respective one of the telescoping sections of the telescopic support posts.

Another independent aspect of the present invention which may be used in combination with any one or more aspects of the invention noted above or below includes one of the intermediate frames being suspended by flexible tension members from another one of the intermediate frames thereabove.

Another independent aspect of the present invention which may be used in combination with any one or more aspects of the invention noted above or below includes the tubular wall assembly of said at least one storage silo comprising a continuous liner membrane defining an inner surface of the tubular wall assembly and a second layer of reinforcing material having a higher tensile strength than the liner member surrounding the liner membrane between the top and bottom ends of the tubular wall assembly and wherein the continuous liner member is disconnected from and suspended in floating relationship to the second layer of reinforcing material.

Another independent aspect of the present invention which may be used in combination with any one or more aspects of the invention noted above or below includes a gathering member extending circumferentially about the tubular wall assembly of said at least one storage silo at a gathering location between each adjacent pair of the frames, the gathering member being arranged to constrict a circumference of the tubular wall assembly relative to the rigid support hoops of the intermediate frames. Each gathering member may be an elastic member which is biased so as to be reduced in circumference relative to the rigid support hoops.

Another independent aspect of the present invention which may be used in combination with any one or more aspects of the invention noted above or below includes the tubular wall assembly of said at least one storage silo including a flexible continuous liner membrane defining an inner surface of the tubular wall assembly in which a bottom edge of the liner membrane includes a bead extending about a perimeter of the wall assembly and wherein the discharge mechanism of the silo includes a clamping member selectively clamped against a corresponding surface of the discharge mechanism at the upper perimeter edge of the discharge mechanism such that the line membrane is received therebetween and such that the bead is retained below the clamping member.

Another independent aspect of the present invention which may be used in combination with any one or more aspects of the invention noted above or below includes said at least one storage silo comprising a plurality of silos having respective discharge mechanisms supported on the base frame in a longitudinal row, the storage system further comprising at least one conveyor assembly supported on the upper frame in communication with each of the storage silos.

Another independent aspect of the present invention which may be used in combination with any one or more aspects of the invention noted above or below includes said at least one storage silo comprising a plurality of silos having respective discharge mechanisms supported on the base frame in a longitudinal row, the storage system further comprising two loading conveyor assemblies supported on the upper frame to extend longitudinally alongside one another in which each loading conveyor assembly is in communication with each of the storage silos.

Another independent aspect of the present invention which may be used in combination with any one or more aspects of the invention noted above or below includes a discharge passage supported on the upper frame in association with each tubular wall assembly so as to be centrally located relative to the tubular wall assembly, each of the two loading conveyor assemblies communicating with each storage silo through the discharge passage associated with that storage silo.

Another independent aspect of the present invention which may be used in combination with any one or more aspects of the invention noted above or below includes each storage silo including a pair of loading gates supported on the upper frame through which the two loading conveyor assemblies communicate with that storage silo respectively, each of the loading gates being operable between open and closed positions independently of the other loading gates.

Another independent aspect of the present invention which may be used in combination with any one or more aspects of the invention noted above or below includes said at least one storage silo comprising a plurality of storage silos having respective discharge mechanisms supported on the base frame in a longitudinal row, the storage system further comprising at least one unloading conveyor supported on the base frame in which each discharge mechanism is arranged to discharge material onto said at least one unloading conveyor.

Another independent aspect of the present invention which may be used in combination with any one or more aspects of the invention noted above or below includes said at least one storage silo comprising a plurality of storage silos having respective discharge mechanisms supported on the base frame in a longitudinal row, the storage system further comprising two unloading conveyors supported on the base frame to extend longitudinally alongside one another in which each discharge mechanism is arranged to discharge material onto each of the unloading conveyors.

Another independent aspect of the present invention which may be used in combination with any one or more aspects of the invention noted above or below includes each discharge mechanism including a pair of discharge gates in communication with the two unloading conveyors respectively, each of the discharge gates being operable between open and closed positions independently of the other discharge gates.

Another independent aspect of the present invention which may be used in combination with any one or more aspects of the invention noted above or below includes each discharge mechanism including a downwardly tapering outer wall and a divider supported within the outer wall which is oriented in the longitudinal direction of the base member for defining a pair of laterally spaced apart discharge openings in the outer wall on opposing sides of the divider which communicate with the two unloading conveyors respectively.

Another independent aspect of the present invention which may be used in combination with any one or more aspects of the invention noted above or below includes the discharge mechanism of said at least one storage silo comprising a downwardly tapering outer hopper wall and a divider supported within the outer hopper wall so as to define a pair of spaced apart discharge openings in the outer hopper wall on opposing sides of the divider.

Another independent aspect of the present invention which may be used in combination with any one or more aspects of the invention noted above or below includes said at least one storage silo comprising a plurality of storage silos in which the discharge mechanisms of the storage silos define respective hoppers supported on the base frame in a longitudinal row and wherein each hopper comprises a conical outer wall supported on the base frame by a plurality of support legs at circumferentially spaced apart positions about a perimeter of the hopper cone in which an end pair of the supports legs at each of the opposing sides of the hopper cone in the longitudinal direction of the base frame being spaced apart from one another at a greater distance than a distance between remaining ones of the support legs, and wherein an unloading conveyor extends longitudinally along the base frame between the support legs of each end pair of support legs. At least some of the end pairs of the support legs may further comprise (i) a crossbar connected laterally between the support legs and (ii) a pair of struts connected between the upper perimeter edge and opposing ends of the respective crossbar in a generally triangular relationship with the crossbar.

Another independent aspect of the present invention which may be used in combination with any one or more aspects of the invention noted above or below includes said at least one storage silo comprising a plurality of storage silos supported on the base frame in a longitudinal row wherein the storage system further comprises an unloading conveyor assembly extending along the base frame in the longitudinal direction in communication with each of the storage silos, and wherein the unloading conveyor assembly protrudes longitudinally outward from at least one end of the base frame so as to be arranged for discharging onto the unloading conveyor assembly of the auxiliary system of identical configuration when the storage system and the auxiliary system are positioned longitudinally in series with one another.

Another independent aspect of the present invention which may be used in combination with any one or more aspects of the invention noted above or below includes said at least one storage silo comprising a plurality of storage silos supported on the base frame in a longitudinal row wherein the storage system further comprises an unloading conveyor assembly extending along the base frame in the longitudinal direction in communication with each of the storage silos, and wherein the unloading conveyor assembly comprises a main section spanning the longitudinal row of discharge mechanisms and a discharge section receiving material from the main section and protruding beyond one end of the base frame to an outlet end thereof, the outlet end being adjustable in height relative to the main section.

Another independent aspect of the present invention which may be used in combination with any one or more aspects of the invention noted above or below includes the unloading conveyor assembly comprising two unloading conveyors extending parallel and alongside one another, each unloading conveyor including a main section spanning the longitudinal row of discharge mechanism so as to be arranged to receive material from each of the discharge mechanisms, the main sections discharging onto a common discharge section that protrudes beyond the end of the base frame so as to be adjustable in height relative to the main sections at the outlet end thereof.

Another independent aspect of the present invention which may be used in combination with any one or more aspects of the invention noted above or below includes an unloading conveyor assembly extending along the base frame in communication with said at least one discharge mechanism and a discharge chute at one end of the base frame which receives material from the unloading conveyor assembly, the discharge chute being pivotal about an upright swivel axis relative to the base frame.

Another independent aspect of the present invention which may be used in combination with any one or more aspects of the invention noted above or below includes the discharge chute having a discharge opening for discharging material therefrom which is adjustable in height and angle relative to the base frame.

Another independent aspect of the present invention which may be used in combination with any one or more aspects of the invention noted above or below includes the storage system being used with an auxiliary system which is identical in configuration to the storage system, wherein said at least one storage silo comprises a plurality of storage silos supported on the base frame in a longitudinal row and wherein the storage system further comprises a loading conveyor assembly extending along the upper frame in the longitudinal direction in communication with each of the storage silos, and wherein the loading conveyor assembly protrudes longitudinally outward from at least one end of the base frame such that the loading conveyor assembly is arranged for discharging onto the loading conveyor assembly of the auxiliary system when the storage system and the auxiliary system are positioned longitudinally in series with one another. The loading conveyor assembly may be operative to convey material from an inlet end to an outlet end of the loading conveyor assembly and wherein the loading conveyor assembly protrudes longitudinally outward beyond the end of the base frame at the inlet end of the loading conveyor assembly. The loading conveyor assembly may also be operative to convey material from an inlet end to an outlet end of the loading conveyor assembly and wherein the loading conveyor assembly protrudes longitudinally outward beyond the end of the base frame at the outlet end of the loading conveyor assembly.

Another independent aspect of the present invention which may be used in combination with any one or more aspects of the invention noted above or below includes the conveyor assembly being longitudinally retractable relative to the base frame.

Another independent aspect of the present invention which may be used in combination with any one or more aspects of the invention noted above or below includes the loading conveyor assembly being arranged to be supported on the upper frame to extend at an upward inclination from an inlet end to an outlet end of the loading conveyor assembly.

Another independent aspect of the present invention which may be used in combination with any one or more aspects of the invention noted above or below includes the loading conveyor assembly being supported on the upper frame so as to be adjustable in height at the outlet end relative to the inlet end of the loading conveyor assembly.

Another independent aspect of the present invention which may be used in combination with any one or more aspects of the invention noted above or below includes a first modular assembly including the base frame and a second modular assembly including the upper frame which is readily separable from the first modular assembly in a transport configuration and stackable on the first modular assembly in a working configuration, the upper frame being movable between the working position and the collapsed position thereof while in the working configuration of the second modular assembly coupled to the first modular assembly.

Another independent aspect of the present invention which may be used in combination with any one or more aspects of the invention noted above or below includes said at least one storage silo comprises a plurality of storage silos and wherein the second modular assembly includes a loading conveyor assembly supported on the upper frame in communication with each of the storage silos.

Another independent aspect of the present invention which may be used in combination with any one or more aspects of the invention noted above or below includes the tubular wall assembly of said at least one storage silo is supported on the first modular assembly so as to be separable from the upper frame with the discharge mechanism of said at least one storage silo and wherein the tubular wall assembly of said at least one storage silo is arranged to be readily coupled to the upper frame in the working configuration.

Another independent aspect of the present invention which may be used in combination with any one or more aspects of the invention noted above or below includes the tubular wall assembly of said at least one storage silo being supported on the second modular assembly so as to be separable from the discharge mechanism of said at least one storage silo with the upper frame and wherein the tubular wall assembly of said at least one storage silo is arranged to be readily coupled to the discharge mechanism of said at least one storage silo in the working configuration.

Another independent aspect of the present invention which may be used in combination with any one or more aspects of the invention noted above or below includes a third modular assembly including a loading conveyor assembly which is stackable on the second modular assembly in the working configuration and which is separable from the second modular assembly in the transport configuration, the loading conveyor assembly being in communication with each of the storage silos in the working configuration thereof.

Another independent aspect of the present invention which may be used in combination with any one or more aspects of the invention noted above or below includes a plurality of lifting legs coupled to the second modular assembly which are arranged to lift the second modular assembly to a sufficient height above the ground to receive the first modular assembly therebelow.

Another independent aspect of the present invention which may be used in combination with any one or more aspects of the invention noted above or below includes wheels on the lifting legs which are arranged to support second modular assembly for rolling movement along the ground in a raised position of the lifting legs for displacing the second modular assembly overtop of the first modular assembly when stacking the second modular assembly onto the first modular assembly.

Another independent aspect of the present invention which may be used in combination with any one or more aspects of the invention noted above or below includes the storage system in combination with secondary equipment having a feed hopper and with an auxiliary system identical in configuration to the storage system, both systems including an unloading conveyor assembly on the base frame in communication with said at least one discharge mechanism of the system, the unloading conveyor assemblies of both systems being discharged commonly into the feed hopper of the secondary equipment.

Another independent aspect of the present invention which may be used in combination with any one or more aspects of the invention noted above or below includes an unloading conveyor on the base frame in communication with the discharge mechanism of said at least one storage silo to receive material from the storage silo and having a discharge arranged to discharge the material from the storage system at one end of the base frame, the discharge mechanism of said at least one storage silo having a controllably variable gate opening size such that a discharge rate of material from the storage system can be controlled by varying the gate opening size.

Another independent aspect of the present invention which may be used in combination with any one or more aspects of the invention noted above or below includes the storage system in combination with secondary equipment receiving material from the storage system and having a level sensor for measuring a level of material within the secondary equipment, the storage system including a controller operatively connected to the discharge mechanism of said at least one storage silo which is arranged to vary the gate opening size in response to the level of material measured by the level sensor of the secondary equipment.

Another independent aspect of the present invention which may be used in combination with any one or more aspects of the invention noted above or below includes a controller operatively connected to the discharge mechanism of said at least one storage silo and to a motor of the unloading conveyor assembly so as to be arranged to vary an operating speed of the unloading conveyor assembly in proportion to the gate opening size of the discharge mechanism.

Another independent aspect of the present invention which may be used in combination with any one or more aspects of the invention noted above or below includes a controller operatively connected to the discharge mechanism of said at least one storage silo and to a motor of the unloading conveyor assembly, the controller being arranged to operate the unloading conveyor assembly so as to maintain a constant operating speed of the unloading conveyor assembly regardless of the gate opening size of the mechanism.

Another independent aspect of the present invention which may be used in combination with any one or more aspects of the invention noted above or below includes the tubular wall assembly of said at least one storage silo comprising a flexible, waterproof material.

Another independent aspect of the present invention which may be used in combination with any one or more aspects of the invention noted above or below includes the tubular wall assembly of said at least one storage silo comprising a flexible, heat resistant material.

Another independent aspect of the present invention which may be used in combination with any one or more aspects of the invention noted above or below includes a loading conveyor assembly supported on the upper frame for loading said at least one silo, the loading conveyor assembly comprising at least one belt conveyor having a lower run in open communication the hollow interior of said at least one silo therebelow.

Another independent aspect of the present invention which may be used in combination with any one or more aspects of the invention noted above or below includes a cover member spanning over said at least one storage silo, the loading conveyor assembly being received between the cover member and an open top end of said at least one storage silo.

Another independent aspect of the present invention which may be used in combination with any one or more aspects of the invention noted above or below includes the storage system in combination with an auxiliary storage systems identical in configuration to the collapsible storage system, each storage system having a loading conveyor assembly in communication with an inlet of said at least one storage silo for loading the storage silo and an unloading conveyor assembly in communication with a discharge of said at least one storage silo for unloading the storage silo, wherein the loading conveyor assemblies of the storage systems are connected in series with one another downstream from a common elevating system and wherein the unloading conveyor assemblies of the storage systems are connected in series with one another for feeding a common blender system.

Another independent aspect of the present invention which may be used in combination with any one or more aspects of the invention noted above or below includes the storage system in combination with an auxiliary storage system identical in configuration to the collapsible storage system, each storage system having a loading conveyor assembly in communication with an inlet of said at least one storage silo for loading the storage silo and an unloading conveyor assembly in communication with a discharge of said at least one storage silo for unloading the storage silo, wherein the loading conveyor assemblies of the storage systems are connected in parallel with one another downstream from a common elevating system and wherein the unloading conveyor assemblies of the storage systems are connected in parallel with one another for feeding a common blender system.

Another independent aspect of the present invention which may be used in combination with any one or more aspects of the invention noted above or below includes said at least one storage silo comprising a plurality of storage silos, further comprising an unloading conveyor assembly in communication with a discharge of each storage silo for unloading the storage silos, the unloading conveyor being arranged to receive material being discharged simultaneously from more than one of the storage silos.

Another independent aspect of the present invention which may be used in combination with any one or more aspects of the invention noted above or below includes a plurality of lifting legs coupled to storage system for lifting the base frame to a sufficient height above the ground to receive a transport trailer therebelow for loading the storage system onto a transport trailer. The lifting legs may be arranged to be coupled to only one of the base frame and the upper frame in a transport mode for lifting the base frame onto a transport trailer and are arranged to be coupled between the base frame and the upper frame in a second mode for displacing the upper frame from the collapsed position to the working position.

Another independent aspect of the present invention which may be used in combination with any one or more aspects of the invention noted above or below includes a liquid storage vessel supported within a boundary volume defined by the upper frame and the lower frame and which is not occupied by said at least one storage silo.

Another independent aspect of the present invention which may be used in combination with any one or more aspects of the invention noted above or below includes said at least one storage silo further comprising a level sensor for measuring a level of material within the storage silo an indicator supported externally of the storage silo which operates responsively to the level sensor for indicating the measured level of material.

Another independent aspect of the present invention which may be used in combination with any one or more aspects of the invention noted above or below includes the storage system in combination with a plurality of modular, rigid, structural panels defining rig mats supported on the ground, the base frame being operatively connected to the structural panels such that the panels protrude outwardly beyond a perimeter of the base frame and function as outriggers relative to the storage system.

Another independent aspect of the present invention which may be used in combination with any one or more aspects of the invention noted above or below includes a walkway supported on the upper frame for supporting a user thereon, and a ladder assembly connected between the base frame and the upper frame so as to provide access to the walkway, the ladder assembly being telescopic so as to be extendible in length as the upper frame is displaced between the collapsed position and the working position.

Another independent aspect of the present invention which may be used in combination with any one or more aspects of the invention noted above or below includes the discharge mechanism of said at least one storage silo comprising a downwardly tapering outer hopper wall and a divider supported within the outer hopper wall so as to define a pair of discharge openings in the outer hopper wall on opposing sides of the divider which are spaced apart in a lateral direction from one another, further comprising an unloading conveyor supported on the base frame to receive material from the discharge openings and convey material in a longitudinal direction transversely to the longitudinal direction, the unloading conveyor being supported on the base frame so as to be movable in the lateral direction between a first configuration in alignment with a first one of the pair of discharge openings and a second configuration in alignment with a second one of the pair of discharge openings.

Another independent aspect of the present invention which may be used in combination with any one or more aspects of the invention noted above or below includes a wheel assembly arranged to support the base frame for rolling movement along the ground and a hitching device for connection to a towing vehicle, the hitching device and the wheel assembly being removably coupled to the base frame.

Another independent aspect of the present invention which may be used in combination with any one or more aspects of the invention noted above or below includes a wheel assembly arranged to support the base frame for rolling movement along the ground and a hitching device for connection to a towing vehicle, the hitching device and the wheel assembly being integrally coupled to the base frame.

Another independent aspect of the present invention which may be used in combination with any one or more aspects of the invention noted above or below includes a wheel assembly coupled to the base frame for movement between a working position supporting the base frame for rolling movement along the ground and a stored position raised relative to the base frame in relation to the working position and a hitching device coupled to the base frame for movement between a working position arranged for connection to a towing vehicle and a stored position in which the hitching device is retracted inwardly relative to the boundary of the base frame in relation to the working position.

Another independent aspect of the present invention which may be used in combination with any one or more aspects of the invention noted above or below includes the tubular wall assembly comprising a boundary layer for containment of the flowable material and a reinforcing structure surrounding the boundary layer at longitudinally spaced positions along the tubular wall assembly. The reinforcing structure may be more rigid and may have a greater tensile strength in a circumferential direction than the boundary layer.

Another independent aspect of the present invention which may be used in combination with any one or more aspects of the invention noted above or below includes rigid frame elements coupled between the base frame and the upper frame in the working position thereof, wherein the reinforcing structure is operatively connected to the rigid frame elements for relative sliding movement thereon along as the tubular wall assembly is displaced between the working position and the collapsed position thereof.

Another independent aspect of the present invention which may be used in combination with any one or more aspects of the invention noted above or below includes the tubular wall assembly comprising at least one section formed of a rigid tubular material.

Another independent aspect of the present invention which may be used in combination with any one or more aspects of the invention noted above or below includes the tubular wall assembly comprising at least one section formed of a flexible tubular material.

Another independent aspect of the present invention which may be used in combination with any one or more aspects of the invention noted above or below includes the tubular wall assembly comprising at least one section formed of a rigid tubular material and at least one section formed of a flexible tubular material, in which the sections are connected in series with one another along a height of the tubular wall assembly.

Another independent aspect of the present invention which may be used in combination with any one or more aspects of the invention noted above or below includes a level sensor arranged to sense a level of material in said at least one storage silo, and a controller in operative connection with loading equipment operatively connected to said at least one storage silo for loading flowable material into said at least one storage silo, the controller being arranged to shut off the loading equipment in response to detection of an upper limit threshold by the level sensor.

Another independent aspect of the present invention which may be used in combination with any one or more aspects of the invention noted above or below includes a secondary sensor arranged to sense a level of material at said upper limit threshold in said at least one storage silo in a redundant manner relative to the level sensor, the secondary sensor comprising a mechanical switch which is activated by material in said at least one storage silo reaching the upper limit threshold and the controller being arranged to shut off the loading equipment in response to activation of the mechanical switch.

Another independent aspect of the present invention which may be used in combination with any one or more aspects of the invention noted above or below includes said at least one storage silo comprising a plurality of storage silos in a row extending in a longitudinal direction along the base frame, further comprising an unloading assembly comprising an unloading conveyor in association with each storage silo so as to be in alignment with the discharge opening of the associated storage silo, the unloading conveyors being arranged to discharge material laterally to one side of the base frame transversely to the longitudinal direction.

Another independent aspect of the present invention which may be used in combination with any one or more aspects of the invention noted above or below includes the unloading conveyors being pivotal between a lateral configuration discharging laterally to one side of the base frame and a longitudinal configuration in which the unloading conveyors communicate in series with one another in the longitudinal direction.

Another independent aspect of the present invention which may be used in combination with any one or more aspects of the invention noted above or below includes the storage system being arranged for use with an auxiliary system identical in configuration to the storage system which is positioned with the longitudinal directions of the systems in parallel so as to be laterally spaced apart from one another, the unloading conveyors of the storage system being arranged to discharge in the lateral direction into corresponding ones of the unloading conveyors of the auxiliary system.

Another independent aspect of the present invention which may be used in combination with any one or more aspects of the invention noted above or below includes an operator platform supported on the base frame at a location spaced above the ground so as to be longitudinally slidable along the base frame.

Another independent aspect of the present invention which may be used in combination with any one or more aspects of the invention noted above or below includes an operator platform supported on the base frame at a location spaced above the ground wherein the operator platform is collapsible from a working position arranged to support an operator thereon and a stored position in which the platform is recessed laterally inwardly towards the base frame relative to the working position.

Another independent aspect of the present invention which may be used in combination with any one or more aspects of the invention noted above or below includes the tubular wall assembly of said at least one storage silo comprising a continuous liner membrane defining an inner surface of the tubular wall assembly and a second layer of reinforcing material having a higher tensile strength than the liner member surrounding the liner membrane between the top and bottom ends of the tubular wall assembly, the second layer of reinforcing material comprising a plurality of longitudinal straps spanning a height of the tubular wall assembly at circumferentially spaced apart positions and a plurality of circumferential straps connected to the longitudinal straps at different elevations, each longitudinal strap having a loop formed at a top end thereof that is selectively retained on a releasable pin that is releasably mounted on the upper frame to suspend the second layer from the upper frame.

Another independent aspect of the present invention which may be used in combination with any one or more aspects of the invention noted above or below includes the tubular wall assembly of said at least one storage silo comprising a continuous liner membrane defining an inner surface of the tubular wall assembly and a second layer of reinforcing material having a higher tensile strength than the liner member surrounding the liner membrane between the top and bottom ends of the tubular wall assembly, the second layer of reinforcing material comprising a plurality of longitudinal straps spanning a height of the tubular wall assembly at circumferentially spaced apart positions and a plurality of circumferential straps connected to the longitudinal straps at different elevations, each circumferential strap extending about a circumference of the tubular wall assembly between two opposing ends of the circumferential strap having loops formed therein respectively, the opposing ends of each circumferential strap being selectively coupled together by a releasable mechanical coupling.

Another independent aspect of the present invention which may be used in combination with any one or more aspects of the invention noted above or below includes a plurality of flexible members coupled under tension between the upper frame and the base frame in the working position, in which at least some of the flexible members are supported such that the tension of the flexible members are partly in opposition to one another.

Another independent aspect of the present invention which may be used in combination with any one or more aspects of the invention noted above or below includes the tubular wall assembly and the discharge mechanism of said at least one storage silo being arranged to store granular material therein and discharge the granular material therefrom respectively.

Another independent aspect of the present invention which may be used in combination with any one or more aspects of the invention noted above or below includes a liquid impermeable liner received within the tubular wall assembly and the discharge mechanism of said at least one storage silo such that the storage silo is arranged to store and discharge liquid therein.

Another independent aspect of the present invention which may be used in combination with any one or more aspects of the invention noted above or below includes the liner including an integral divider member such that the liner defines a plurality of separated compartments contained within said at least one silo.

Another independent aspect of the present invention which may be used in combination with any one or more aspects of the invention noted above or below includes said at least one storage silo further comprising an air injector in communication with an interior of the storage silo in proximity to the discharge mechanism such that the storage silo is arranged for storage and dispensing powdered material.

Another independent aspect of the present invention which may be used in combination with any one or more aspects of the invention noted above or below includes a plurality of lifting legs supported on the base frame, the lifting legs being actuable between a retracted configuration above a bottom side of the base frame and a lifting configuration extended below the bottom side of the base frame so as to support the base frame spaced above the ground.

Another independent aspect of the present invention which may be used in combination with any one or more aspects of the invention noted above or below includes said at least one storage silo comprising a plurality of storage silos supported on the base frame in a longitudinal row and wherein the storage system further comprises an unloading conveyor assembly extending along the base frame in the longitudinal direction in communication with each of the storage silos, and wherein the unloading conveyor assembly comprises a main section spanning the longitudinal row of storage silos and a discharge section receiving material from the main section, the discharge section being movable between a working position protruding beyond one end of the base frame to an outlet end thereof and a transport position in which the discharge section is retracted inwardly into the base frame relative to the working position for transport.

Another independent aspect of the present invention which may be used in combination with any one or more aspects of the invention noted above or below includes at least one loading conveyor assembly supported on the upper frame so as to be in communication with said at least one storage silo for discharging into the storage silo through a respective discharge duct, and an auxiliary inlet opening in communication at a top of said at least one silo for discharging material into the storage silo independently of said at least one loading conveyor assembly.

Another independent aspect of the present invention which may be used in combination with any one or more aspects of the invention noted above or below includes at least one loading conveyor assembly supported on the upper frame so as to be in communication with said at least one storage silo for discharging into the storage silo through a respective discharge duct, said at least one loading conveyor assembly including a housing, an auger rotatable within the housing to convey the material along the housing, and an auxiliary inlet opening in a top side of the housing in alignment with the discharge duct of said at least one storage silo therebelow.

Another independent aspect of the present invention which may be used in combination with any one or more aspects of the invention noted above or below includes at least one loading conveyor assembly supported on the upper frame so as to convey the material from an inlet end to an outlet end of the loading conveyor assembly and so as to be adjustable in height at the outlet end relative to the upper frame, said at least one loading conveyor assembly being in communication with said at least one storage silo for discharging into the storage silo through a respective duct of the storage silo, the discharge duct of said at least one storage silo being adjustable with adjustment of the height at the outlet end of the at least one loading conveyor assembly relative to the upper frame.

Another independent aspect of the present invention which may be used in combination with any one or more aspects of the invention noted above or below includes at least one conveyor supported on one of the upper frame or the base frame in communication with said at least one storage silo for loading the material into the storage silo or discharging the material from the storage silo, said at least one conveyor including a housing and an auger that is supported for rotation relative to the housing at one or more intermediate locations along the auger by a bearing assembly comprising:
 a hanger bracket supported on the housing,
 a bearing member supported on the hanger bracket such that the hanger bracket fully surrounds the bearing member and the bearing member rotatably supports a shaft of the auger extending therethrough,
 a pair of casings mounted on the shaft in an axially overlapping arrangement with opposing ends of the bushing member, and
 a sealing member at an interface between each casing and the hanger bracket for enclosing the bearing member within the casings and the hanger bracket.

Another independent aspect of the present invention which may be used in combination with any one or more aspects of the invention noted above or below includes at least one conveyor supported on one of the upper frame or the base frame in communication with said at least one storage silo for loading the material into the storage silo or discharging the material from the storage silo, said at least one conveyor including a housing and an auger that is supported for rotation relative to the housing at one or more intermediate locations along the auger by a bearing assembly comprising:
 a hanger bracket supported on the housing,
 a bearing member supported on the hanger bracket such that the bearing member rotatably supports a shaft of the auger extending therethrough, and
 a deflection member supported on the shaft to rotate with the shaft at an upstream location relative to the bearing member,
 the deflection member being oriented to deflect conveyed material away from the bearing member.

Another independent aspect of the present invention which may be used in combination with any one or more aspects of the invention noted above or below includes at least one conveyor supported on one of the upper frame or the base frame in communication with said at least one storage silo for loading the material into the storage silo or discharging the material from the storage silo, said at least one conveyor including a housing and an auger that is supported for rotation relative to the housing at one or more intermediate locations along the auger by a bearing assembly comprising:
 a hanger bracket supported on the housing,
 a bearing member supported on the hanger bracket such that the bearing member rotatably supports a shaft of the auger extending therethrough, and
 a deflection member supported in fixed relation to the housing of the conveyor so as to surround the shaft at an upstream location relative to the bearing member so as to deflect conveyed material away from the bearing member.

Another independent aspect of the present invention which may be used in combination with any one or more aspects of the invention noted above or below includes a plurality of intermediate frames at respective intermediate locations between the discharge mechanism of said at least one storage silo and the upper frame in the working position, each intermediate frame comprising a rigid support hoop extending about a circumference of the tubular wall assembly of said at least one storage silo in which the intermediate frames are connected to the tubular wall assembly of said at least one storage silo so as to be suspended therefrom at the respective intermediate locations in the working position.

Another independent aspect of the present invention which may be used in combination with any one or more aspects of the invention noted above or below includes a plurality of telescopic support posts connected between the base frame and the upper frame and a plurality of intermediate frames at respective intermediate locations between the discharge mechanism of said at least one storage silo and the upper frame in the working position, each intermediate frame comprising a rigid support hoop extending about a circumference of the tubular wall assembly of said at least one storage silo in which the intermediate frames and each intermediate frame being vertically slidable relative to the telescopic support posts while being constrained relative to the base frame in the longitudinal direction and in a lateral direction perpendicularly to the longitudinal direction by the support posts.

Another independent aspect of the present invention which may be used in combination with any one or more aspects of the invention noted above or below includes each intermediate frame including a plurality of channels formed thereon which receive respective ones of the telescopic support posts therein for relative vertical sliding movement.

Another independent aspect of the present invention which may be used in combination with any one or more aspects of the invention noted above or below includes the tubular wall assembly of said at least one storage silo comprising a continuous liner membrane defining an inner surface of the tubular wall assembly and a second layer of reinforcing material having a higher tensile strength than the liner member surrounding the liner membrane between the top and bottom ends of the tubular wall assembly and wherein the intermediate frames are connected to and suspended on the second layer of reinforcing material.

According to another independent aspect of the present invention there is provided a collapsible storage system for flowable material comprising:
  a base frame;
  an upper frame supported above the base frame such that the upper frame is movable relative to the base frame between a working position and a collapsed position spaced below the working position; and
  at least one storage silo supported on the base frame comprising a tubular walls assembly formed of flexible material extending from a bottom end connected to a bottom discharge assembly on the base frame to a top end connected to the upper frame so as to be extendable in overall height relative to the base frame with the upper frame between said working position and said collapsed position, in which a hollow interior of said tubular wall assembly is in open communication with the bottom discharge assembly in the working position thereof; and
  a plurality of intermediate frames at respective intermediate locations between the base frame and the upper frame in the working position;
  each intermediate frame comprising a rigid support hoop extending about a circumference of the tubular wall assembly of said at least one storage silo;
  each intermediate frame being connected to the tubular wall assembly of said at least one storage silo so as to be fully suspended from the tubular wall assembly of said at least one storage silo at the respective intermediate locations in the working position.

According to another independent aspect of the present invention there is provided a collapsible storage system for flowable material comprising:
  a base frame;
  an upper frame supported above the base frame such that the upper frame is movable relative to the base frame between a working position and a collapsed position spaced below the working position; and
  at least one storage silo supported on the base frame comprising a tubular wall assembly formed of flexible material extending from a bottom end connected to a bottom discharge assembly on the base frame to a top end connected to the upper frame so as to be extendable in overall height relative to the base frame with the upper frame between said working position and said collapsed position, in which a hollow interior of said tubular wall assembly is in open communication with the bottom discharge assembly in the working position thereof; and
  at least one gathering member extending circumferentially about the tubular wall assembly at a respective gathering location between the base frame and the upper frame;
  said at least one gathering member being arranged to constrict a circumference of the tubular wall assembly relative to an upper perimeter edge of the bottom discharge assembly.

According to another independent aspect of the present invention there is provided a collapsible storage system for flowable material comprising:
  a base frame which is elongate in a longitudinal direction;
  a plurality of storage silos supported on the base frame in a row extending in the longitudinal direction, each silo comprising a tubular wall assembly extending upwardly from a bottom end connected to a bottom discharge assembly on the base frame to a top end spaced above the bottom discharge assembly; and
  two loading conveyor assemblies supported above the silos to extend in the longitudinal direction alongside one another in which each loading conveyor assembly is in communication with each of the storage silos.

According to another independent aspect of the present invention there is provided a storage system for flowable material comprising:
  a base frame which is elongate in a longitudinal direction;
  a plurality of storage silos supported on the base frame in a row extending in the longitudinal direction, each silo comprising a tubular wall assembly extending upwardly from a bottom end connected to a bottom discharge assembly on the base frame to a top end spaced above the bottom discharge assembly; and
  two unloading conveyors supported on the base frame to extend alongside one another in which each bottom discharge assembly is arranged to discharge material onto each of the unloading conveyors.

According to another independent aspect of the present invention there is provided a storage system for flowable material comprising:
  a base frame which is elongate in a longitudinal direction;
  a plurality of storage silos supported on the base frame, each comprising a tubular wall assembly extending upwardly from a bottom end connected to a bottom discharge hopper on the base frame to a top end spaced above the base frame;
  each hopper having a downwardly tapering outer wall supported on the base frame by a plurality of support legs at circumferentially spaced apart positions about a perimeter of the hopper in which an end pair of the supports legs at each of the opposing sides of the hopper in the longitudinal direction of the base frame are spaced apart from one another at a greater distance than a distance between remaining ones of the support legs.

BRIEF DESCRIPTION OF THE DRAWINGS

Various embodiments of the invention will now be described in conjunction with the accompanying drawings in which.

In the drawings like characters of reference indicate corresponding parts in the different figures.

DETAILED DESCRIPTION

Figure 1:
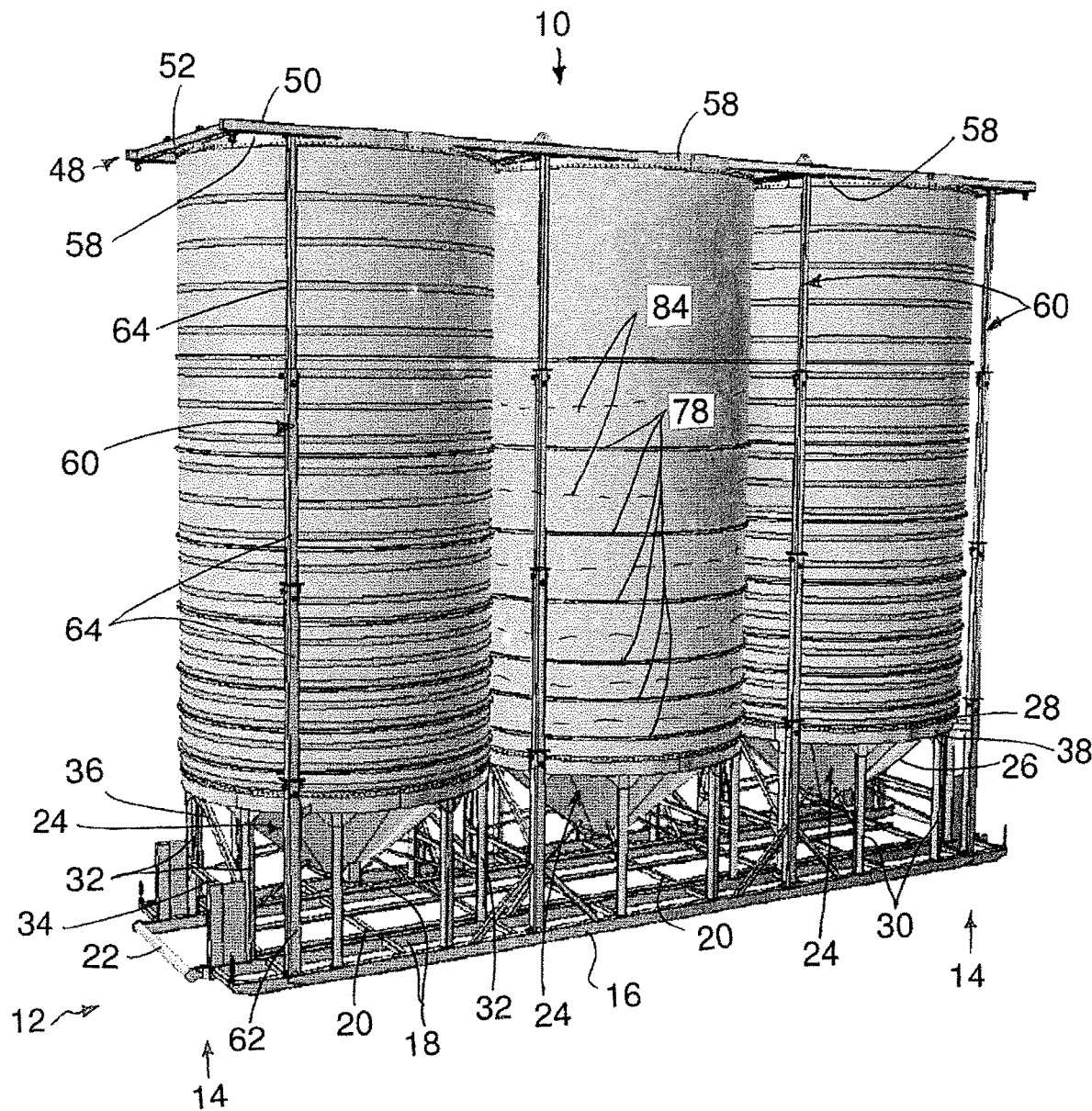
FIG. 1 is a perspective view of the storage system in a working position in which loading and unloading conveyors have been removed for illustrative purposes.
Figure 2:
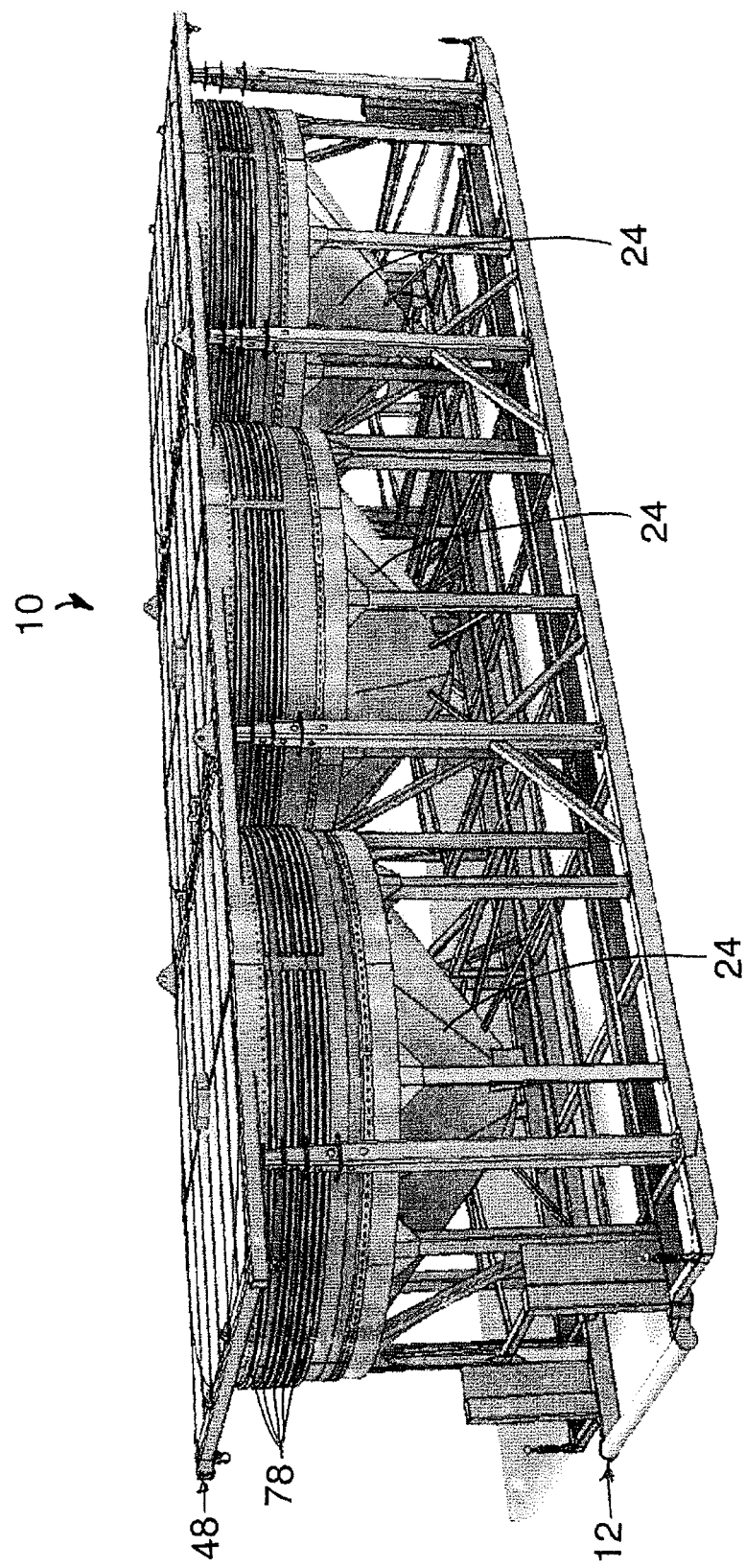
FIG. 2 is a perspective view of the storage system in a collapsed position.

Referring to the accompanying figures there is illustrated a storage system generally indicated by reference numeral 10. The system 10 is suited for storage of flowable materials such as granular material, powdered material, or liquid material, but is most suited for storage and discharging of granular material, for example sand used as proppant in an oilfield hydraulic fracturing operation. Operation of the system is generally described below in relation to granular materials, however, most of the functionality can be extended to other types of flowable materials, for example powdered materials in particular. The system can be readily collapsed for transport and extended back into a working position at a new oilfield location. The system 10 includes a silo system 500 and a conveyor system 510, which may be described in connection with each other as the overall system, but it should be appreciated that each of those components of the system 10 can be utilized independently, such as with existing technologies to achieve the overall function of the system 10. The elevator system 100 can also be used together with the silo system 500 and conveyor system 510 of the storage system 10 or independently.

The system includes a base frame 12 defining a skid base at the bottom of the storage system which is elongate in a longitudinal direction between two opposing ends 14 of the system. The base frame includes two outer beams 16 which are spaced apart at laterally opposing sides of the frame to extend substantially the full length of the frame between the opposing ends 14. Two intermediate beams 18 are provided at intermediate locations between the two outer beams to similarly extend the full length in the longitudinal direction between the opposing ends. A plurality of crossbars 20 lie approximately in a common plane with the beams to extend laterally between the beams. A main crossbar 22 is connected between the two intermediate beams 18 at a location protruding longitudinally outward beyond the remainder of the base frame at both ends such that the skid base defined by the base frame is well suited for handling with skid handling equipment, for example by connection of the main crossbar 22 to the winch of a flatbed winch truck for portability.

The base frame 12 further includes a set of three hopper cones 24 supported thereon in a single row extending in the longitudinal direction. The hopper cones are located in close proximity to one another such that the overall length of the base frame corresponds approximately to three times the diameter of any one of the hopper cones. The overall width of the base frame is very near to the diameter of the hopper cones.

Each hopper cone 24 defines the bottom of a collapsible storage silo as described in further detail below. More particularly each hopper cone comprises an outer conical wall 26 tapering downwardly and inwardly from an upper perimeter edge 28 to a central discharge area at a location spaced above the base frame 12 at the bottom of the system.

A plurality of support legs 30 are connected vertically between the base frame and the upper perimeter edge 28 of each hopper cone at circumferentially spaced positions about the hopper cone. The support legs of each hopper cone include two support legs at each of the laterally opposing sides of the hopper cone which are mounted at longitudinally spaced locations on a respective one of the outer beams 16 and two support legs forming an end pair 32 at longitudinally opposing sides of the hopper cone. The support legs of each end pair 32 are joined at the bottom ends to respective ones of the intermediate beams 18 so as to be laterally spaced apart from one another.

Referring primarily to the first embodiment of FIGS. 1 through 13, within each hopper cone 24 the support legs 30 defining each end pair 32 may be spaced apart circumferentially from one another by a distance which is greater than the circumferential distance between any other remaining pairs of support legs. To maintain adequate structural support while accommodating a larger gap between the support legs of each end pair 32, an additional crossbar 34 is provided which is connected laterally between the two legs of the end pair at a location spaced upwardly from the base frame while remaining closer to the base frame than the upper perimeter edge of the hopper cone. Two struts 36 are also connected to extend upwardly and inwardly towards one another from opposing ends of each crossbar 34 to be joined to the upper perimeter edge 28 of the hopper cone. Although the upper ends of the struts are spaced apart slightly, they are joined by a suitable gusset such that the two struts 36 and the crossbar 34 form a generally triangular structure providing structural support between the two legs of each end pair 32.

Each hopper cone further includes a cone rim 34 comprising a generally cylindrical sleeve joined across the outer surface of each leg at the top end thereof and joined to the upper perimeter edge of the conical wall 26. The cone rim 38 serves as the connection to the upper portions of the storage silos described in further detail below.

Each hopper cone further includes a divider member 40 mounted within the interior of the outer conical wall 26 to direct flow of granular material within the storage silo into a pair of laterally spaced apart discharge openings 42. More particularly the divider member includes an upper ridge 44 extending in the longitudinal direction of the base frame at a location spaced above the bottom end of the hopper cone to span across the full diameter of the hopper cone at the location of the divider member. The divider member further includes two ramped surfaces 46 extending downwardly and laterally outwardly from the upper ridge 44 to laterally opposing locations on the conical wall. The discharge openings 42 are formed at the intersection of the ramped surfaces 46 with diametrically opposing locations on the conical outer wall.

The system 10 further includes an upper frame 48 extending in a longitudinal direction along the full length of the storage system and a laterally across the full width of the storage system as defined by the base frame 12. The upper frame 48 includes two longitudinal beams 50 extending longitudinally along opposing sides of the upper frame and a plurality of crossbars 52 connected laterally between the beams at the opposing ends of the frame and at intermediate locations along the frame between adjacent ones of the silos. Suitable paneling material 54 is supported to span across the upper frame for enclosing the top ends of the silos.

The upper frame also supports a central inlet member 56 associated with each silo in which the inlet member comprises a collar extending through the roof paneling to extend partly downwardly into the silo a short distance below the roof paneling. The inlet member receives all granular materials loaded into the silo for ensuring that each silo is loaded from a central location.

The upper frame 48 is movable relative to the hopper cones on the base frame between a working position defining the maximum overall height of the storage system at a location spaced above the hopper cones and a collapsed position in which the upper frame is reduced in height relative to the working position so as to be spaced below the location of the upper frame in the working position while remaining above the upper perimeter edge of the hopper cones in closer proximity thereto.

The upper frame also supports an upper rim 58 thereon in association with each silo. The upper rim is a sleeve or collar having a diameter approximately equal to the upper perimeter edge of the hopper cones while being supported on the upper frame concentrically with the respective hopper cone therebelow. The upper rim 58 defines the upper perimeter edge of the resulting silo structure with which it is associated.

The upper frame is supported relative to the base frame by a plurality of support posts 60 which are telescopic in configuration. Each post includes a base sleeve 62 spanning substantially a full height of the cones from the base frame to a location slightly above the upper perimeter edge of the hopper cones. A series of multiple (for example, 3, 4, or 5) additional sleeves 64 are telescopically received within each base sleeve to define a respective post in which the sleeves can be telescopically retracted to an overall height in the collapsed position which is in close proximity to the height of the hopper cones and telescopically extended to an overall height in the working position which is approximately four times the height of the hopper cones.

The support posts 60 are located at the four corners of the base frame, and at two longitudinally spaced positions along both of the laterally opposing sides of the base frame so that a support post is provided along each side of the base frame between each adjacent pair of the hopper cones.

A series of transverse apertures are provided in the various sleeves forming each post for accepting lock pins 66 through cooperating transverse apertures to selectively retain the posts in the working position. Removal of the pins allows the posts to be retracted into the collapsed position.

The upper frame may be raised into the working position by a pair of multistage hydraulic piston cylinder actuators (not shown) mounted at the longitudinally opposing ends of the base frame for connection between the base frame and the upper frame. Hydraulically actuating the actuators allows the upper frame to be lifted relative to the base frame from the collapsed position to the working position. The pair of actuators together with the support posts 60 collectively define a lifting assembly which works together to guide the movement of the upper frame relative to the lower frame between the collapsed and working positions.

The upper portion of each silo above the respective hopper cone 24 is defined by a tubular wall assembly 68 connected between the cone rim 38 at the upper edge of the hopper cone and the upper rim 58 on the upper frame 48. The tubular wall assembly comprises flexible material defining a generally cylindrical boundary wall of the silo between the hopper cone and the upper frame so as to be movable with the upper frame relative to the base frame between the working position and the collapsed position.

The tubular wall assembly includes a liner membrane 70 which forms a continuous cylindrical membrane between the cone rim and the upper rim on the upper frame and which defines the interior surface of the storage silo. The liner membrane is joined to the cone rim using a clamping member 72 formed in arcuate sections arranged to be clamped against the exterior of the cone rim about the full circumference thereof. More particularly a bottom end portion of the membrane 70 passes through the space between the clamping members 72 and the cone rim, is wrapped about the circumference of a perimeter bead 74 and is then folded back against the outer side of the membrane so that two layers of the membrane are frictionally retained between the clamping member 72 and the cone rim. The perimeter bead 74 is trapped below the clamping member to retain the liner member securely relative to the cone rim.

A similar configuration may be provided at the top edge of the liner membrane for clamping against the outer perimeter of the upper rim on the upper frame using a corresponding upper perimeter bead.

The tubular wall assembly also includes a second reinforcing layer 76 having a tensile strength which is equal to or greater than the tensile strength of the liner membrane. In one example, the second layer 76 is a grid formed of vertically extending and circumferentially extending bands of reinforcing material having a tensile strength which is greater than the tensile strength of the liner membrane. The second layer 76 forms a tubular sleeve having a diameter approximately equal to the diameter of the liner membrane and the corresponding rims of the silo structure. The second layer 76 is positioned externally of the liner membrane to somewhat isolate the liner membrane from tensile forces in a circumferential direction. The second layer 76 spans the outer side of the liner while being only coupled to the liner at the top and bottom edges thereof by clamping the top and bottom edges of the second layer 76 into the clamping structures at the upper rim on the upper frame and the cone rim on the hopper cones together with the corresponding top and bottom edges of the liner membrane. The liner membrane remains unconnected with the grid in floating relationship with the grid along the full height thereof between upper frame and the cone rim on the hopper cone.

A plurality of intermediate frames 78 are provided at intermediate locations at spaced apart elevations which are generally evenly spaced in the vertical direction between the upper rim of the upper frame and the cone rim on the hopper cone of the silo structures in the working position. Each intermediate frame 78 includes a plurality of rigid frame members lying in a generally common plane oriented parallel to the upper frame and perpendicularly to the vertical axes of the silos. More particularly each intermediate frame 78 comprises a rigid hoop 80 associated with each silo having an interior diameter corresponding approximately to the outer diameter of the tubular wall assembly. The rigid hoops 80 associated with the three silos within each respective intermediate frame are rigidly interconnected by suitable struts connected between adjacent hoops in the longitudinal direction at laterally opposing sides of the frame member at a spacing corresponding approximately to the lateral spacing of the base frame and the upper frame.

The rigid hoops are fastened to the second layer 76 of each silo at each respective intermediate location along the height of the silo in the working position such that the weight of the intermediate frame is carried fully by the grid which suspends the intermediate frame from the upper frame in the working position. As the storage system is collapsed towards the collapsed position, the flexible second layer 76 spanning between the intermediate frames is folded into the interior of the silo structure so that (i) the lowermost intermediate frame can be stacked upon the cone rims 38 of the hopper cones, (ii) subsequent intermediate frames are stacked upon one another, and (iii) the upper frame is stacked in turn on the intermediate frames. The upper frame is thus spaced above the hopper cones in the collapsed position by the overall stacked height of the intermediate frames therebetween.

To assist in maintaining concentric alignment with the hoops of the intermediate frames with the respective rims on the upper frame and of the hopper cones respectively, the intermediate frames are provided with channels 82 formed thereon which are aligned with and at least partially receives respective ones of the support posts 60 therein. The intermediate frames are thus vertically slidable along the posts. In the illustrated embodiment, each channel is a U-shaped bracket having an open side facing externally laterally outward for surrounding the inner face and the longitudinally opposing sides of the respective post received therein. The interaction between the channels 82 and the posts does not inhibit the vertical movement of the intermediate frame between the collapsed position and the working position but restricts the intermediate frames in the longitudinal direction and in the lateral direction relative to the posts which in turn positions the intermediate frames laterally and longitudinally relative to the upper frame above and the lower frame below.

In alternative embodiments, the hanging rigid support hoops can be supported by additional scissor lifts coupled between the intermediate frames to support the hoops.

To assist in positioning the flexible material of the tubular wall assembly as the silos are retracted toward the collapsed position, a suitable gathering member 84 extends circumferentially about the tubular wall assembly at an intermediate location which is evenly spaced between a respective adjacent pair of frames, that is (i) between two intermediate frames, (ii) between the uppermost intermediate frame and the upper frame, or (iii) between the lowermost intermediate frame and the cone rim of the hopper cones respectively. More particularly the gathering member comprises an elastic member which can be stretched to a circumference corresponding to the circumference of the tubular wall assembly and the rims of the silo; however, the elastic member is biased to a reduced circumference which is less than the circumference of the hoops. The biasing force is such that the loading of granular material into the silo in the working position readily overcomes the biasing force so that the silo can be filled to maximum circumference, however when the granular material is emptied from the silo and the silo is displaced towards the collapsed position, the biasing force is sufficient to draw the flexible material of the tubular wall assembly inwardly to a reduced diameter at a central location between each adjacent pair of frames so that the flexible material is not pinched between the stacked frames in the collapsed position.

The hopper cones 24 on the base frame and the collapsible frame structure for extending and collapsing the tubular wall assemblies to form the respective storage silos collectively define the silo system 500 of the storage unit 10.

The conveyor system 510 above the silo system includes a loading conveyor assembly provided on the upper frame to assist in loading granular material into the silos. More particularly the loading conveyor assembly comprises two upper conveyors 86 comprising an auger rotatable within an auger tube in which the two upper conveyors 86 span alongside one another substantially the full length of the storage system at laterally opposing sides of the central inlet members 56. A branch tube 88 connects each conveyor to each inlet member 56 of each silo. Accordingly, each silo has an inlet member 56 which receives material from either one of two branched tubes 88 communicating downwardly and laterally inwardly to the common inlet member from the two upper conveyors 86 respectively. A suitable inlet gate 90 is connected in series within each branch tube 88 in which all of the inlet gates are operable independently of one another between respective fully open and fully closed positions thereof. In this manner, the loading conveyor assembly can be controlled by an operator to load granular materials from either one of the upper conveyors 86 into any one of the selected silos.

A suitable upright conveyor assembly (not shown) may be provided at one end of the storage system in the form of an individual conveyor communicating upwardly from a respective loading hopper at ground level to the inlet end of each upper conveyor 86. Granular materials can thus be discharged into the loading hopper of both upright conveyors for conveying the granular material upwardly to the upper conveyors on the upper frame for subsequent loading into selected ones of the silos.

The storage system further includes a discharge conveyor assembly supported on the base frame below the hopper cones. More particularly the discharge conveyor assembly comprises two lower belt conveyors 92 each comprising an endless belt carried on rollers in position such that the upper run of the conveyors are laterally adjacent one another to span the full length of the base frame within the space provided between the two support legs 32 of each end pair of support legs of the hopper cones. Each lower belt conveyor 92 is aligned with only one of the two discharge openings 42 of each hopper. A suitable discharge gate 94 is provided on each discharge opening of each silo in which the discharge gates are operable independently of one another between respective open and closed positions.

The discharge conveyor assembly may be arranged such that the lower belt conveyors 92 protrude longitudinally outward beyond one end of the base frame corresponding to the outlet end of the discharge conveyor which is raised in elevation relative to the opposing inlet end. In this manner, when two storage systems are mounted longitudinally end-to-end with one another, the discharge conveyor of one of the storage systems is suited to discharge directly onto the inlet end of the discharge conveyor of the next adjacent storage system to convey material discharged from the silos continuously in series across more than one storage system in a row.

Alternatively, the discharge end of the conveyor assembly may simply discharge into the inlet hopper or the loading conveyor assembly of other material handling equipment.

The storage system may further be provided with a platform 96 supported on the top side of the upper frame to define a walkway capable of supporting operators thereon along the full length of the system. In this instance a suitable ladder structure (not shown) may be connected between the walkway 96 and the base frame in which the ladder is formed in telescoping sections to enable the ladder to vary in height together with the movement of the upper frame relative to the base frame between the working position and the collapsed position.

The storage system as described can be readily lowered into the collapsed position and then loaded onto a suitable truck for transport on highways as a result of the skid base formed by the base frame. Once transported to an oilfield site, the storage system can be unloaded directly onto a suitable ground surface which provides a stable foundation for the storage system. The hydraulic actuators at opposing ends of the frame permit lifting of the upper frame relative to the base frame from the collapsed position to the working position. Alternatively, a crane structure or other suitable lifting structure may be coupled to the upper frame for lifting the upper frame relative to the base frame. Once raised, pins are used to lock the support posts 60 in the working position. Operating the loading conveyor assembly permits granular material, for example sand used as proppant in hydraulic fracturing operations to be loaded into the silo structures. Operation of the discharge conveyor assembly and the discharge gates 94 permits the granular material to be dispensed on demand from one or more silos as required. The dual upper conveyors 86 and the dual lower belt conveyors 92 provide redundancy within the loading and discharge systems to ensure continued operation in the event of failure of any individual conveyor.

Figure 3:
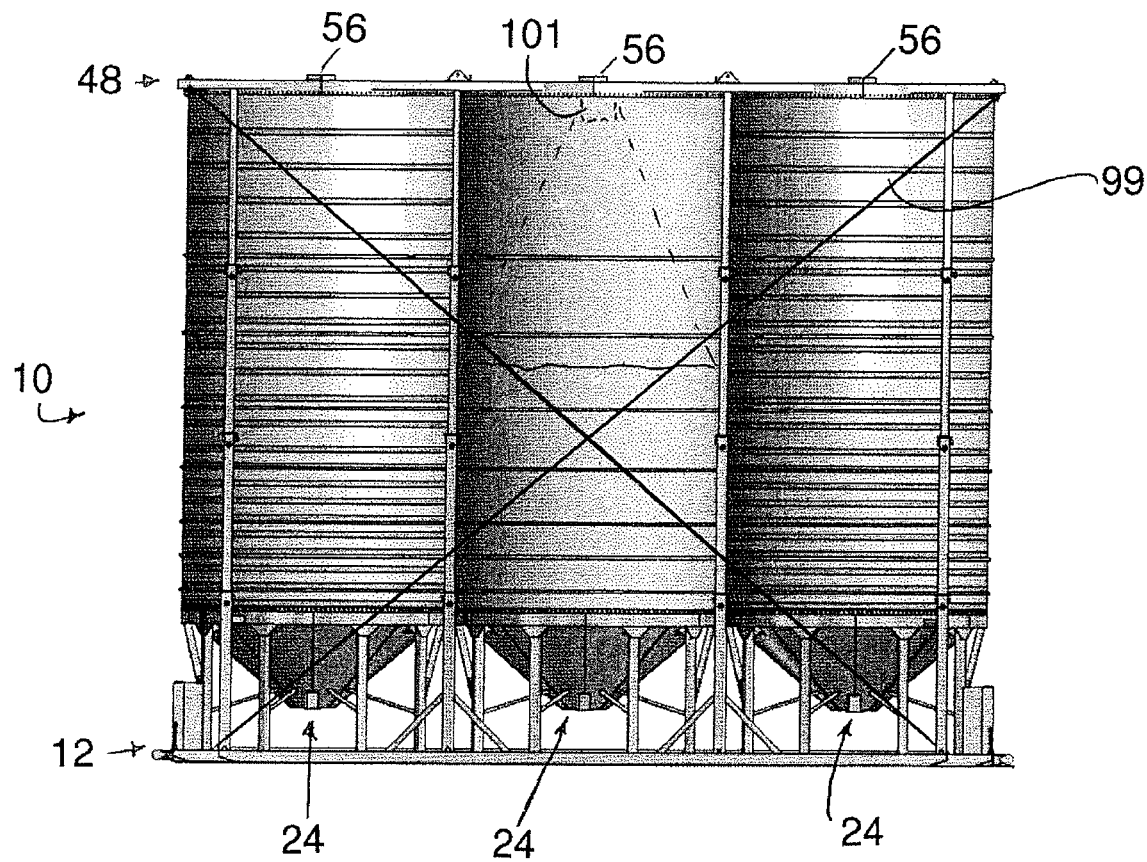
FIG. 3 is a side elevational view of the storage system in the working position.
Figure 4:
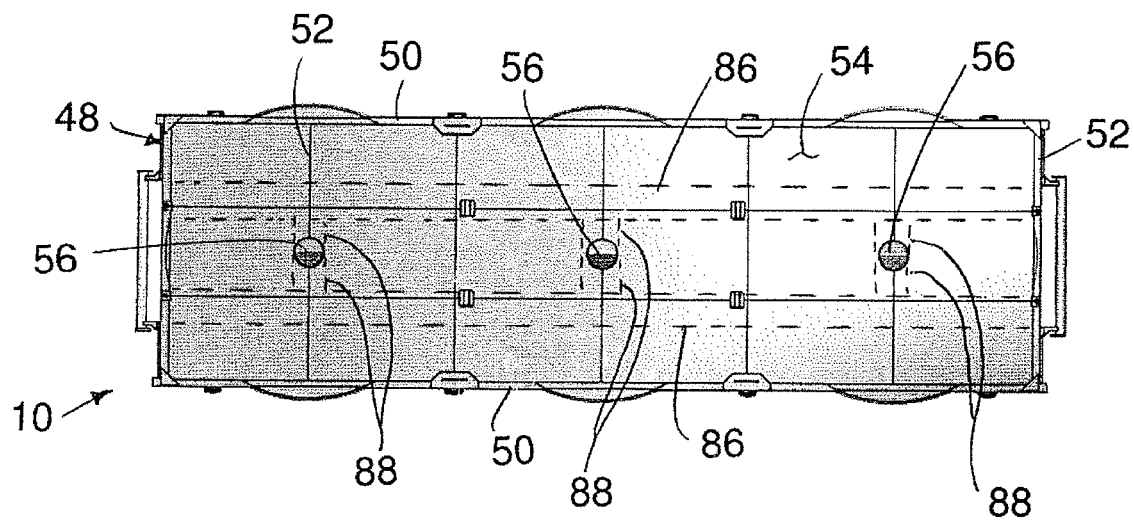
FIG. 4 is a top plan view of the storage system in the working position.
Figure 5:
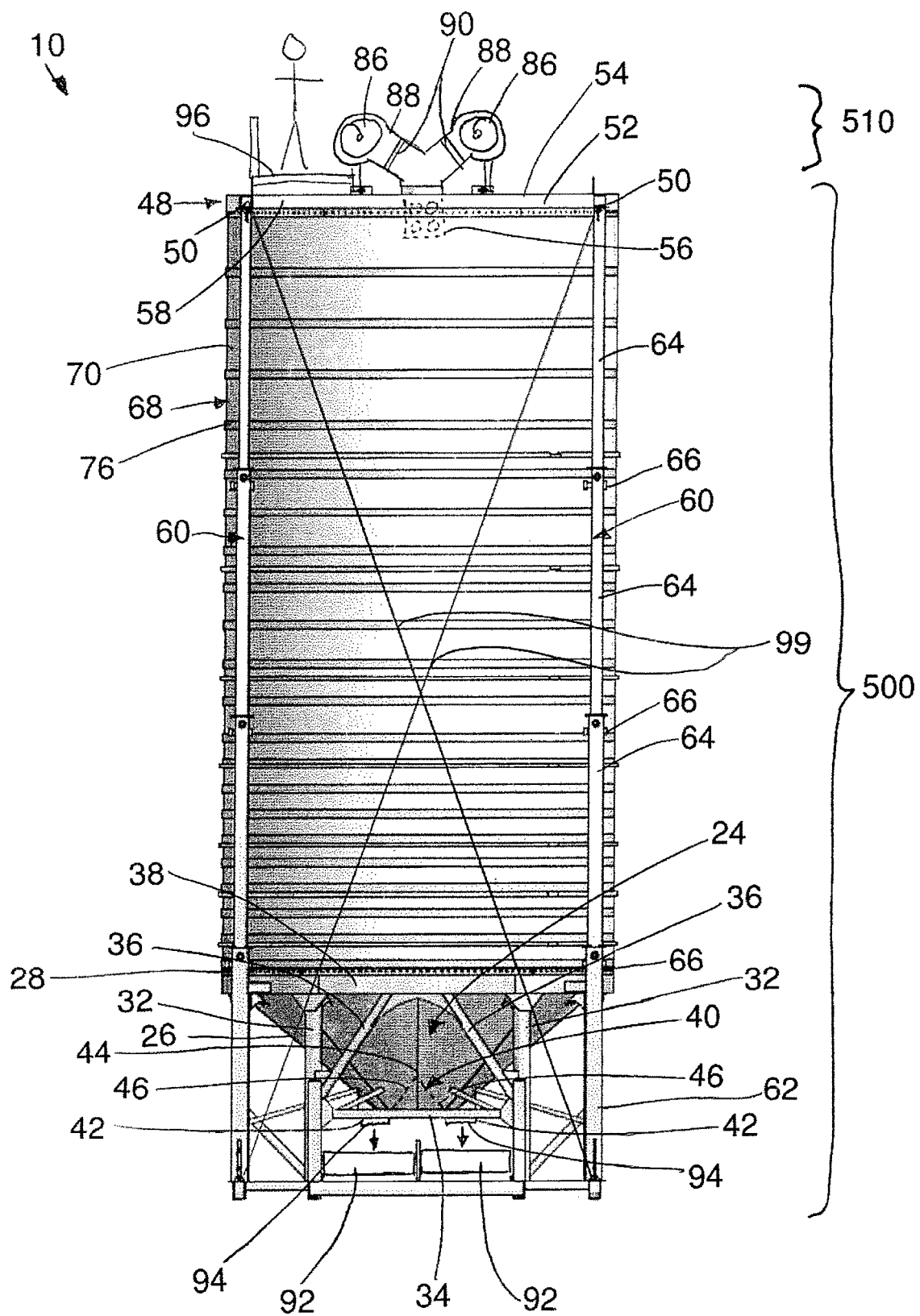
FIG. 5 is an elevational view of the storage system in the working position in which the loading conveyors on the upper frame and the discharge conveyors on the base frame are schematically represented.
Figure 6:
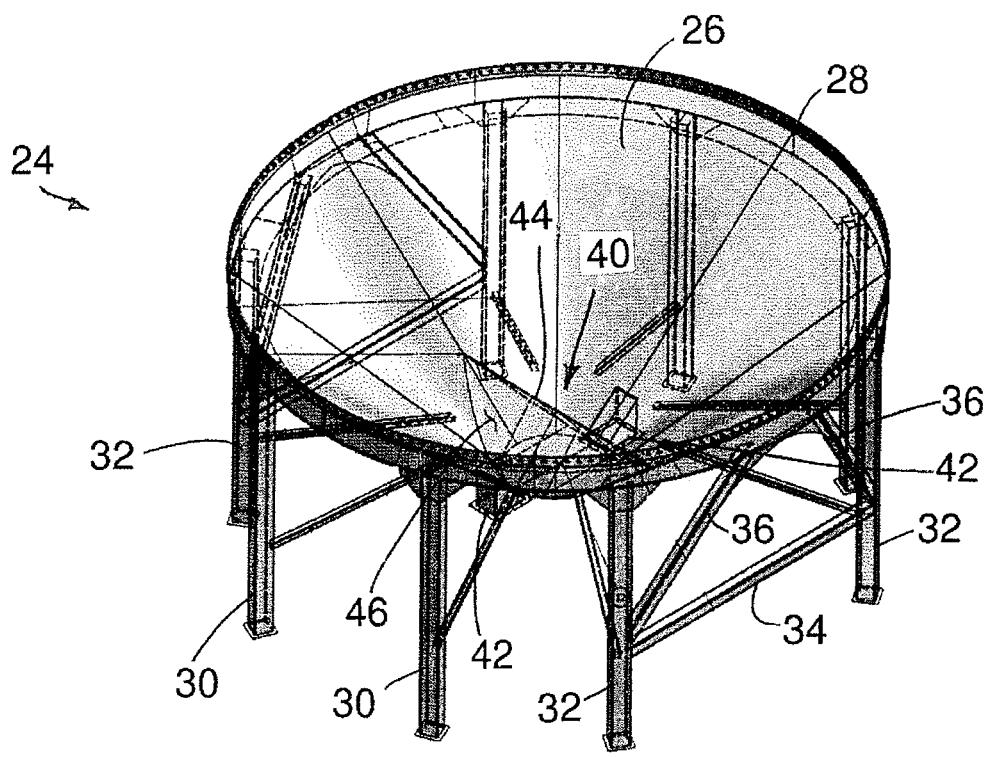
FIG. 6 is a perspective view of one of the hopper cones shown separated from the base frame.
Figure 7:
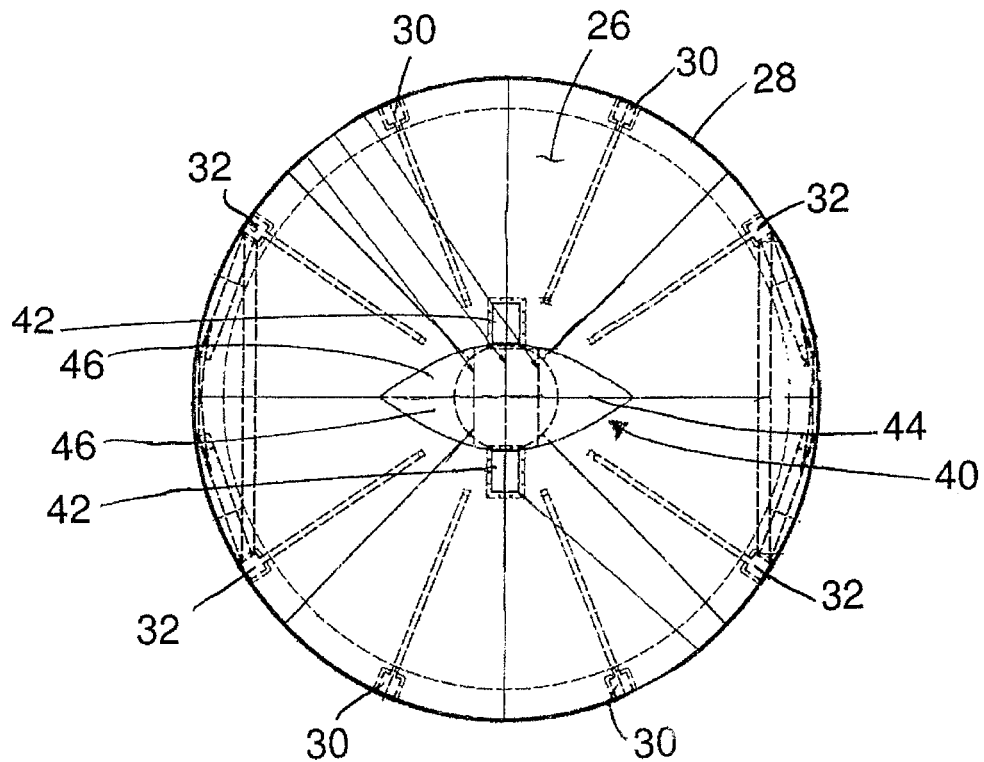
FIG. 7 is a top plan view of the hopper cone of FIG. 6.
Figure 8:
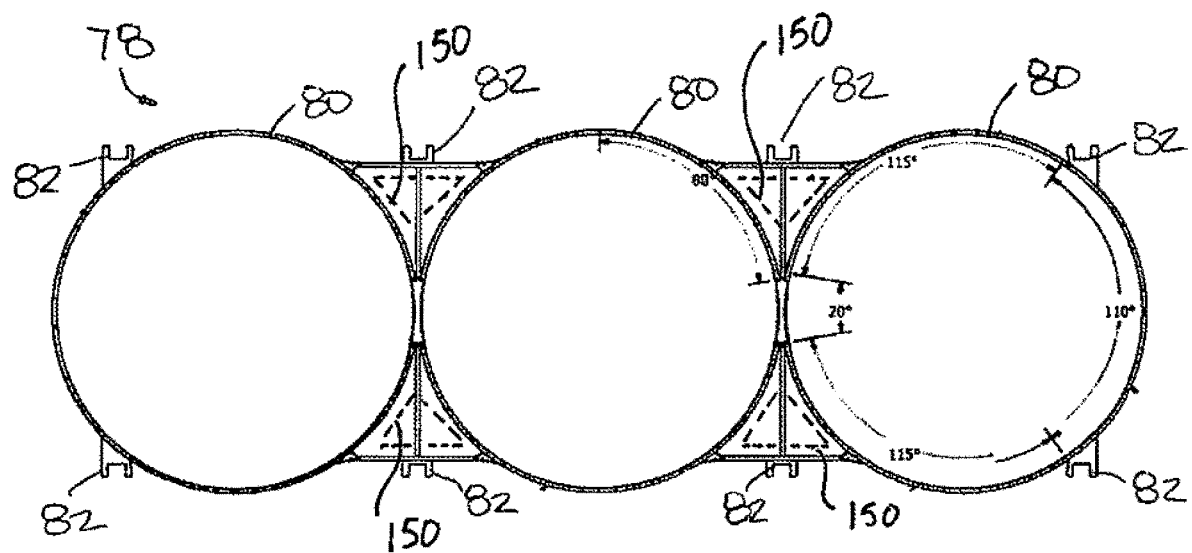
FIG. 8 is a top plan view of one of the intermediate frames shown separated from the storage system.
Figure 9:
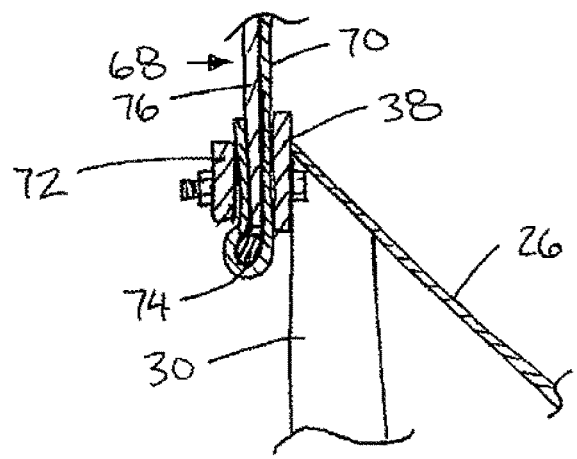
FIG. 9 is a schematic representation of the coupling of a bottom end of the tubular wall assembly of one of the silos to an upper perimeter edge of the respective hopper cone.
Figure 11:
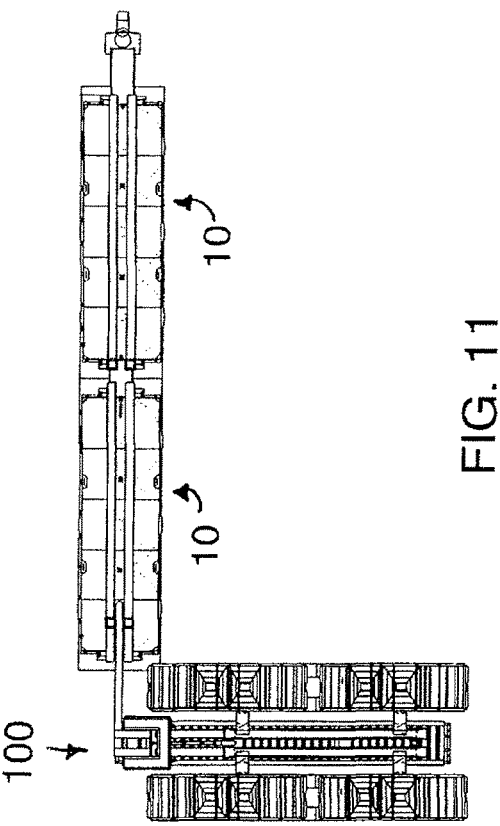
FIGS. 11, 12 and 13 are top plan, end elevational, and side elevational views respectively of the two storage systems according to FIG. 10.
Figure 13:
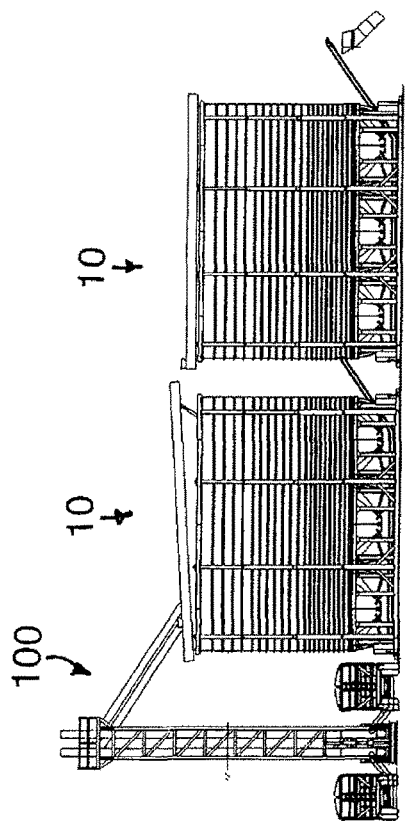

As shown in FIGS. 3 and 5, in the working position, the storage system may be further provided with bracing cables 99 connected between diagonally opposed corners to form an X shaped pattern across each side and each end of the system. More particularly the bracing cables 99 comprise the elongate flexible members having a high tensile strength to provide structural support in the working position while remaining readily collapsible with the upper frame relative to the base frame into the collapsed transport position. The cables 99 define a plurality of flexible members coupled under tension between the upper frame and the base frame in the working position in which at least some of the flexible members are supported such that the tension of the flexible members are partly in opposition to one another to properly square the upper frame relative to the lower frame in the longitudinal and lateral directions once erected into the working position.

The storage system may also be provided with a suitable level sensor within each storage silo. The sensor may take various forms including ultrasonic sensors capable of measuring the distance between the upper frame and the height of the granular material within the storage silo. An alternative arrangement, the level sensors may be provided in the form of vertically spaced apart proximity sensors along a centre cable hanging within each silo to detect the level of granular material.

In one embodiment, the level sensor may take the form of a light source 101 mounted on the upper frame centrally relative to the storage silo to project light downwardly into the storage silo if the tubular wall assembly was formed of a suitable translucent material. In this instance, an operator could detect the level of granular material within the storage silo as the granular materials will block passage of light from the light source 101 through the translucent material of the tubular wall assembly up to the fill level of the granular materials, but light from the light source 101 will illuminate the empty portion of the storage silo above the granular material.

Figure 10:
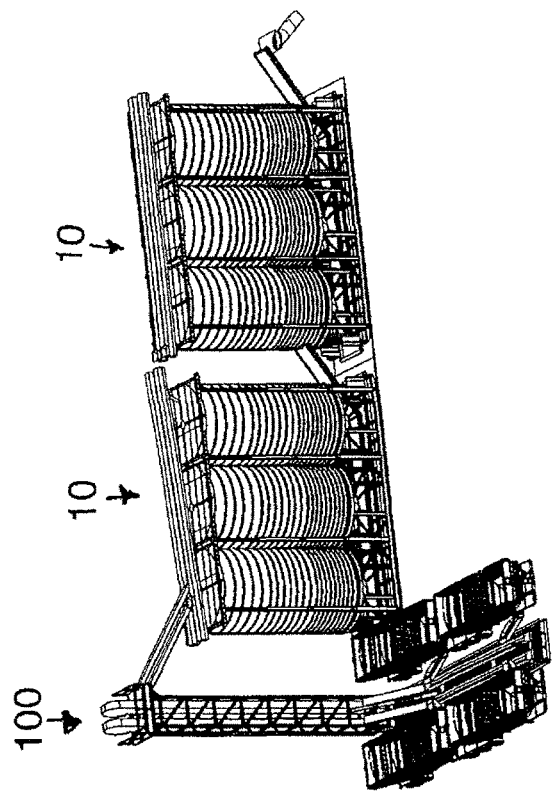
FIG. 10 is a perspective view of two storage systems according to FIG. 1 with loading and unloading conveyors shown attached and shown connected in series between an elevator system for loading the storage systems and a discharge chute for unloading the storage systems to a target location.
Figure 12:
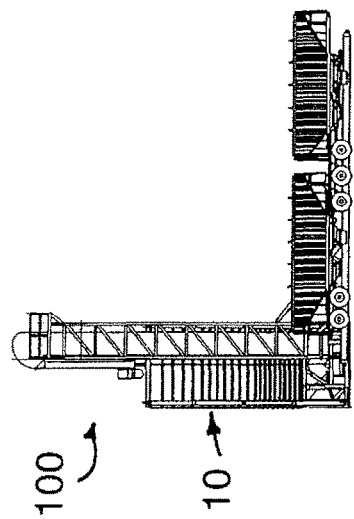
Figure 14:
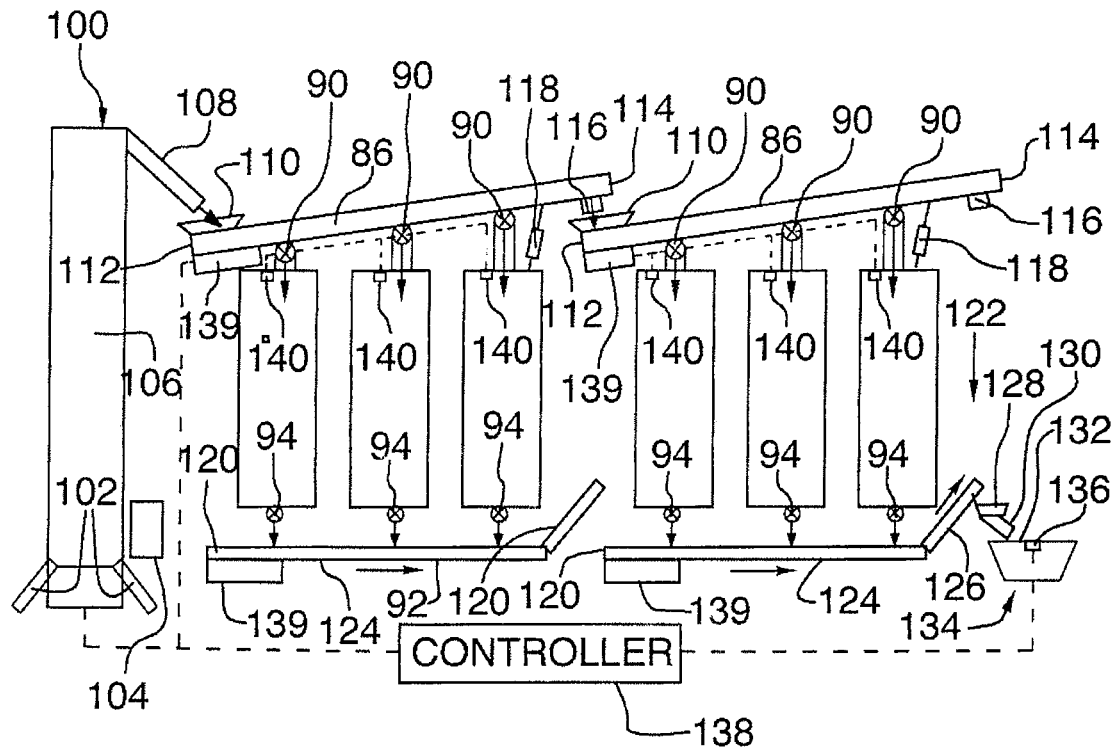
FIG. 14 is a schematic representation of the control system for the storage system when deployed in the manner according to FIG. 10.
Figure 15:
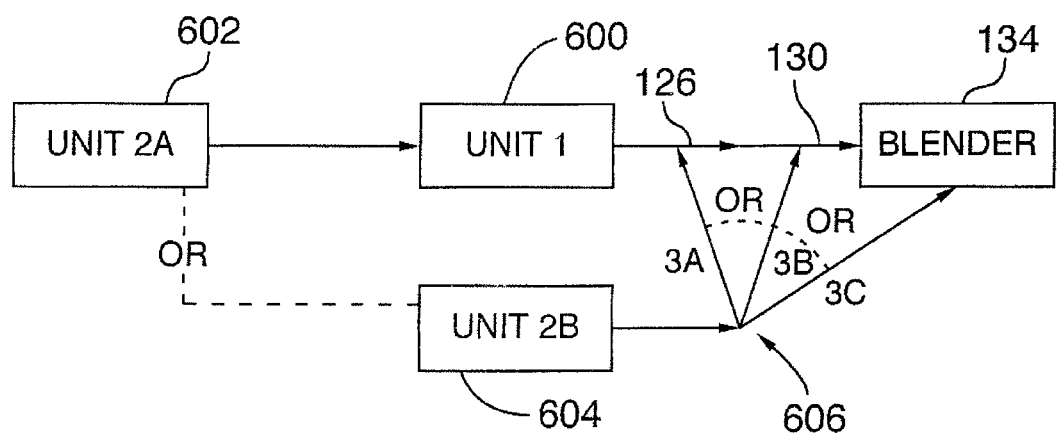
FIG. 15 is a schematic representation of two alternate deployment configurations of the storage system according to FIG. 1.
Figure 16:
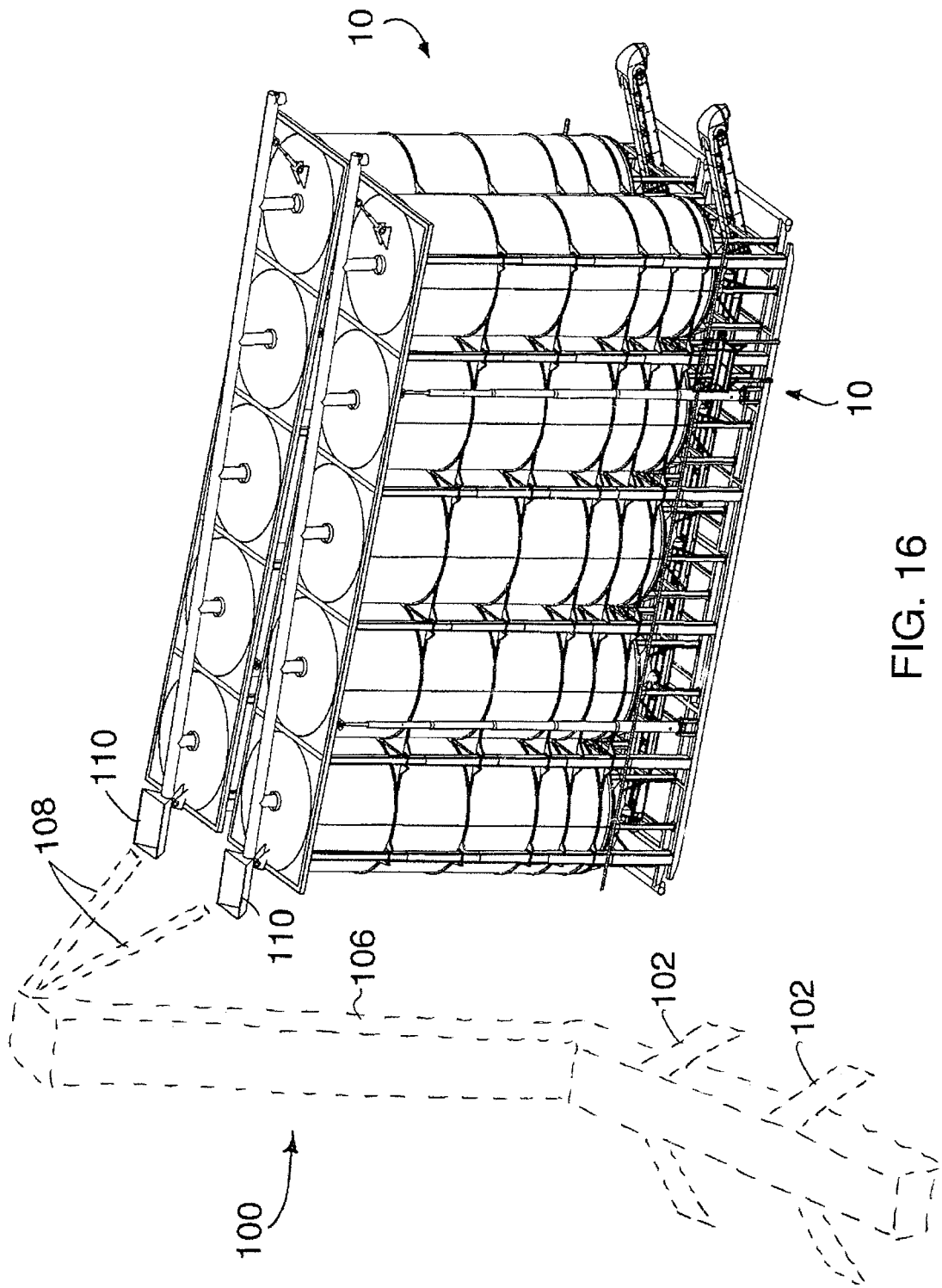
FIG. 16 is a perspective view of a second embodiment of the storage system in a deployed configuration.
Figure 17:
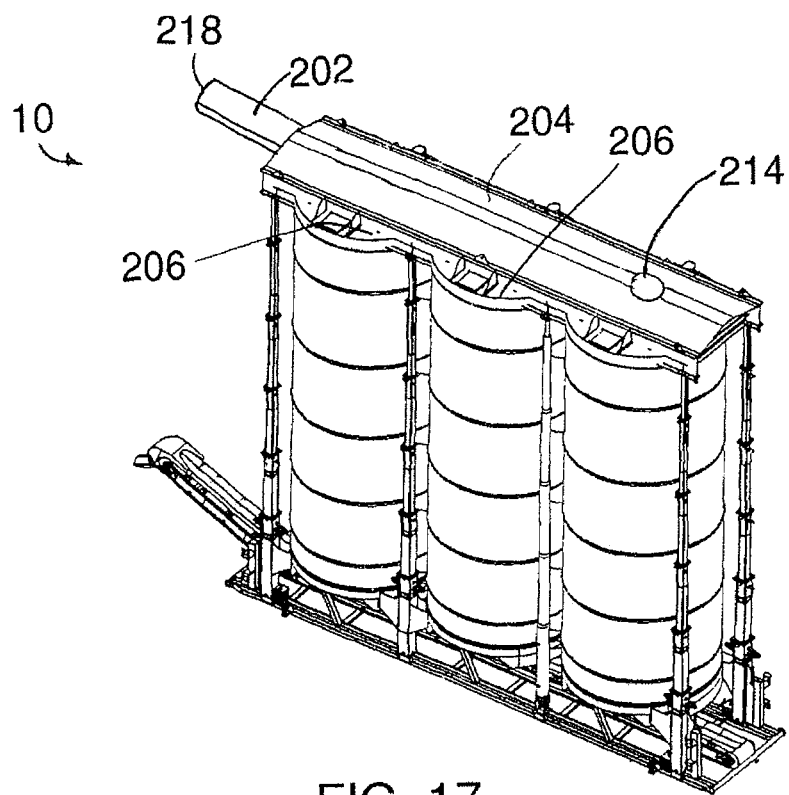
FIG. 17 is a perspective view of a further embodiment of the storage system in a deployed configuration.
Figure 18:
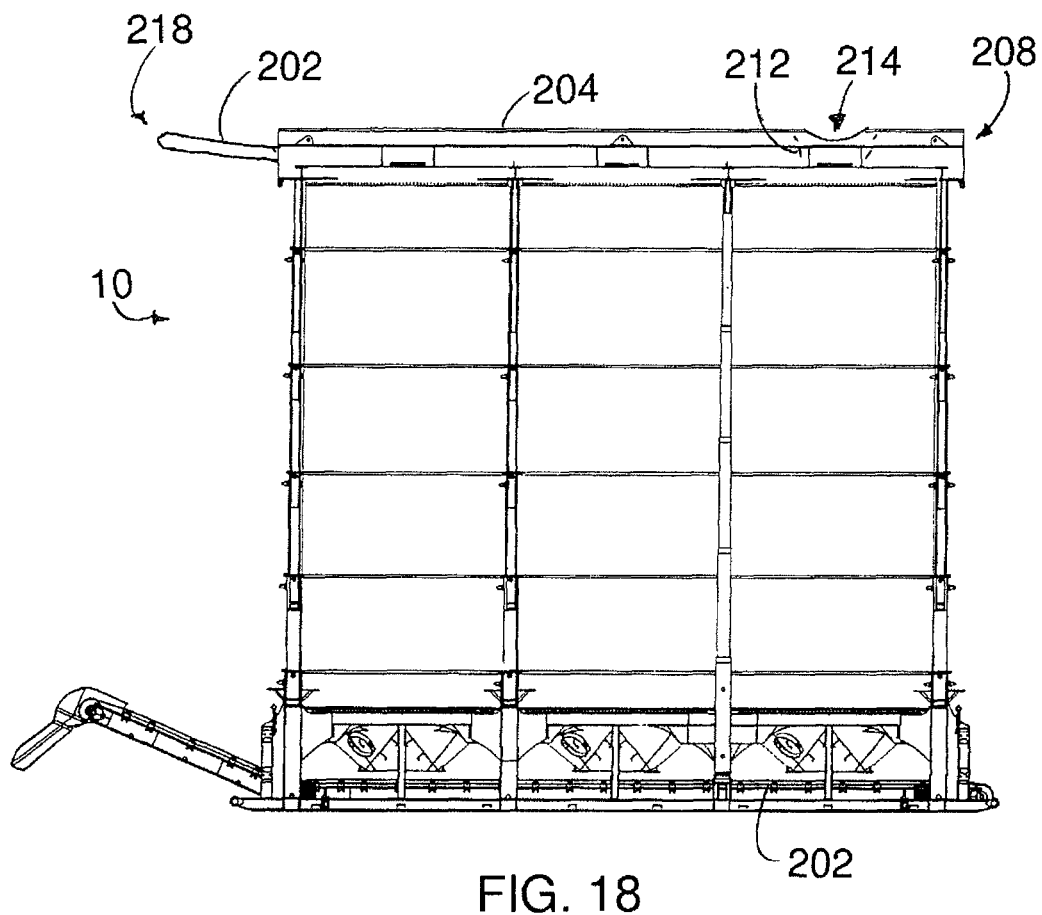
FIGS. 18, 19 and 20 are side elevational, top plan and end elevational views of the storage system according to the embodiment of FIG. 17.
Figure 19:
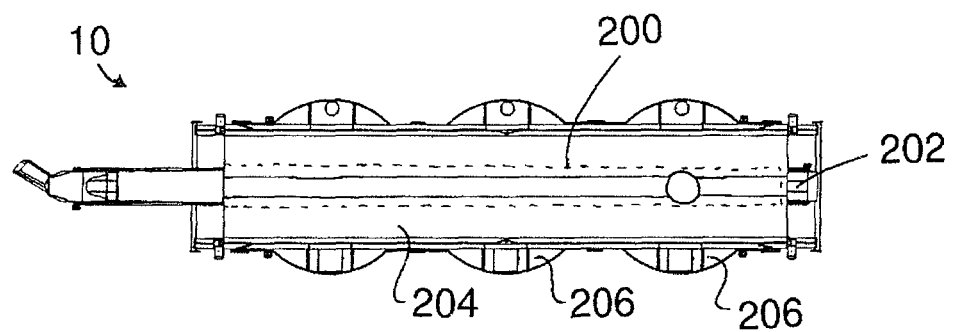
Figure 20:
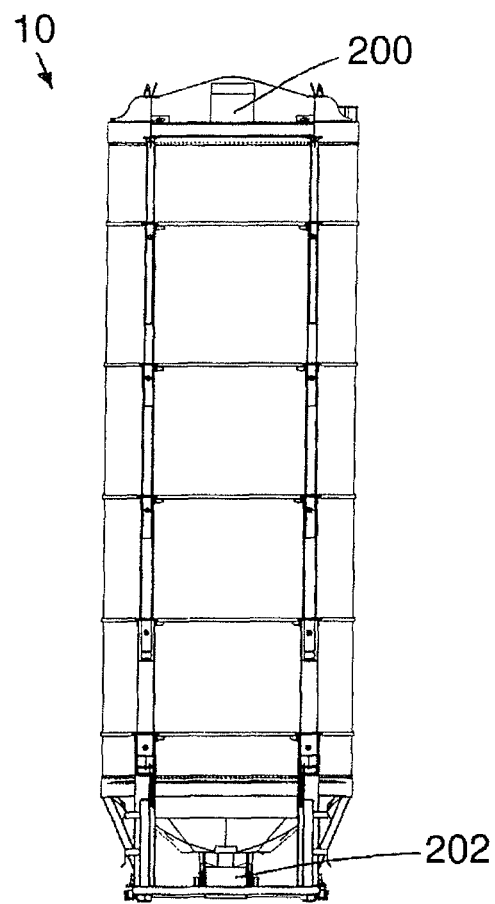
Figure 21:
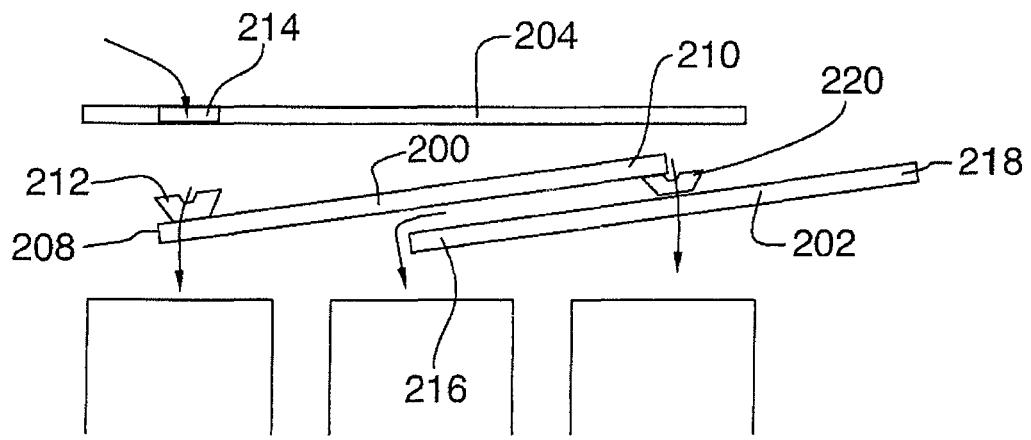
FIG. 21 is a partly sectional schematic representation of the loading conveyor assembly of the storage system according to the embodiment of FIG. 17.

Turning now to FIGS. 10 through 16, an exemplary deployment of the storage units 10 will now be described in further detail. Typically, a plurality of the storage units 10 are mounted in proximity to one another at a storage site either by connecting the storage units 10 in series with one another so as to be end to end with one another in a longitudinal row as shown in FIG. 10, or by positioning the storage units 10 in parallel arrangement alongside one another as shown in FIG. 16.

In either instance, an elevator system 100 is mounted in proximity to the storage units for loading granular materials into the storage units. The elevator system includes one or more feed conveyors 102 for receiving particulate material from transport vehicles 104 and for feeding the particulate material into an elevator 106 which elevates the particulate material and discharges it through a discharge chute 108 into the inlet hopper 110 of the loading conveyor assembly of one or more of the storage units 10.

As described above, each storage unit 10 may include a conveyor system 510 with one or more upper conveyors 86 spanning substantially the full length of the upper frame in the longitudinal direction. The storage unit may be provided with a pair of upper conveyor systems as shown in FIGS. 5 and 10 through 13, or with a single upper conveyor system as shown in FIG. 16. Each conveyor system can include one single conveyor with multiple discharge points, which extends longitudinally across each silo compartment and beyond the length of the storage unit. Alternatively, each conveyor system can include a series of shorter conveyor sections which could cascade longitudinally across each silo compartment and beyond the length of the storage unit. In each instance, the upper conveyor extends in the longitudinal direction of the storage unit from an inlet end 112 connected to the inlet hopper 110 at a location protruding longitudinally outward beyond the end of the base frame to an opposing outlet end 114 protruding longitudinally outward beyond the opposing end of the base frame. The outlet end of the conveyor includes a bottom discharge opening 116 from which particulate material can be discharged subsequent to being conveyed longitudinally along the conveyor from the inlet end to the outlet end thereof. The upper conveyor 86 communicates with each silo of the respective storage unit through a respective tube 88 having an inlet gate 90 connected in series therewith at the boundary wall of the conveyor. In this manner, when the conveyor comprises an auger rotating within a tube, closing the gate causes the conveyor to continue to convey material past the gate to the gate associated with the next storage silo in the row. Alternatively when the gate is opened, particulate material conveyed by the upper conveyor is discharged through the corresponding gate opening at the lower boundary of the conveyor to discharge material into the respective silo therebelow associated with that gate.

The upper conveyors are pivotally coupled to the upper frame 48 of the storage unit about a horizontal pivot axis at the inlet end of the storage unit such that the elevation of the discharge opening at the outlet end 114 of the conveyor varies in height relative to the base frame and the upper frame of the storage unit as the conveyor is pivoted about the horizontal pivot axis. A suitable height actuator 118 is operatively connected between the upper frame and the upper conveyor in proximity to the discharge outlet end thereof such that extension and retraction of the linear hydraulic actuator forming the height actuator 118 causes the height of the bottom discharge opening 116 to be controllably varied. More particularly the height of the outlet end of the upper conveyor can be varied between a lowered height in which the conveyor is generally horizontally oriented across the upper frame and a raised height in which the conveyor extends from the inlet end to the outlet end thereof at an upward inclination such that the bottom discharge opening 116 is spaced above the inlet hopper in elevation.

Figure 45:
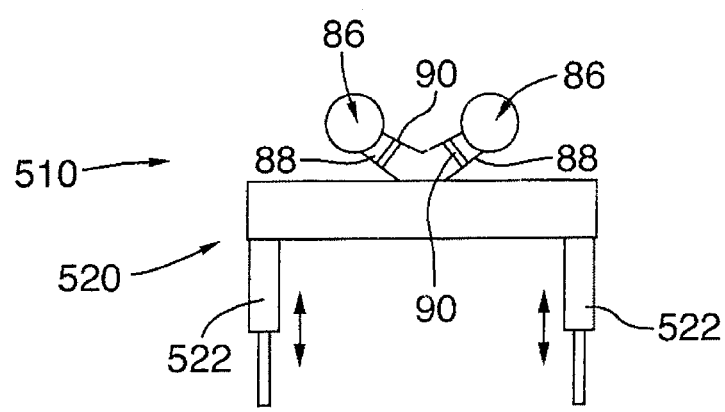
FIG. 45 is a schematic representation of an embodiment of the conveyor system which can be used independently of the silo system with other silo arrangements.

The upper conveyors 86 may be engaged with existing silo system technologies and/or existing elevator technologies. For example, the upper conveyors may be connected to the top portion of a frame associated with a standard silo system or may have an upper conveyor frame 520 as shown in FIG. 45. The upper conveyor frame 520 extends downward from the upper conveyor 86 to provide support and to raise the upper conveyor 86 to an appropriate height to engage with the silo system. The upper conveyor frame may be collapsible/extendable, such as by a scissor lift, hydraulics or mechanical telescoping limbs. The upper conveyor frame 520 may define an opening at one end, such as between two leg portions 522, such that the conveyor system can be positioned over the silo system, for example in the same manner as the positioning of the second modular section 254 over the first modular section 252 as described below with regard to FIG. 25.

Each of the connecting tubes 88 between the upper conveyor and the respective silos in this instance is preferably a telescoping or longitudinally extending structure to accommodate the variation in distance between the upper conveyor and each silo as the upper conveyor is pivoted between different discharge elevations.

In this manner, when two storage units 10 are positioned longitudinally in series with one another with the base frames in close proximity to one another, the upper conveyor system(s) of the adjacent storage units can longitudinally overlap one another such that the bottom discharge opening 116 of a first one of the units is aligned directly above the inlet hopper of the adjacent one of the units. In this manner, if all of the gates are closed along the length of the upper conveyor of the first storage unit, material will continue to be conveyed longitudinally along the upper conveyors of the first unit for discharge into the upper conveyor system(s) of the adjacent second unit. Material is conveyed along the upper conveyor system(s) of the second unit in a similar manner to discharge material at the first open gate while continuing to convey material in the longitudinal direction past any gates that are closed.

Also as described above, each storage unit 10 includes one or more lower conveyors 92 spanning substantially the full length of the base frame in the longitudinal direction. The storage unit may be provided with a pair of lower conveyors as shown in FIG. 1 through 13, or with a single lower conveyor as shown in FIG. 16. In each instance, the lower conveyor extends in the longitudinal direction of the storage unit from an inlet end 120 that protrudes longitudinally outward beyond the end of the base frame to an opposing outlet end 122 protruding longitudinally outward beyond the opposing end of the base frame. More particularly, each lower conveyor includes a main section 124 extending generally horizontally below each of the storage silos to extend the majority of the length of the base frame while being in communication with the discharge gates 94 of all of the silos. Each lower conveyor also includes a discharge section 126 connected in series with the main section at the discharge end 122 such that the portion of the lower conveyor protruding longitudinally beyond the end of the base frame is defined entirely by the discharge section 126. More particularly the discharge section extends from an inner end supported at the end of the base frame by a pivotal connection for relative pivotal movement about a horizontal pivot axis to an opposing outer end which is a free end that is adjustable in height relative to the main section under control of a suitable hydraulic linear actuator (not shown). Preferably the discharge section 126 can be pivoted between a lowered position in which the outlet is near in elevation to the main section of the lower conveyor and a raised position in which the discharge section may be closer to vertical than horizontal in orientation. In the raised position, the outlet is at sufficient elevation to permit discharging into the open top end of a storage container on a transport vehicle if it is desired to clean out any remaining materials within the storage unit for example. In the raised position, the overall length of the base unit is effectively reduced by reducing the amount that the discharge section protrudes horizontally beyond the end of the base frame. By enabling the discharge section to be raised relative to the main section of each lower conveyor, the base frames can be connected in series with one another such that the discharge end of the discharge section of each lower conveyor can be configured to discharge onto the protruding inlet end of the lower conveyor of an adjacent storage unit 10 connected in series therewith. In this manner, material discharged from any one of the silos onto any lower conveyor can be conveyed by the lower conveyor longitudinally along the length of the storage unit and discharged onto the lower conveyor of the next storage unit in the row so that the material can be continued to be conveyed and subsequently discharged into downstream equipment from the last storage unit in the row.

In further embodiments, the discharge section 126 can be either a telescoping conveyor or an articulating conveyor which could swing 45 degrees. In this case, it would take sand from the longitudinal conveyors and either (i) load the next silo skid, (ii) feed a blender unit, or (iii) load trucks to get the remaining sand out of the silos.

The last storage unit 10 in a row of storage units may be provided with a discharge chute including a collection hopper 128 positioned below the discharge end of the discharge section of the lower conveyor, and a discharge tube 130 extending downwardly from a bottom discharge opening of the collection hopper 128 for discharging collected materials therethrough under force of gravity. In the event of the storage unit 10 having two adjacent lower conveyors, both lower conveyors may feed a single discharge section in communication with the collection hopper 128, or the collection hopper 128 may be sized to receive material from two discharge sections 126 associated with the two main sections 124 of the two lower conveyors respectively. In either instance, the discharge tube 130 is coupled to the collection hopper 128 so as to be pivotal about an upright swivel axis while being positionable to extend downwardly at a radially outward slope relative to the swivel axis to a bottom discharge opening thereof. The discharge tube 130 may be further arranged to be telescopic in length to vary the discharge location of the discharge tube 130 while the collection hopper 128 remains at a fixed location at the discharge end of one or more discharge sections 126 of one or more lower conveyors of one or more storage units 10.

Each storage silo of each storage unit 10 is provided with a respective discharge gate 94 in association with each lower conveyor of the respective storage unit. Accordingly, if two lower conveyors are provided as in the first embodiment of the storage unit 10 described above, then each hopper cone 24 is provided with a pair of laterally spaced apart discharge openings 42 with respective discharge gates 94 controlling the discharge of material onto the two lower conveyors respectively. Alternatively when a single lower conveyor is provided, the single lower conveyor may be arranged to receive material from both lower discharge openings 42 or each silo may instead be provided with a single discharge opening. In either instance, each discharge opening is provided with a respective discharge gate 94. Each discharge gate is independently controlled through a range of positions between a fully open position and a fully closed position by an associated gate actuator. The gate actuator provides position feedback to the controller which controls the actuator to enable the cross-sectional area of the open area uncovered by the gate to be readily controlled. Controlling the size of the gate opening effectively controls the discharge rate of material within the storage silo being gravity discharged through the discharge opening onto the respective lower conveyor therebelow.

In the exemplary embodiment of FIGS. 14 and 15, the storage units are configured for discharging into the inlet hopper 132 of a blender 134 which blends granular materials being used as a proppant in a hydraulic fracturing operation. In this instance the inlet hopper of the blender may be provided with a level sensor 136 to monitor the level of particulate materials within the inlet hopper.

As shown in FIG. 15, if a first storage unit 600 is arranged with a second storage unit 602 in series therewith, the discharge of the lower conveyors of the second unit 602 are arranged to discharge into the inlet end of the lower conveyors of the first unit 600 and the discharge sections of the first unit 600 may be fed directly into the inlet hopper of the blender or into a common collection hopper 128 of a discharge chute which in turn feeds the inlet hopper of the blender.

Alternatively, as also shown in FIG. 15, if the first storage unit 600 is arranged with a second storage unit 604 that is in parallel therewith, the discharge of the lower conveyors of the second unit 604 may be arranged to discharge into a transverse conveyor 606 which collects particulate material from the discharge of the second unit 604 and transfers the material laterally towards the discharge end of the first storage unit 600. The discharge of the transverse conveyor 606 may be configured to deposit material onto (i) the discharge section 126 of the lower conveyors of the first storage unit 600, (ii) the discharge chute 130 that commonly receives material from both storage units, or (iii) the inlet hopper 132 of the blender such that both the first and second storage units 600 and 606 commonly discharge material directly into the inlet hopper.

When used together with downstream secondary equipment such as a blender 134, a control system is typically provided having a main controller 138 which is in communication with each of the storage units 10, the elevator system 100, and the downstream secondary equipment. More particularly, when each gate is controlled by a respective gate actuator that can variably control the gate opening size and each conveyor is controlled by a respective conveyor motor 139 that can variably control the speed of the conveyor, all of the gate actuators and the motors are operated under control of the main controller 138. The main controller also communicates with the level sensor 136 of the downstream secondary equipment in addition to communicating with additional level sensors 140 associated with each of the storage silos for measuring the respective level of material within each silo. Each of the level sensors may comprise multiple different elevations sensors or an individual sensor capable of measuring height through an infinite range of heights between the top and bottom of the storage silo.

In the manner described above, the controller 138 can be configured to vary the rate of material discharge from the silos and fed into the blender by varying the gate opening size of any one or more of the silos actively discharging material onto the lower conveyors. The overall discharge rate can must be varied by opening additional gates or increasing the opening size of any one or more gates which are already opened. In the event that the controller detects that the height of material within the blender falls below a lower threshold, the configuration of the discharge gate can be configured to increase the discharge rate. Likewise, if the level in the blender exceeds an upper limit threshold, the controller may reduce the collective gate opening size associated with any discharging silos or may close the discharge gates entirely. As the rate of discharge from the silos is varied, the controller may operate the lower conveyors at a constant operating speed, or the operating speed may be varied proportionally to the gate opening size of the one or more gates being used for discharging material therefrom.

The controller may be further connected to loading equipment such as the elevator assembly 100 to similarly vary the operating status of the elevator according to the level status in one or more silos. Accordingly, the operation of the elevator can be shut off if one or more silos reaches a level of material sensed by a respective level sensor 140 which exceeds an upper threshold stored on the controller. Alternatively, the elevator can resume operation or increase the rate of operation thereof if one of the silos reaches a level of material sensed by a respective level sensor 140 which is below a lower threshold stored on the controller. In further arrangements, if one of the silos being used to discharge material into the blender falls below a lower threshold, the controller may close the discharge gate associated therewith and open the discharge gate of a different one of the storage silos having the same granular material therein so as to maintain an overall discharge rate from the storage units while transferring which storage silo is used to supply the granular material.

To reduce the overall transport height of each storage unit 10 in the collapsed position thereof, the storage unit may be formed of one or more modular units which are stacked and coupled together in a working configuration in which the storage unit can be collapsed and extended between the working position and the collapsed position thereof. In one example, a lower modular assembly is defined by the base frame and the hopper cones 24 supported on the base frame 12, while an upper modular assembly is stacked upon the lower modular assembly and includes the upper frame 48 incorporated therein. The telescoping posts 60 and the height extendable tubular wall assemblies 68 in this instance may either remain coupled as part of the lower modular assembly, in which case the tubular wall assemblies are provided with quick attach connectors to the upper frame, or alternatively remain coupled as part of the upper modular assembly in which case the tubular wall assemblies are provided with quick attach connectors to the respective hopper cones 24. The upper conveyors in this instance may either be supported on the upper frame as part of the upper modular assembly, or alternatively a third modular assembly may be provided which carries the upper conveyors thereon and which can be readily stacked upon the upper frame of the upper modular assembly for connection therewith in the working configuration. Other modular disconnections within the storage unit may take place, however in each instance the separation of different modular components results in separate modules which can be transported and which are further reduced in height, weight or length relative to the collapsed position of the storage unit when the modular units are connected together.

When deploying the storage system to a new storage site, each storage unit 10 is transported either as a single unit, or as separate modular sections. When erecting a storage unit formed of modular sections, the modular sections are typically stacked one upon the other and coupled in the stacked configuration prior to extending the unit from the collapsed position to the working position thereof. The modular sections can be stacked by various means including use of a crane or use of outriggers which can raise the uppermost modular unit sufficiently above the ground that the next modular section therebelow can be slid under the uppermost section prior to erection of the silos. For example, when only the upper conveyors are detached as a modular section from the remainder of the storage unit, the upper conveyors would typically be attached above the upper frame of the storage unit prior to erecting the storage unit from the collapsed position to the working position thereof.

The equipment can be transported using various conventional means of handling elongate skids using transport trucks and trailers together with any suitable means for unloading the unit or the modular sections from the vehicles once on site. Typically, a single elevator system 100 is provided in association with two or more of the storage units 10 which are arranged either into a single longitudinal row or in parallel configuration with one or more storage units arranged in series within each of the parallel rows. The elevator is positioned in a sufficient proximity to the inlet end of the first storage unit of each row that the discharge chutes of the elevator can discharge into the inlet hopper at the inlet end of the upper conveyors of the storage units. The elevator system typically remains spaced apart from the storage unit to define sufficient space for a vehicle traffic lane alongside the elevator unit and between the elevator unit and the nearest storage unit.

When positioning multiple storage units in series, typically a first storage unit is placed on the ground with modular sections being stacked and coupled together to permit the unit to be raised up from the collapsed position to the working position thereof. This can be accomplished with integral lifts and actuators on the unit itself, or by supplying external lifting equipment for example cranes and the like to raise the unit into the working position where the pins are subsequently used to retain the system in the working position. The outlet end of both the upper conveyor and the lower conveyor are raised so that the next adjacent storage unit can be placed on the ground in close proximity to the first unit at the outlet end of the first unit and erected into the working position thereof without interference with the protruding portions of the upper and lower conveyors of the first unit. Once the second unit has been erected into the working position, the outlet end of the upper conveyor can be lowered into closer proximity to the inlet hopper of the second storage unit. Likewise, the discharge section of the lower conveyor of the first storage unit can be lowered such that the outlet end thereof is aligned directly above the protruding inlet end of the lower conveyor of the second storage unit.

In operation, the overall system of elevator, storage units and downstream secondary equipment are collectively operated by the main controller 138 to enable loading of the storage silos with particulate material from the transport trucks and to enable on-demand discharging of the particulate material from the storage silos into the downstream secondary equipment. As the particulate material is discharged by transport vehicles into the elevator, the elevator will elevate the material to the discharged by the chute 108 of the elevator system which discharges the material into the inlet hopper at the inlet end of the upper conveyor of the first storage unit. The upper conveyor is operated to convey the material continually along the length thereof. Whichever silo is desired to be filled first has the inlet gate 90 associated therewith opened so that material conveyed by the upper conveyor will discharge through the open gate into that silo. Alternatively, if the gate is closed, material will be conveyed to the next available open gate. If all the gates of the upper conveyor of the first storage unit are closed, the upper conveyor will discharge the material from the outlet end thereof into the inlet hopper of the next upper conveyor of the next storage unit in series therewith. The process may be automated by initially filling the first silo in the row until the level sensor detects that the first silo is full, causing the controller to close the inlet gate 90 associated therewith so that material is conveyed to the next silo in the row. The inlet gate 90 associated with the next silo remains open until the level sensor associated therewith detects that the next silo is full, causing the controller to close the inlet gate 90 associated therewith so that material is conveyed to the next silo in the row. This operation continues until all silos are full. If all silos have levels which exceed the upper thresholds thereof as detected by the respective sensors, the controller will cease operation of the elevator system to prevent overfilling.

In an alternative arrangement, when different silos are designated for storage of different materials therein, the elevator system determines which material is being conveyed and then the controller will dictate opening only of the inlet gate 90 associated with the storage silo designated for storage of that material.

When it is desirable to discharge material from the storage silos for use by the downstream equipment, one of the discharge gates 94 of a selected one of the storage silos is opened and the lower conveyors are operated to convey the discharged material to the downstream equipment. It is possible to vary the rate of material being conveyed by the lower conveyor simply by adjusting the gate opening size as described above under control of the main controller 138. Feedback from the level sensors of the downstream equipment may be used as input to determine the desirable discharge rate from the storage silos. As the gate opening side is primarily used to control the discharge rate, the lower conveyors may be operated at a fixed rate or at a variable rate which is proportional to the gate opening size is controlled by the controller.

Turning now to further embodiments, the storage unit 10 as described herein can be used for a variety of different flowable materials including powders and different granular or particulate material products, including for example, various agricultural products, cement products, drilling products, concrete blending products, minerals, aggregates, or any other type of granular material regardless of how coarse or how fine the particulate material might be, and with modifications as described herein and/or as would be understood by those skilled in the art, can also be used for storage and handling of liquid or slurry materials. The storage unit 10 is particularly advantageous over many prior art systems in that the design of the system is very lightweight compared to the volume of delivered storage per shipment. The footprint of the unit on site, together with the footprint of the truck haul path, is also very low for such a high volume of storage capacity. Typically, single shipments in the prior art cannot create a similarly dense footprint.

Use of waterproof fabrics forming the liners of the storage silos can increase the number of applications where the storage unit can be used. The liner materials may also be heat resistant to enable hot granular materials to be stored as well.

The storage units can be grouped together enabling the overall storage capacity to be scaled up or down according to customer demands by running in side-by-side rows or longitudinally in series within a single row. A single elevator in this instance can supply a large number of storage units when connecting the units longitudinally in one or more rows.

Delivery of each storage unit to a storage site can be accomplished by various conventional means including skidding the unit on or off a deck trailer using a winch tractor. Alternatively, if it is desired to further reduce transport height, the storage unit may be outfitted with hydraulic lifting legs, which may be set on outriggers if additional width clearance was desired. Such hydraulic lifting legs would permit the storage unit to be elevated in order for a low profile trailer to back underneath the elevated storage unit for loading, whereupon the storage unit would then be lowered onto the low profile trailer deck for transport. Once at the destination, the storage unit would again be elevated using the same hydraulic lifting legs, allowing the low profile trailer to drive forward away from the storage unit, whereupon the storage unit would be lowered down for use or for storage. In either configuration, no special trailer equipment is required.

In another alternative, the storage unit may be outfitted with a removable goose neck and stub axles which would be hydraulically retracted once the storage unit is delivered and spotted at its destination, prior to erection of the storage unit.

In further embodiments the tubular wall assemblies forming each silo may use flexible materials as described above, or may use telescoping steel rings forming the structure of the walls in place of flexible materials. Rings may be attached to the telescoping arm structure or may be supported in floating relationship to the tubular wall assemblies, or a combination thereof.

When using flexible materials, and more particularly a flexible liner as the primary containment, various means can used to provide secondary support. This includes use of steel hoops, or various other types of rings formed of fiberglass, composite, plastics and the like for example. Instead of separate hoops, the reinforcing material may also be provided as a continuous spiraling tension wire in a helical pattern. The supporting layer may also be formed as a grid in the form of a cargo net for example in which fabric type material or a variety of cords are used to provide tensile strength in a circumferential direction as well as in an axial direction.

In further arrangements, the tubular walls of the silos may include quick attach connectors to support the liner within each silo so as to enable the inner envelope of the silo to be readily replaced. Quickly detaching and reattaching tubular wall assemblies of flexible material would also be desirable when the rigid supporting structure is formed in modular sections for ease of assembly of the modular sections.

The storage units may be erected together with rig mats using D-hooks or recessed rings coupled by cables to act as outriggers once tied onto the silos for improving the stability while reducing ground pressure. The skid may also have outrigger supports to tie one storage unit to an adjacent storage unit to improve stability when using more than one storage unit side by side or in a row.

The storage units can be levelled relative to one another by a variety of conventional means including bottle jacks or hydraulic levels. Each storage unit may also be provided with an integrated shim package for the skid leveling in which each shim package includes a stack of shims of varying heights which ship right on the unit so that the shims are always available at the site where the unit is to be erected.

When erecting the storage units, integral hydraulic actuators or lifts may be provided directly on the units in connection between the base frame and the upper frame thereof as described in the first embodiment; however, other types of lifting mechanisms can be used including pneumatic actuators, telescoping screws and the like. In yet further embodiments, the lifting force for raising the upper frame relative to the base frame may be provided by outside equipment such as a crane. In either instance once the lifting force is provided and the posts connected between the upper frame and the base frame are extended to the working position, pins are subsequently used to retain the posts in the raised and working position so that the lifting system is no longer required to maintain the storage unit in the erected position. Once erected, a variety of cables or cross cables can be used to ensure structural support. Functionality for cable management may also be provided.

The telescoping arm structures forming the posts that support the upper frame above the base frame may incorporate bottle jack leveling to provide final leveling and to overcome any roof sag. Once erected into the working position, the telescoping posts are locked into the extended positions, such as by locking pins. Holders may be mounted on the arms to retain the pins therein while shipping prior to mounting of the pins in a working position of the storage unit.

Each storage unit may be provided with intermediate access platforms at various elevations to provide ready access for operators to place the pins in the telescoping pole structures when raising the storage unit into the working position. The access platforms may be rolling platforms that can roll along the ground surface alongside the storage units and may be collapsible for storage and transport. Alternatively, a set of steps or platforms may be integrally supported on the telescoping legs in which the additional supporting structures can be popped up at the site when erecting or demobilizing the storage unit but remain folded up or down or otherwise recessed for shipping when not in use.

Access to the roof of the storage unit can be provided by a number of access mechanisms such as the use of collapsing ladders which extend and retract with the telescoping of the posts between the base frame and the upper frame. The collapsing ladders may be provided with rest stages, for example in the form of platforms interconnecting between different ladder sections which are offset from one another so as not to interfere with one another as the storage unit is collapsed. In further embodiments elevators may be provided for lifting operators from the base frame to the upper frame similar to mineshaft elevators. Access can also be provided by a separate traditional skid hooked onto the storage unit. In all instances some form of fall protection is incorporated into the roof access system and to provide full protection while operators are on top of the roof.

Fabric materials are used in various forms to form curtains or envelopes which surround any of the open air material transfer locations on the storage unit for dust containment. This includes envelopes which surround any belt conveyors or which surround the communication of material being discharged from the upper conveyors to the inlets at the top of the silos or material being discharged from the discharge gates at the bottom of the silos to the lower conveyor. The dust containment curtains or envelopes can include fabric panels which are retained on the frame of the storage unit using various releasable connectors for example by use of magnets, use of zippers, or various other mating connectors including eyelets secured with hooks and the like.

In some instances, the storage units may not require upper conveyors as the discharge spout of an adjacent elevator system may be able to be readily repositioned for directly loading the inlet opening at the top of one or more silos. In this case, the silo inlets may be outfitted with actuated inlet covers so that they can be operated remotely. The silo may not require an inlet gate in this instance. The silos may also be provided with an open roof in this instance.

When using upper conveyors on the roof for loading the silo compartments, one or more conveyors may be provided on each storage unit as described above. Various types of conveyors used for loading may include screw conveyors with single drives or dual drives, drag conveyors, tubular drag conveyors, various pneumatic conveying systems, or belt conveyors.

When using belt conveyors, each upper conveyor may further include a telescoping or shuttle conveyor with or without a tripping conveyor discharge. The tripping conveyor includes a belt trip or mechanism which can be longitudinally positioned along the belt conveyor to control the discharge location from the belt conveyor. In this manner the belt conveyor may extend the full length of the storage unit while the belt tripper is repositioned along the conveyor for alignment with the storage silo that the material is to be discharged into. When using a shuttle conveyor system, material is placed onto a reversible shuttling conveyor which is transported along the upper platform to the various silo openings whereupon the material would be discharged. When using any form of belt conveyor, the silos may be provided with an open roof to allow any leftover particulate material on the lower run of the belt to fall into the silos instead of being collected on an external surface of the storage unit. The belt conveyors may include low-profile conveyors which may incorporate use of ultra high molecular weight material or side wall belting. The storage units may also use textured belts or belts which are not rubber products including but not limited to chain belts.

In the instance of pneumatic conveying of particulate material into the storage silos, any pneumatic conveying lines which would be attached to the roof for discharging into each of the silos would preferably be collapsible and/or removable to enable collapsing of the storage unit from the working position to the collapsed position thereof.

The unloading conveyor assembly of each storage unit can also take various foil is. Typically, the unloading conveyor assembly is located underneath the hopper bottoms. If the hopper bottoms are provided with a single central discharge, then the unloading conveyor assembly comprises a single unloading conveyor which is laterally centred in alignment with the discharge openings of the hopper bottoms. Alternatively, the hopper bottoms may include laterally spaced apart discharge openings as described above. In this instance, two laterally spaced apart unloading conveyors preferably span the full length underneath the system in alignment with respective ones of the laterally spaced apart discharge openings.

In yet a further arrangement, a single unloading conveyor may be provided beneath hopper bottoms having dual discharge openings to reduce the height profile of the hopper cones. The pair of discharge openings of each hopper bottom may be longitudinally opposed within a common row of discharge openings if using a single unloading conveyor.

Alternatively, the two discharge openings may be laterally opposed when using two unloading conveyors according to the illustrated embodiment.

In yet a further arrangement a single unloading conveyor may be provided on the base frame which can be shifted in the lateral direction between a right hand and a left hand configuration for alignment with all of the right hand discharge openings of the hoppers in one position and alignment with all of the left hand discharge openings of the hoppers in the other position. In the instance of an unloading conveyor which can be repositioned laterally, the repositioning may be accomplished by various actuated means including a winch system, hydraulic rams, wheels and rollers, or any suitable sliding support enabling powered or manual pushing of the conveyor between the two configurations.

In further arrangements, each silo may be arranged to discharge laterally to one side of the storage unit for discharging material onto a conveyor which runs alongside the storage unit instead of along the bottom of the storage unit within the boundaries of the base frame.

In addition to each hopper including one or more discharge openings therein, the discharge openings could be operated between open and closed positions by various means including manually operated valves, actuated valves or metering valves.

Similarly to the loading conveyor assembly, the unloading conveyors of the unloading conveyor assembly may also take various forms including screw conveyors with single drives or dual drives, drag conveyors, tubular drag conveyors, pneumatic conveying means or belt conveyors. As described above, the belt conveyors may include telescoping or shuttle conveyors, with or without tripping conveyor discharges, low-profile conveyors which may incorporate use of ultra high molecular weight materials or side wall belting, textured belts, or belts which are not rubber products including but not limited to chain belts.

If using belt conveyors, the belt is typically supported by a plurality of intermediate rollers below the upper run of the conveyor in which the rollers are located in close proximity to one another to substantially eliminate sagging between the rollers which in turn allows the belts to be restarted from a stopped position while under full load.

The discharge end of the unloading conveyors in some embodiments may be articulated for shipping. More particularly the discharge sections of the unloading conveyors may be dual articulated to enable folding up for storage while being long enough to feed the majority of blenders that customers are using. The articulating point can be actuated manually, by winch, or by a hydraulic or pneumatic rams for example. Once a conveyor discharge section is lowered down from its shipping position to an operating position it may be supported from the frame above, for example using tethers under tensile load, or a physical stand may be provided beneath the discharge section for supporting the discharge section at a selected one of multiple positions.

If using two unloading conveyors under the silos, a single discharge chute may collect material from both conveyors. The discharge chute may also be associated with a single conveyor under the silos. Typically, the discharge chute has a main collection chamber and then a swiveling discharge tube which would enable the material to be discharged through a range of 180 degrees, or 90 degrees in each direction from a central longitudinal axis of the storage unit. This arrangement is particularly useful in the following instances: (i) if a person was running the silo unit to feed into a second silo skid unit back to back, then that person could swivel it to discharge onto the conveyor on the next silo skid unit and would direct the flowable material either onto the left, centre or right conveyor positions as desired; (ii) a person could change where it discharges by pushing the swiveling portion to another position, for example to put it left, centre or right on the conveyor of the next silo skid unit; or (iii) if a person was trying to discharge granular material into another piece of material handling equipment, such as a hydraulic fracturing pressure pump blender unit, then the swivel portion would be raised or lowered and swiveled to feed the preferred discharge area on the other equipment.

The discharge chute may include an optional inlet on the top side thereof such that when two silo skid units are operating parallel to one another, use of a transverse or cross conveyor will enable material discharged from a second storage unit to be transferred into the discharge chute that is directly fed by a first storage unit. Thus, the cross conveyor can take flowable material from the unit further away from the user's blender and put it into one single point of discharge into the user's equipment.

The discharge of materials from the storage units may be self managing. This is typically accomplished by using various forms of sensors to detect the level within each blender such as a low-level sensor and a high-level sensor which act to make the silos discharge at a faster rate, a slower rate or stop discharging entirely. Level sensors could be either fixed to the blender, hung from the discharge chute, or hung from a conveyor stand by some fashion. They could be adjusted or set on site to match the user's blender and would tie into the controller programming that opens and closes the actuators or which speeds up and slows down the conveyors to react to the level of sand inside the user's blender, or initiates a conveyor shutdown sequence accordingly. For example, two mechanical rotating wheel style physical level sensors can be hung in the hopper to set a high limit condition and a low limit condition, thus signalling the storage unit to convey either more or less sand depending upon the conditions signalled. The system would be similar to the high limit sensor found on some types of silos. Alternatively, a radar style sensor could be used to measure the levels in the blender. In another arrangement a tilt sensor could be hung inside the blender which would signal full or not-full so as to enable the actuators to turn on and get back to the full level if not full. Lasers may also be set horizontally so that if the sand breaks a laser beam than the system knows it is full or empty at the appropriate measurement level and will trigger an increased discharge rate, a reduced discharge rate, or a shutdown sequence of the storage silos accordingly. A variety of other known level sensing systems could also be affixed to the blender or mounted on or hung from the discharge chute or the system, again with high and low level heights.

In yet a further arrangement, cameras can be used to capture image data at critical points within the system so that an operator can watch the operation and detect various conditions, enabling the operator to instruct the system to change speed or shut down. Alternatively, because of the funnel-shaped arrangement of the hoppers, image data from the cameras can be used in an automated, intelligent manner so that the controller can determine when sand comes to a certain width or a certain pinpointed camera angle. Once an appropriate condition has been detected within the image data this condition can be used as either a high limit or low limit condition detected by the controller to take further action. This may require multiple cameras per hopper, for example use of one camera to detect a high limit and use of another camera to detect a low limit. Positioning of the cameras so that they see a certain point may be required.

In order to improve operation of the storage unit or to facilitate remote operation, the storage unit may be equipped with cameras at various inspection points. For instance, the use of cameras at the silo discharge openings enables remote displays which permit the operator to control the opening or closing of the silo discharge actuators which is particularly useful to ensure a smooth transition of the material flow as one silo is emptying and another must be opened to start the discharge.

The controller is connected to a suitable operator interface with appropriate controls and human machine interface inputs to allow an operator to operate the system. The controller may be configured to use radio, cellular, wifi, satellite or other communication systems to be connected to data servers which would additionally enable an operator to operate the system remotely. These additional controls may or may not be integrated within the storage units.

The storage unit may also be equipped with flood lighting to light up the surrounding site and the storage equipment.

In addition to various automation sensors, various indicators can also be included on the system for indicating various conditions. An example of an indicator would be a level indicator to communicate the sensed level within each silo. The high level sensors within each silo are primarily for monitoring filling of the silo to generate a high limit signal when the silo is full which provides the controller sufficient time to shut down the loading equipment or simply for generating an alarm that allows an operator to shut down the loading equipment manually. The level sensing may be continuously measured to determine the top level of sand within each silo so that the measured level is reported to the controller continuously in real time. Low limit sensors may additionally be incorporated to provide the operator sufficient alert that the operator would need to switch bins, or such that the control of the discharge could be automated such that the low limit condition would initiate programming for the storage unit and adjacent storage units which are used in conjunction. Various forms of illuminated indicators may be provided externally on the storage silos which operate in response to the measured level. In one instance a series of independently illuminated lights are provided in a column extending vertically along the exterior of each silo in which the lights are lit up from the bottom end towards the top end in relation to the level of material within the respective silo. For example, the lights may be provided on the steel support rings at spaced apart elevations along the tubular wall assemblies so that illumination of each light indicates that the level of material within the silo meets or exceeds the elevation of that light. The lights are controlled automatically by the controller in response to the material level measured by the sensors within the silos. The volume or calculated weight information may alternatively be displayed on separate display mechanisms.

The storage units may be further provided with weighing mechanisms of various forms. These include optical weighing equipment, motor coil weighing equipment, belt scales, load cells and/or strain gauges on the hopper discharges. In this instance the operator could set a discharge rate on the conveyor and the system would weigh the material being discharge in real time and adjust the hopper actuators to open or close the discharge gates by varying amounts to ensure that the right amount of volume is discharged.

The storage units may be outfitted with dust collection connections to the silos or conveying systems, which can be connected to dust collectors or vacuum systems.

In further embodiments, the voided spaces within the boundary of the rigid framework not occupied by the circular tubular wall assemblies can be occupied by additional expandable compartments 150 that are generally triangular in shape to accommodate the shape of the voids. These additional compartments may be used for storage of other materials used in a hydraulic fracturing operation, for example frac chemicals which are handled on site, but in much lower volumes. Because some are liquid, it would be very different systems used to manage the loading and discharging of the materials. For example, honeycomb structures or a series of continuous tubes and the like may provide storage volume while the filling mechanisms may take the form of flexible piping. The discharge mechanisms would ideally incorporate flow meters to monitor the volume of liquid being discharged.

Turning now to the embodiment of FIGS. 17 through 21, the loading assembly supported on the upper frame may alternatively comprise an upper belt conveyor 200 and a lower belt conveyor 202 which are used for conveying particulate material into any selected one of the storage silos as well as for discharging the particulate material into the loading system of an adjacent storage system when multiple storage systems are connected in series with one another. In this instance, a suitable cover member 204 is provided on the upper frame at a location spaced above the top end of the storage silos to span substantially the full length of the upper frame across the top end of all three storage silos. The cover member also extends the majority of the lateral width of each storage silo with any remaining portion at the top end of each storage silo which is not covered by the cover member being enclosed by a suitable enclosure panel 206. In the illustrated embodiment, enclosure panels 206 are provided at the laterally opposed sides of each silo, however the majority of the top end of the storage silo between the enclosure panels remains fully open to the belt conveyors thereabove which are received between the open top ends of the storage silos and the cover member 204 thereabove.

The upper belt conveyor 200 in this instance spans the majority of the length of the storage system from an inlet end 208 that is centrally located above the first silo nearest the inlet end of the system to an outlet end 210 which is centrally located above the third silo nearest the outlet end of the system. An inlet hopper 212 is located directly above the inlet end of the upper conveyor 200. An inlet opening 214 is provided in the cover member in alignment directly above the inlet hopper such that material discharge from an adjacent elevator assembly can be discharged through the inlet opening 214 into the inlet hopper 212 above the inlet end of the upper belt conveyor. The inlet hopper may include discharge spouts integrally formed into the upper edge at laterally opposing sides of the hopper such that any material overflowing the inlet hopper will be directed by the spouts at laterally opposing sides of the hopper into the open end of the first silo therebelow.

The lower belt conveyor 202 in this instance is similar in length to the upper belt conveyor and is mounted to be longitudinally slidable in the longitudinal direction of the conveyor from a working position in which the inlet end 216 of the lower belt conveyor is in alignment at a central location above the second silo centrally located on the base frame and a transport position in which the lower belt conveyor is retracted longitudinally inward to position the inlet end 216 of the lower belt conveyor in closer proximity to the inlet end of the upper belt conveyor. In the working position, the opposing outlet end 218 of the lower belt conveyor protrudes longitudinally outward beyond the end of the base frame so as to be well suited for discharging into the inlet opening 214 of an adjacent system. In the transport position, the outlet end of the second lower belt conveyor is retracted longitudinally inwardly relative to the perimeter boundary of the storage system. The upper and lower belt conveyors are preferably oriented to be generally parallel to one another to extend at a common upward slope in the longitudinal direction from the inlet end to the outlet end thereof. The slope is selected so as to minimize the overall height required to accommodate the belt conveyors while providing sufficient height at the outlet end of the lower belt conveyor in the extended working position thereof to enable discharging of the outlet end into the inlet opening 214 of an adjacent system.

An intermediate hopper 220 may be located directly below the outlet end of the upper belt conveyor 200 in alignment with an intermediate location along the lower belt conveyor 202 directly therebelow. The intermediate hopper similarly includes discharge spouts formed at the upper edge of the laterally opposing side walls of the hopper such that any material overflowing the intermediate hopper will be directed by the spouts into the open top end of the third silo therebelow at laterally opposed locations on either side of the upper and lower belt conveyors.

Each of the belt conveyors can be operated in either one of two opposing directions of rotation depending upon the desired flow path of the materials and the selected storage silo where materials are to be directed. In one instance, the upper belt conveyor may be held stationary such that material loaded into the inlet hopper 212 will overflow and be discharged into the first storage silo. Alternatively, the upper belt conveyor may be operated so that the upper run extends in a reverse direction from the outlet end toward the inlet end to discharge particulate material into the first storage silo over the open ended inlet end of the belt conveyor. With the lower belt conveyor in the extended working position, the upper belt conveyor can be rotated so that the upper run is displaced toward the outlet end of the system while the lower belt conveyor is operated so that the upper run is displaced toward the inlet end of the storage system so that the material follows a flow path into the inlet hopper, along the upper belt conveyor to be deposited on the lower belt conveyor, and then along the lower belt conveyor to be discharged into the second storage silo over the inlet end of the lower belt conveyor. In a further arrangement, the lower belt conveyor can be held stationary while the upper belt conveyor is displaced forwardly towards the outlet end of the system along the upper run thereof such that material discharge into the inlet hopper is conveyed by the upper belt conveyor into the intermediate hopper where the material subsequently overflows for being directed into the third storage silo. In yet a further arrangement, both the upper and lower belt conveyors can be rotated so that the upper runs advance in a common forward direction from the inlet end toward the outlet end of the storage system so that the material is conveyed over the outlet end of the lower belt conveyor for discharging into the inlet opening of an adjacent storage system.

Figure 22:
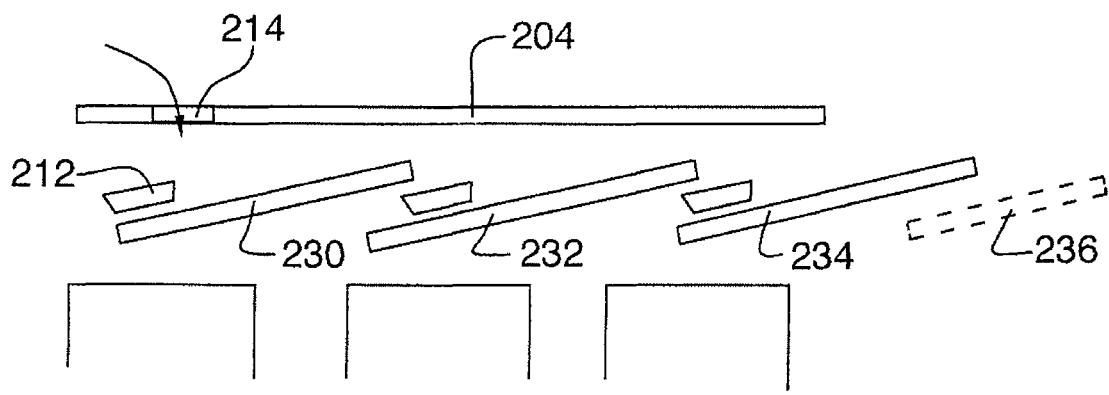
FIG. 22 is a schematic representation of the loading system according to a further embodiment of the storage system.

Turning now to FIG. 22, according to a further embodiment of the loading conveyor assembly, belt conveyors may again be used in the space between the cover member 204 and the open top end of the storage silos as described above; however, in this instance the belt conveyors include a first belt conveyor 230 having an inlet end over top of the first storage silo, a second belt conveyor 232 having an inlet end centrally located over the second storage silo, and a third belt conveyor 234 having an inlet end centrally located over the third storage silo in the working positions thereof. Once again the belt conveyors are at an upward slope from the inlet end to the outlet end thereof in which the outlet end of the first conveyor 230 is located at an intermediate location for discharging onto the second belt conveyor 232 and the outlet end of the second belt conveyor 232 is arranged for discharging onto the third belt conveyor 234 by being located above an intermediate location thereon. The outlet end of the third belt conveyor may protrude longitudinally outward beyond the end of the upper frame so as to be suitable for discharging into the inlet opening 214 of an adjacent system. In this instance, the inlet opening 214 is located at an intermediate location above the first belt conveyor 230. Operating the first belt conveyors so that the upper run advances forwardly causes material to be discharged over the outlet end onto the second belt conveyor, however operating the first belt conveyor in the reverse direction causes material to be discharged over the inlet end of the first belt conveyor 230 into the first storage silo therebelow. Likewise, the second belt conveyor can be operated so that the upper run advances forwardly and causes material to be discharged over the outlet end onto the third belt conveyor, however operating the second belt conveyor in the reverse direction causes material to be discharged over the inlet end of the second belt conveyor 232 into the second storage silo therebelow. The third belt conveyor can also be operated so that the upper run advances forwardly to cause material to be discharged over the outlet end thereof into the inlet opening of an adjacent system, however operating the third belt conveyor in the reverse direction causes material to be discharged over the inlet end of the third belt conveyor 234 into the third storage silo therebelow.

In a further variation of the embodiment of FIG. 22, an inlet hopper may instead be provided over the first belt conveyor 230 similarly to the inlet hopper 212 described above such that the first storage silo may be filled by keeping the first belt conveyor stationary and causing the overflow of material from the inlet hopper to fill the storage silo. Likewise, intermediate hoppers 220 may be provided at the outlet end of the first belt conveyor 230 and the second belt conveyor 232 in alignment with the second and third storage silos so that maintaining the second belt conveyor stationary causes material to overflow from the respective intermediate hopper into the second storage silo while maintaining the third belt conveyor stationary causes material to overflow from the respective intermediate hopper into the third storage silo.

In yet a further variation of the embodiment of FIG. 22, an additional discharge belt conveyor 236 may be provided as a fourth conveyor receiving material from the outlet end of the third belt conveyor 234 in which the fourth conveyor can be articulated or longitudinally retracted from a working position to a transport position to provide a greater reach for discharging into the inlet opening 214 of an adjacent system while being retracted for transport. If no additional discharge belt conveyor 236 is provided, then the third belt conveyor 234 would typically be an articulating or longitudinally retractable conveyor such that it can be retracted from a working position to a transport position.

Figure 23:
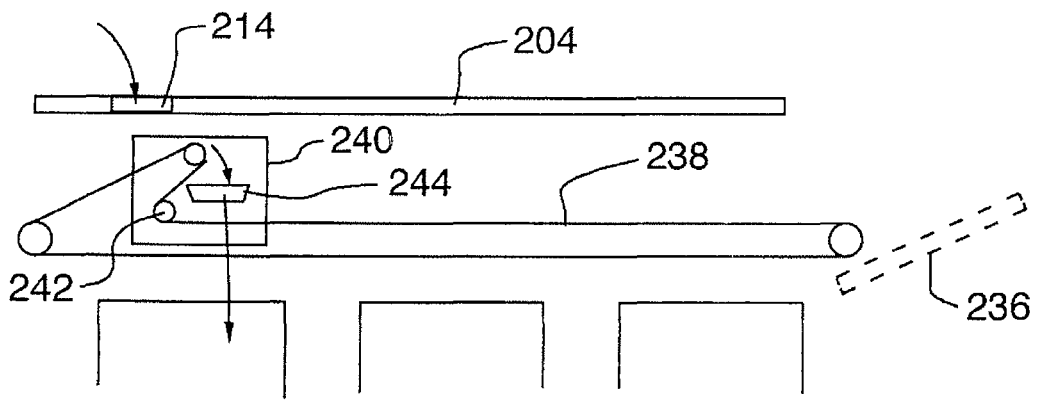
FIG. 23 is a schematic representation of the loading system according to yet another embodiment of the storage system.

Turning now to the embodiment of FIG. 23, a further embodiment of the loading conveyor assembly will now be described. In this instance, a belt conveyor is again used on the upper frame at a location between the open top ends of the storage silos therebelow and a suitable cover member 204 thereabove with an inlet opening 214 to receive particulate material from an adjacent elevator unit. In this instance a main belt conveyor 238 spans substantially the full length of the upper frame across the open top end of all three storage silos. A suitable tripper mechanism 240 is provided in the form of a cart carried on wheels for rolling movement longitudinally along rails spanning the full length of the upper run of the main belt on the upper frame. The tripper mechanism 240 includes a pair of intermediate rollers 242 supported thereon which cause the upper run of the main belt 238 passing through the tripper mechanism to follow an S-shaped path about the pair of intermediate rollers 242. A suitable collection hopper 244 is also carried on the cart immediately below the upper one of the intermediate rollers 242 so that material conveyed along the upper run falls off the upper curve of the S-shaped path onto the collection hopper 244 which then redirects the particulate material through laterally opposed discharged spouts to either side of the main conveyor for discharging into a selected one of the storage silos therebelow. In this manner, the main belt is always rotated in the same direction with the upper run advancing forwardly from the inlet end to the outlet end of the storage system but material can be unloaded from the upper run of the main belt at the location of the tripper cart. Accordingly locating the tripper cart over the first storage silo will cause material conveyed by the main belt to be discharged into the open top end of the first storage silo. Likewise locating the tripper cart over the second or third storage silos causes material to be discharged into the open top ends of the second and third storage silos respectively. The main belt in this instance may be used together with a discharge belt conveyor 236 at the outlet end of the upper frame. Locating the tripper cart at the outlet end of the main belt enables the tripper cart to discharge material onto the discharge belt conveyor 236 if it is instead desired to discharge material into the loading system of another adjacent storage system.

Figure 26:
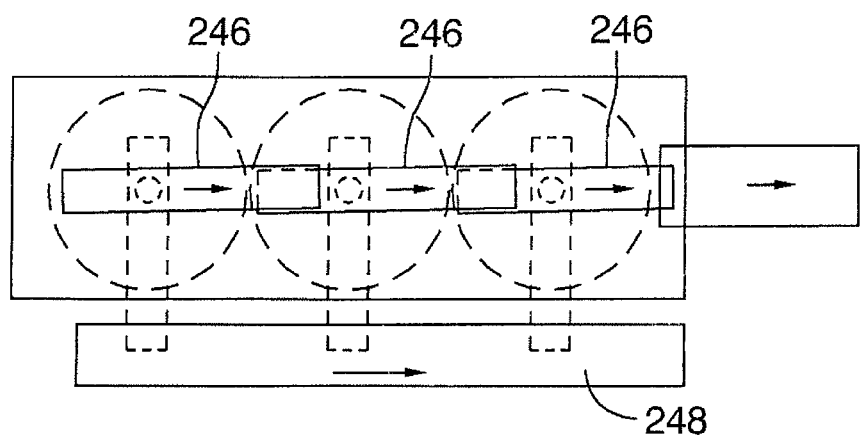
FIG. 26 is a schematic representation of the unloading system according to a further embodiment of the storage system.

Turning now to FIG. 26, a further embodiment of the unloading conveyor assembly will now be described. Similarly to the use of multiple belt conveyors for loading according to FIG. 22, the unloading system may also comprise a set of three belt conveyors 246 associated with the three storage silos respectively. In this instance each unloading belt conveyor 246 has an intermediate portion between the inlet and outlet end thereof that is located below the one or more discharge openings of the respective storage silo thereabove. Each of the unloading belt conveyors 246 is also oriented to extend at an upward slope from the inlet end to the outlet end thereof. The outlet end of the first unloading belt conveyor is located above the inlet end of the second unloading belt conveyor for discharging material from the first conveyor to the second conveyor. Likewise the outlet end of the second unloading belt conveyor is located above the inlet end of the third unloading belt conveyor for discharging material from the second conveyor to the third conveyor. The third unloading belt conveyor preferably protrudes longitudinally outward beyond the end of the base frame for discharging onto the inlet end of the first unloading belt conveyor of an adjacent system in the working position thereof. The third unloading belt conveyor may be longitudinally retractable into a transport position as described above with previous embodiments. Alternatively, the third unloading belt conveyor may unload into a discharge conveyor section which may be articulated or extendable for movement between an extended working position and a retracted storage position as described above with previous embodiments. In this manner, material discharged from the first storage silo onto the first belt conveyor is conveyed onto the second belt conveyor which receives material both from the first belt conveyor or the discharge of the second storage silo. Material is discharged from the second belt conveyor onto the third belt conveyor together with material discharged from the third storage silo. The material can then be discharged from the system either by the third belt conveyor or an additional discharge section of the lower conveyor assembly for discharging to an adjacent system, for discharging into a blender unit, or for discharging into a transport truck.

In a further variation of the embodiment of FIG. 26, each of the unloading belt conveyors 246 may be supported for pivotal movement about respective upright axes from a longitudinal configuration as described above to a lateral configuration illustrated in broken line in FIG. 26. In the lateral configuration, the unloading belt conveyors are rotated through an arc of 90° about an axis which is generally centred relative to the respective silo such that the same intermediate portion of the unloading belt conveyor remains aligned below the discharge openings of the respective storage silo thereabove; however, in the lateral configuration, the outlet end of each unloading belt conveyor is located laterally offset to one side of the base frame so as to be well oriented for unloading onto an auxiliary unloading conveyor 248 positioned to extend longitudinally alongside the base frame. In yet further arrangements, two parallel storage systems may be configured such that the unloading belt conveyors 246 may be arranged in the lateral configuration for discharging onto a longitudinally oriented conveyor below the storage silos of the adjacent system.

Figure 27:
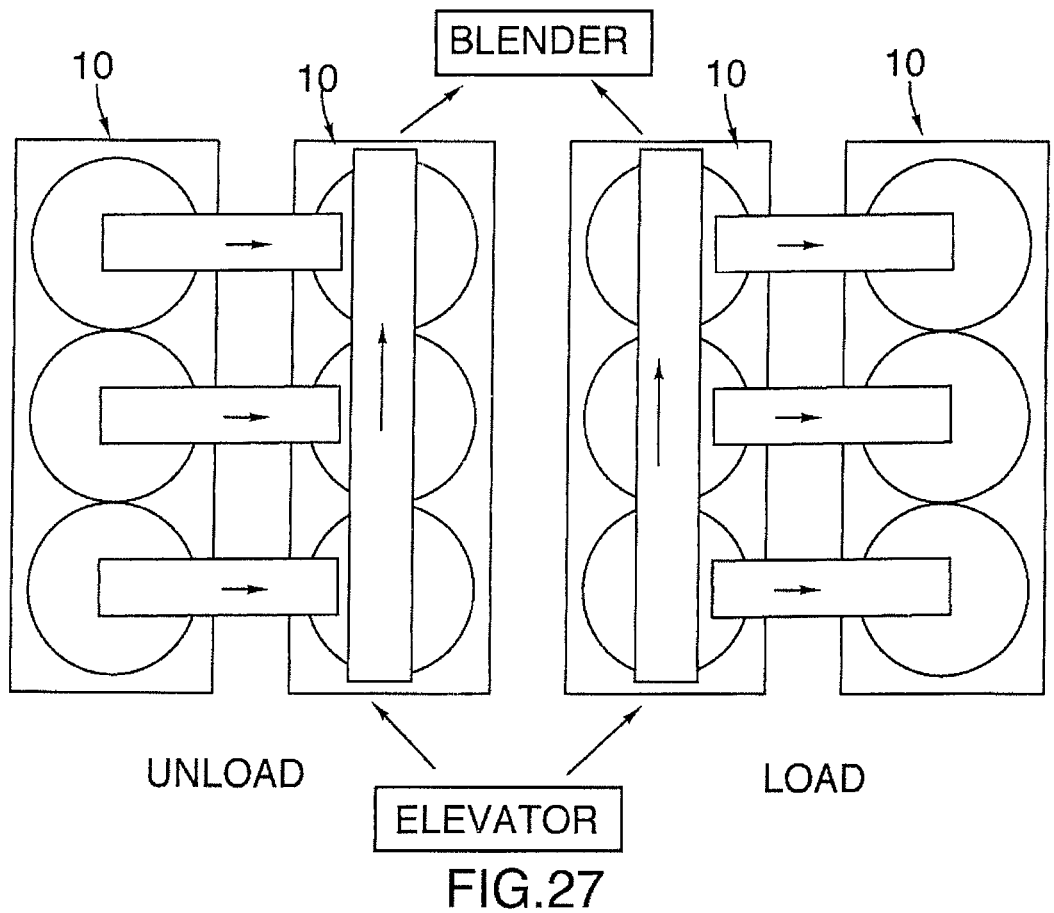
FIG. 27 is a schematic representation of the unloading system according to FIG. 26 in an alternate configuration.

Turning now to FIG. 27, the storage systems 10 may be configured such that the both of the unloading system and the loading system comprises a plurality of belt conveyors in which one unloading belt conveyor and one loading belt conveyor is associated with each storage silo. Each of the belt conveyors may be arranged for pivotal movement between a longitudinal configuration in which the conveyors are connected in series with one another as described in regards to FIG. 22 and FIG. 26, or in a lateral configuration in which the belt conveyors are configured to discharge in a lateral direction to one side of the base frame, also as represented in FIG. 26. In this instance, two storage systems may be supported on the ground laterally adjacent one another such that the longitudinal directions of the systems are parallel to one another. The belt conveyors of one of the units may all be configured in the lateral configuration for discharging into corresponding conveyors of the adjacent system. The adjacent system however may maintain their conveyors in the longitudinal direction, or in yet further embodiments a single longitudinal conveyor may be provided on the adjacent unit.

In the embodiment of FIG. 27, two adjacent system 10 are provided on the right side of the figure in which the conveyors of only the loading system above the silos are represented schematically, while two adjacent systems are provided on the left side of the figures in which the conveyors of only the unloading systems below the silos are represented schematically.

The innermost storage system 10 of each pair includes loading conveyor assemblies in the longitudinal configuration to receive material directly from a loading elevator at the inlet end and includes unloading conveyors also in the longitudinal direction to discharge material directly to a common blunder unit at the outlet end. The outermost storage system of each pair includes loading conveyor assemblies in the lateral configuration to receive material from corresponding longitudinally oriented loading conveyor assemblies of the corresponding innermost storage system. Likewise the outermost storage system of each pair includes unloading conveyors in the lateral configuration for discharging material laterally into corresponding longitudinally oriented unloading conveyors of the corresponding innermost storage system. In this manner, a large number of systems may be connected laterally in series with one another in addition to being connected longitudinally in series with one another simply by selecting the appropriate configuration of the loading and unloading conveyors.

In further embodiments, the tubular wall assemblies may include some rigid tubular sections formed therein in place of a portion of the flexible material of the tubular wall assemblies or in addition thereto. For example plural rigid tubular sections may be telescopically connected to form a portion of the boundary of the tubular wall assembly while another portion of the tubular wall assembly may be formed of flexible material. For instance, lower sections of the tubular wall assemblies may be formed of more rigid material to be more wear resistant and to accommodate greater loads whereas upper sections may be formed of lighter and/or more flexible material to reduce weight where less strength and wear resistance may be required. Regardless of the use of rigid tubular sections or flexible material sections, the rigid hoops described above may have utility when operatively connected for relative sliding along the telescoping posts of the frame assembly by providing greater tensile strength in the circumferential direction to the tubular boundary material and/or by providing lateral stability relative to the telescoping frame elements of the system.

Figure 28:
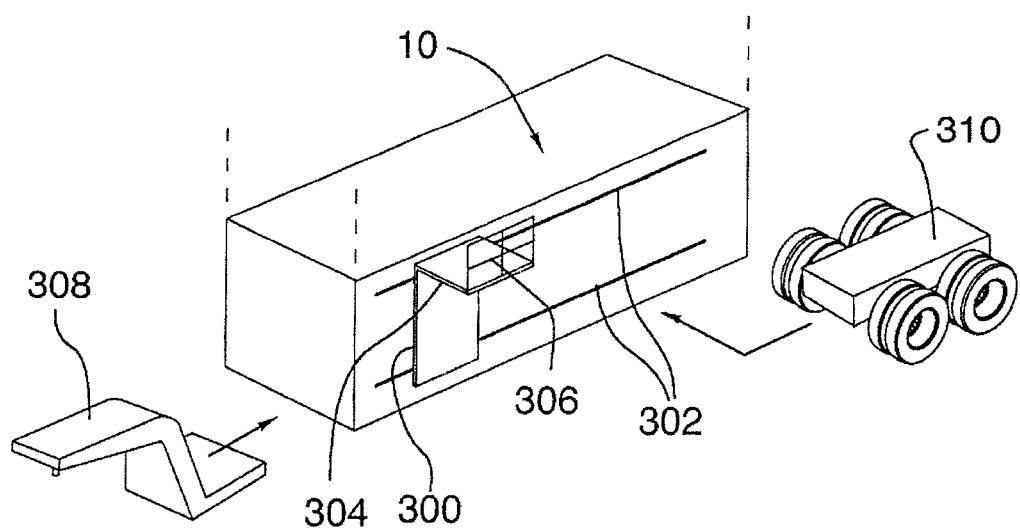
FIG. 28 is a schematic representation of an alternate configuration of the base frame.

Turning now to FIG. 28, the system may be provided with an operator platform which is supported for longitudinally sliding movement along one side of the base frame. More particularly a carriage frame 300 is supported on rails 302 on the base frame such that the carriage rolls or slides along the rails between opposing ends of the base frame. The operator platform comprises a platform frame 304 and a platform railing 306 which are supported on the carriage frame so as to be movable between a working position and a collapsed position in which the frame 304 and platform 306 are recessed inwardly towards the base frame in the collapsed position relative to the working position. More specifically, the platform frame 300 for may comprise a horizontally oriented structure in the working position which is hinged at the inner end on the carriage frame for pivoting downwardly against the carriage frame in the collapsed position. The railing 306 in turn can be pivotally coupled to the platform frame for movement between a working position extending vertically upward from the outer edge of the platform frame and a collapsed position also folded inwardly against the carriage frame in parallel with the platform frame.

Also shown schematically in FIG. 28, the system 10 may be further provided with a hitching device 308, for example a gooseneck style hitch or other suitable structure for connection to a towing vehicle, which is arranged to be mounted at one end of the base frame. A suitable wheel assembly 310 is also arranged to be mounted on the base frame at the opposite end relative to the hitching device 308 to support the base frame for rolling movement along the ground. In some embodiments, the wheel assembly 310 and the hitching device 308 may be integrally coupled in fixed relation to the base frame in the form of a trailer frame. Alternatively, one or both of the hitching device 308 and the wheel assembly 310 may be removably attached to the base frame so that they can be stored separately from the base frame when the base frame is in the working position at a site. In yet a further configuration one or both of the hitching device 308 and the wheel assembly 310 may be coupled to the base frame so as to be movable between a working position and a stored position. In the working position the wheel assembly supports the base frame for rolling movement along the ground, however in the stored position, the wheel assembly is raised upwardly relative to the base frame so as not to interfere with engagement of the base frame directly on the ground. In the working position, the hitching device 308 is arranged for coupling to a towing vehicle, however in the stored position, the hitching device is recessed inwardly toward the base frame relative to the working position so as to be less obstructive.

Figure 24:
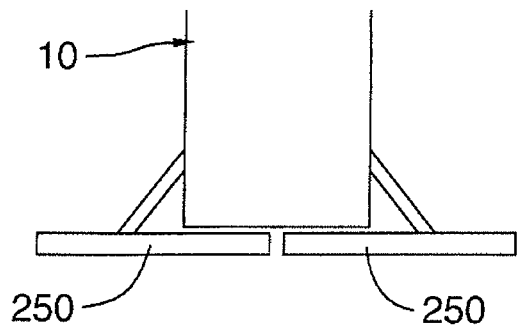
FIG. 24 is a schematic representation of the use of rigged mats to provide structural support to the storage system in a deployed position.

Turning now to FIG. 24, in some embodiments, the storage system may be used in combination with a plurality of rig mats in which the rig mats comprise structural panels 250 of rigid material which can be modularly connected and disconnected relative to one another to form large platforms of plural interconnected mats. In this instance, the base frame of the storage system may be placed on the structural panels or directly adjacent to the structural panels in a manner which enables rigid structural connection between the base frame and the structural panels. Suitable struts or anchoring cables of various forms may be used to interconnect the base frame of the storage system 10 and the structural panels. In this manner the structural panels both increase the footprint of the system to reduce localized ground pressure as well as providing the function of outriggers to provide greater stability to the storage system.

Figure 25:
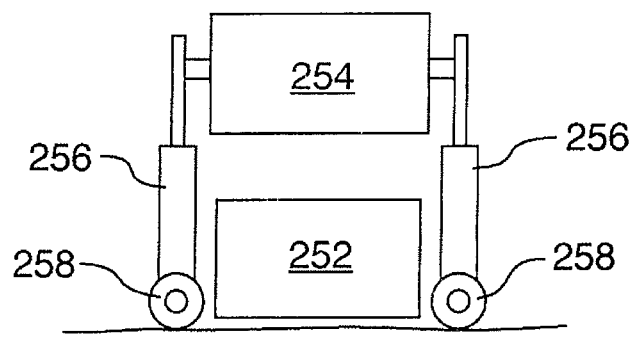
FIG. 25 is a schematic representation of a lifting system used for stacking modular sections of the storage system when the storage system is formed of stackable modular sections.

Turning now to FIG. 25, when the system 10 is formed in modular sections, for example including a first modular section 252 and a second modular section 254 which can be separated for transport but coupled to one another in a stacked configuration for use on site as described above, the system may further include an integral lifting assembly to assist in the stacking of the modular sections. When stacking a second modular section over top of a first modular section, a plurality of lifting legs 256 may be coupled to the second modular section in which each lifting leg includes a wheel assembly 258 supported at the bottom end thereof. In this instance, the lifting legs may be provided at spaced apart positions along each of the laterally opposing sides of the frame of the modular section for operation between a stored position in which the wheels are retracted upwardly relative to the bottom of the modular section, and a lifting position in which the lifting legs are extended telescopically below the bottom of the second modular section so that the wheels engage the ground and support the second modular section for rolling movement along the ground. The lifting legs can be extended to a sufficient height that the bottom end of the modular section can be lifted to a height greater than the height of the first modular section upon which it is to be stacked. In this manner, the first and second modular sections can be initially placed on the ground longitudinally in series end to end with one another. The user then extends the lifting legs 256 to elevate the second modular section relative to the first modular section to permit the second modular section to be rolled over top of the first modular section by rolling movement of the wheels along the ground. Returning the lifting legs to a stored configuration results in the second modular section being stacked upon the first modular section. In one example, the first modular section includes one or more silos supported thereon to define the silo system 500 and the second modular section includes the upper loading conveyors with discharges associated with each of the one or more silos to define the conveyor system 510. The second modular section can be used with the first modular section according to the configuration described herein, or can be used independently of the first modular section for co-operation with other storage silo configurations while remaining capable of being lifted and rolled overtop of the other storage silo configurations.

In further embodiments, a similar set of lifting legs may be coupled to the base frame of the storage system 10 according to any of the previous embodiments in which the lifting legs can be similarly extended from a stored position to a lifting position in which the bottom of the base frame is lifted to a sufficient height to enable a transport trailer to be received below the base frame. In the raised position, a transport trailer can be inserted below the base frame for loading the base frame onto the trailer or removed from the area below the base frame for unloading the unit from a trailer. Returning the lifting legs to a stored configuration permits the base frame to be either deposited on the ground or deposited onto the deck of the transport trailer.

In yet further embodiments, the same lifting assemblies used for raising the upper frame relative to the base frame can be operated in a first configuration coupled between the upper frame and the base frame for lifting the storage silos from the collapsed position to the working position thereof or operated in a second configuration in which the lifting assemblies are only coupled to the upper frame but the upper and base frames remain coupled and pinned relative to one another in the collapsed position. In this second configuration, extending the lifting assemblies causes the lifting assemblies to function as lifting legs to lift the base frame together with the upper frame relative to the ground to enable loading on to a transport trailer for example.

Various embodiments described herein achieve the same goal of creating an ultralight weight storage capacity creating high volumes of storage in a more transportable and compact manner than prior art systems.

Various flexible containment solutions can be used including use of waterproof flexible materials or heat resistant flexible materials which could accommodate receipt of hot particulate material.

The system can be collapsed to a low height for transport with options to either trailer the storage unit or use telescoping legs to raise and lower the storage unit on and off of low-profile trucks. Leveling systems may be incorporated into the base frame in the form of leveling jacks. Shims may be used for leveling.

The storage units are highly adaptable so as to enable set up in parallel, perpendicular or angled configurations to suit the site transport needs. Use of multiple loading or unloading conveyors together with parallel configurations of adjacent units provides numerous redundancy options.

When using belt conveyors as the loading conveyor assemblies, an open bottom on the conveyor housing in open communication with the open top of the storage silos therebelow prevents any sand build up beneath the conveyor resulting from sand particles falling from the lower run of the conveyor.

The storage units are highly scalable as additional unit can be readily added in a series configuration without requiring additional elevating equipment. This is accomplished by connecting the silo units using extendable loading and unloading conveyors to transfer material across multiple silo units.

Use of various types of level monitoring sensors and high limit sensors can be used to trigger a variety of automation options. This includes the automatic regulation of the material discharged into the auxiliary equipment using various automation sensors and/or controls.

Use of unloading conveyors spanning multiple silos within each unit allows discharging from one or more silos at a time while still controlling the discharge from each silo independently. This would permit blending of materials on the conveyors.

The conveyors can be designed with a close roller spacing to minimize sag and enable the conveyors to be restarted under full load of material thereon, without increasing component wear or increasing the horsepower demand to restart the fully loaded conveyor.

The system can be used with a variety of dust collection and containment systems including vacuum systems by providing containment skirting supported on the upper frame or the base frame to surround the conveying systems. The material used for dust containment including fabric and the like may be provided with a variety of releasable fasteners including hook and loop fasteners, zipper fasteners, magnets and the like which allow ease of detachment and reattachment to ensure easy access while still managing protection from dust and weather elements.

To provide accessibility to the system, various collapsing and expanding access systems for man access to the top conveyors on the upper frame may be provided in addition to collapsing stairs or rolling platforms suitable for transport.

Various components of the system may be further provided with sensors of a variety of types to provide early prediction of maintenance issues, allowing the operator to inspect, service or repair the components early before failure. The sensors may include heat or vibration type sensors which could be installed on various components including the top conveyors which fill the storage silos including the motors or the gearboxes thereof, or the bottom conveyors which feed the adjacent blender unit, including motors or gearboxes thereof as examples.

In addition to the optional use of structural panels for added stability of the system, screw anchors which enable anchoring of cables into the ground could also be used to enhance stability. In the instance of screw anchors, the anchors could pass through suitable openings in the structural panels forming the rig mats. The rig mats in this instance would be provided with custom-built openings to receive the anchors therethrough so that the cables connecting between the storage unit and the anchors are provided with a direct connection to the ground independent of the stability provided by the rig mats.

In further embodiments, the storage system 10 according to any of the previous embodiments may also include a base frame which integrally defines a trailer frame directly supported on wheel axles for transport between different sites instead of requiring the base frame to be loaded on a separate transport trailer.

Figure 29:
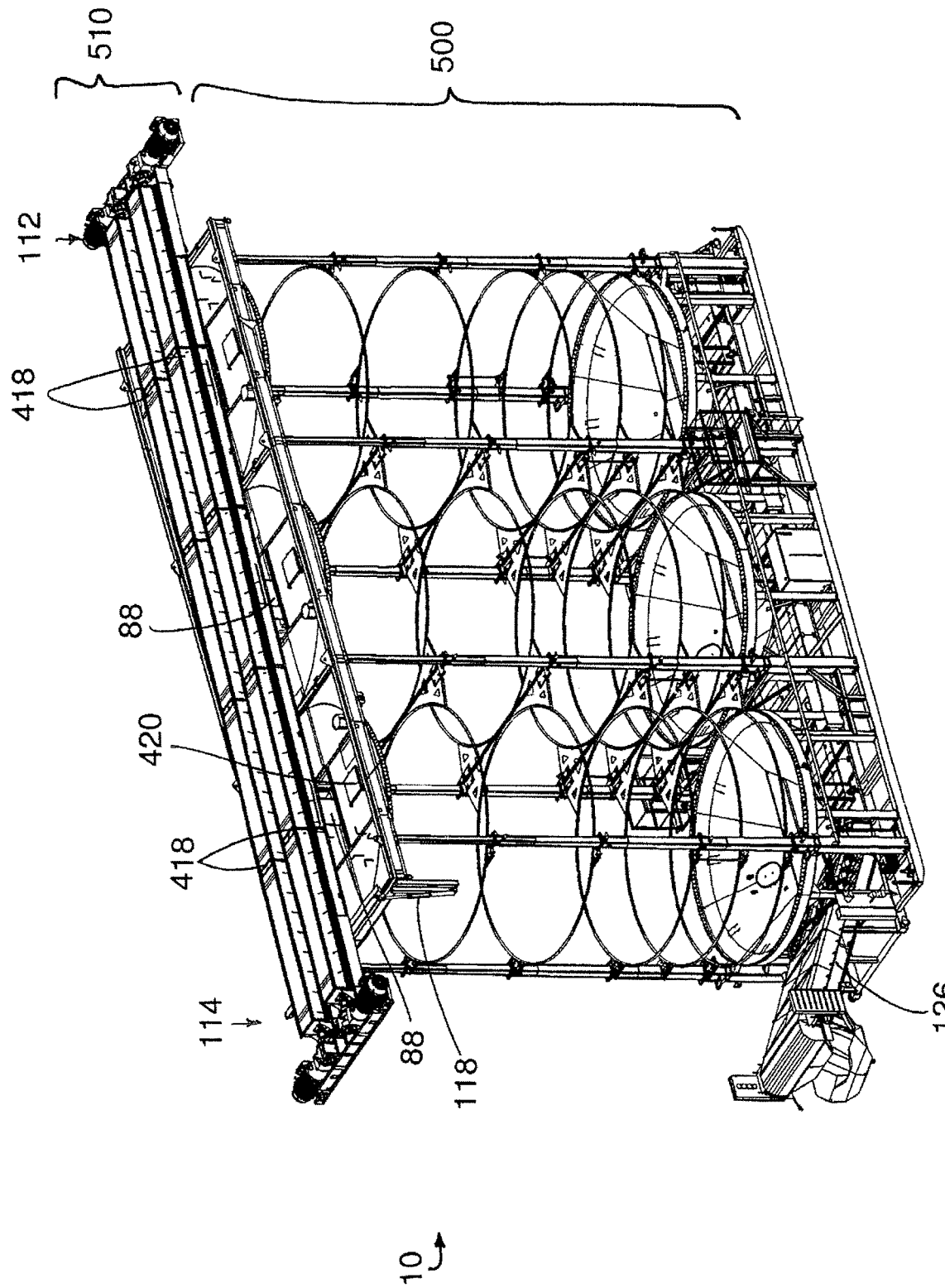
FIG. 29 is a perspective view of a further embodiment of the storage system shown in a working position in which the tubular wall assemblies have been removed for illustrative purposes.
Figure 30:
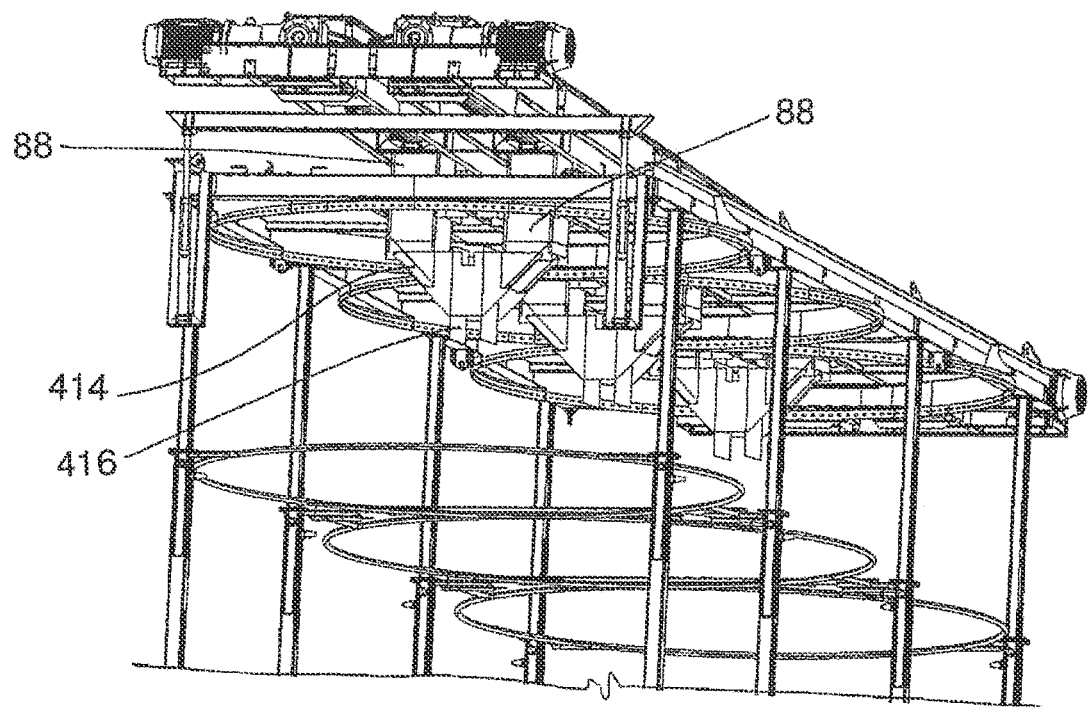
FIG. 30 is an enlarged perspective view of the inlet members for controlling and centralizing discharge of material from the loading conveyor assemblies into the storage silos of the storage system of FIG. 29.
Figure 31:
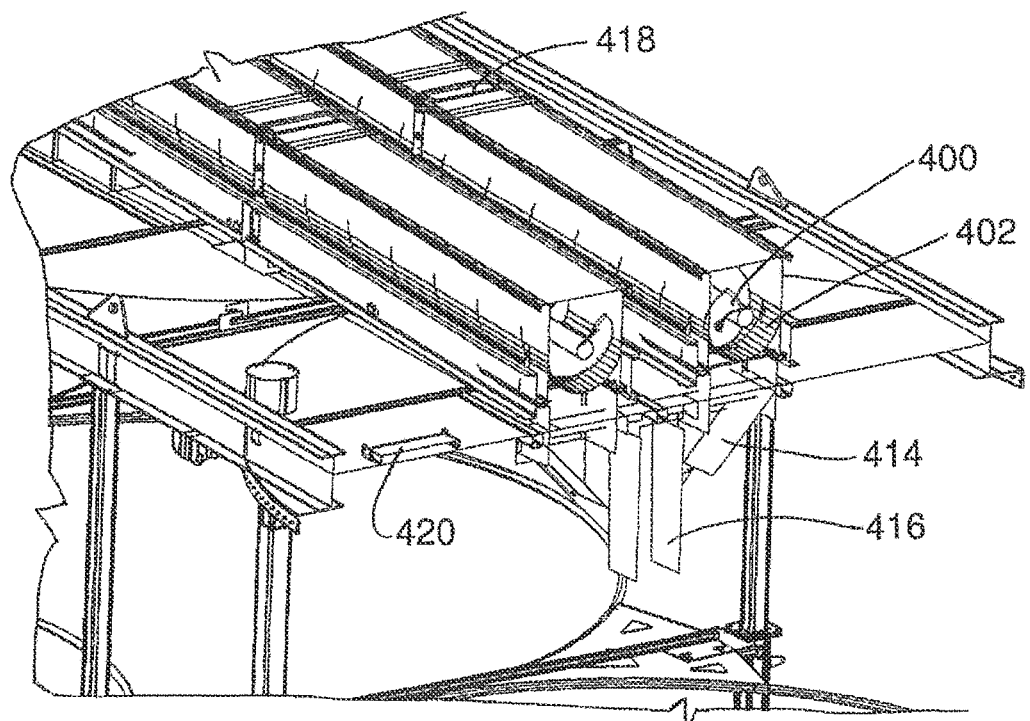
FIG. 31 is a partly sectional perspective view of the inlet members of FIG. 30.
Figure 32:
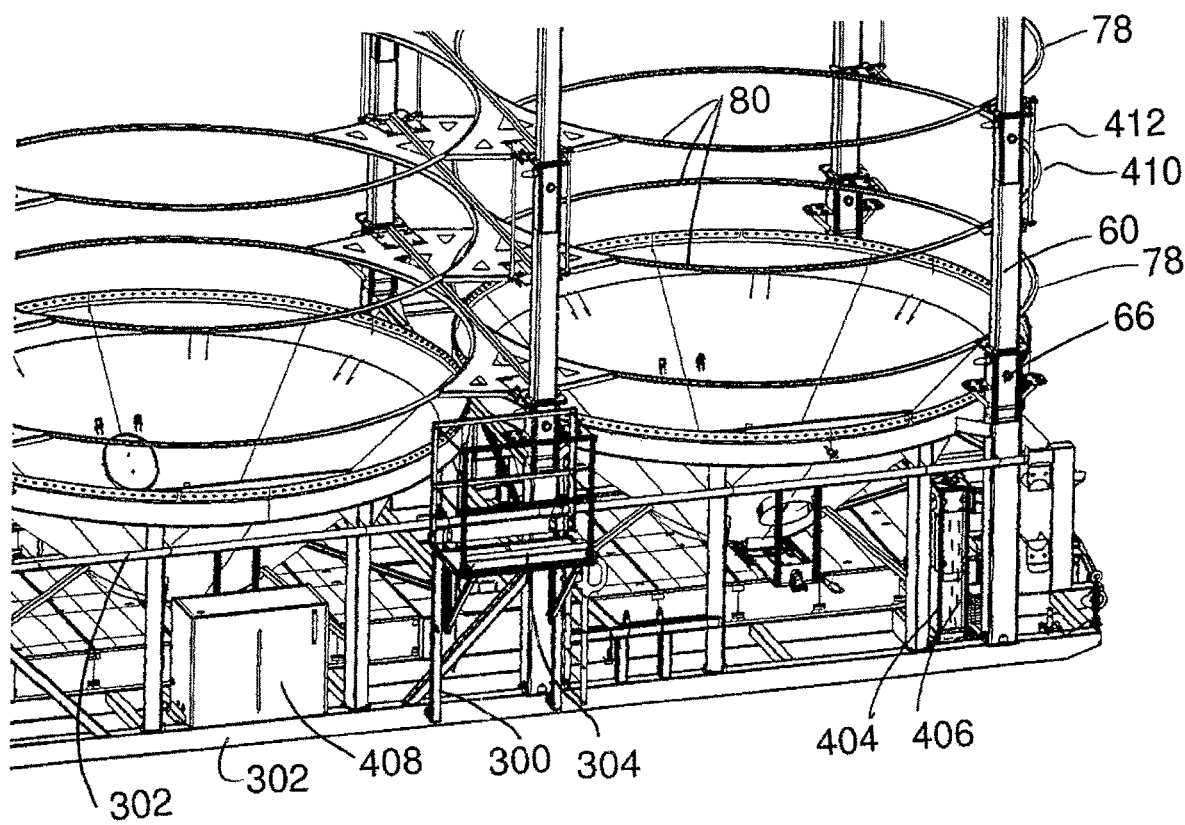
FIG. 32 is an enlarged perspective view of the lifting legs and the operator support platform according to the storage system of FIG. 29.
Figure 33:
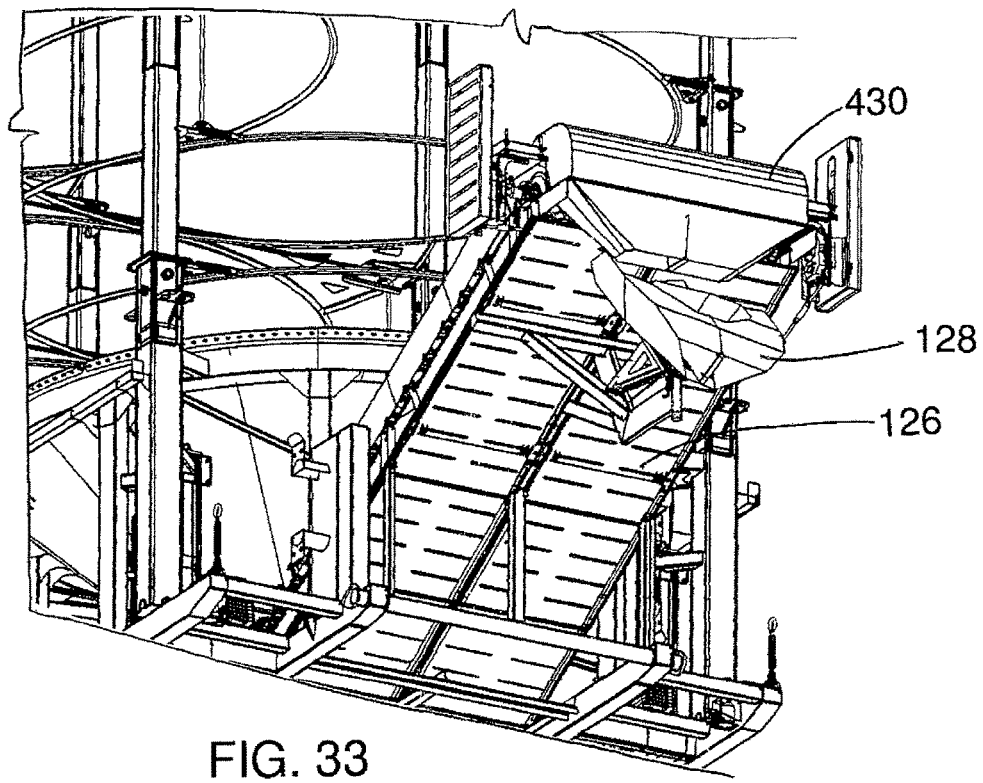
FIG. 33 is an enlarged perspective view of the discharge section and collection hopper at the outlet end of the storage system according to FIG. 29.
Figure 35:
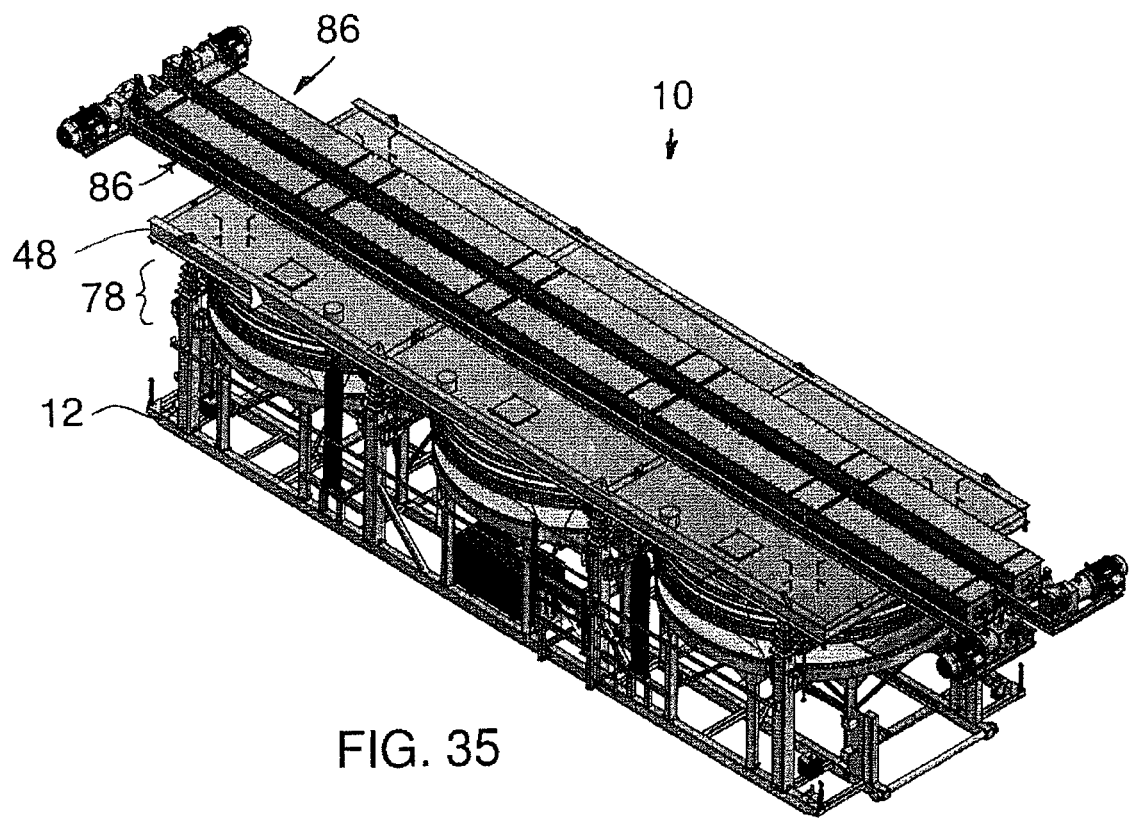
FIG. 35 is a perspective view of the storage system according to FIG. 29 in a transport position in which some of the elements such as the lower conveyor assemblies have been removed for illustrative purposes.
Figure 34:
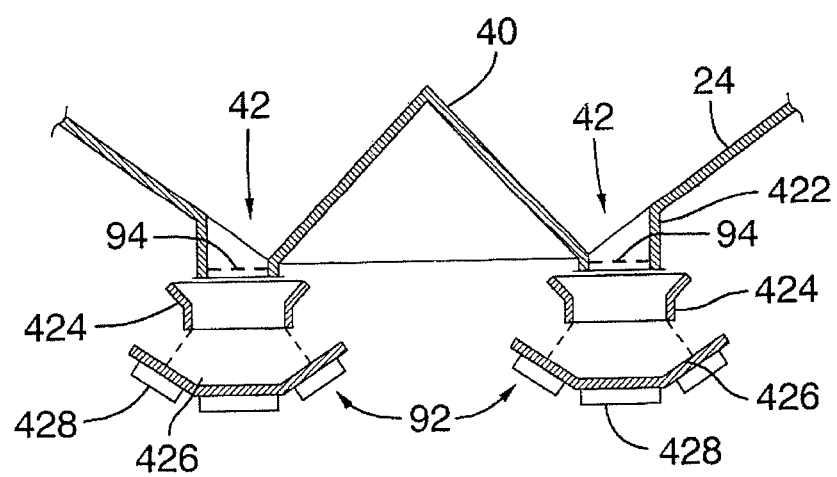
FIG. 34 is a schematic representation of the communication of the discharge outlets with the lower conveyors in the storage system according to FIG. 29.
Figure 36:
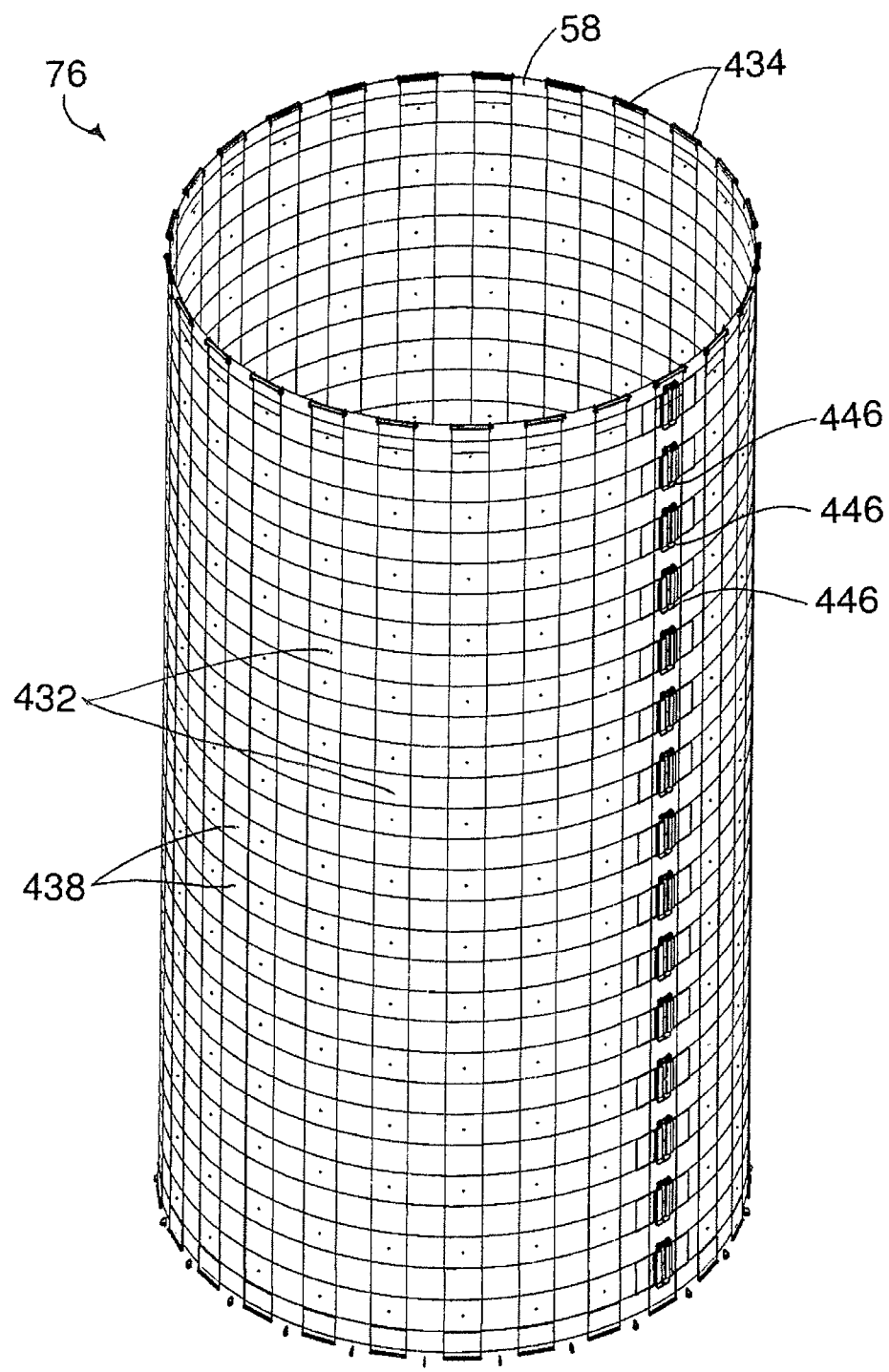
FIG. 36 is a perspective view of the tubular wall assembly of one of the storage silos according to the storage system of FIG. 29.

Turning now to the embodiment shown in FIG. 29, the storage system 10 in this instance again comprises a similar arrangement of a base frame 12 supporting a hopper cone 24 thereon with an upper frame 48 movable relative to the base frame using telescopic posts 60 to extend and collapse the tubular wall assemblies 68 forming the upper portions of respective storage silos. Intermediate frames 78 that include respective hoops to provide circumferential support to the tubular wall assemblies are again extended and collapsed relative to the base frame as the upper frame is displaced between the working and transport positions thereof. The tubular wall assemblies are shown in FIG. 36 separated from the upper frame and base frame of FIG. 29 for illustrative purposes. The upper conveyors 86 in this instance comprise two auger conveyors having an auger 400 rotatable within an auger housing 402 to convey material from the inlet end 112 to the outlet end 114 thereof, or to discharge material at a selected intermediate location along the conveyor corresponding to one of the storage silos. More particularly, as described in previous embodiments, the inlet of each silo of the respective storage unit is in communication with the auger housing 402 through a controllable gate, thus permitting the conveyor to discharge into the first gate which is in an open position or to the outlet end 114 if all of the gates are closed. The lower conveyors 92 in this instance comprise two belt conveyors extending longitudinally alongside one another from the inlet end 122 to the outlet end 122 thereof. Similar to previous embodiments, the belts of the lower conveyors each extend along a main section 124 in communication with the discharge openings of each of the storage silos along the length of the base frame and a discharge section 126. The discharge section 126 extends upwardly at an incline for discharging through a respective discharge chute into a collection hopper 128 supported for pivotal movement relative to the base frame about a vertical swivel axis similarly to previous embodiments. Also similarly to previous embodiments, an operator platform is provided in the form of a carriage frame 300 supported for longitudinal rolling movement along rails 302 on the base frame with an operator platform 304 being supported on the carriage frame including a railing 306 for safely supporting an operator on the platform.

In the embodiment of FIG. 29, a set of four lifting leg assemblies are provided on the base frame at the four corners of the frame respectively. Each lifting leg assembly includes a sleeve 404 supported in fixed relation to the base frame which is open to the bottom end thereof for receiving a respective lifting leg 406 therein such that the lifting leg is vertically slidable between a stored position in which the bottom end of the lifting leg is near or above the bottom end of the base frame and a lifting position in which the bottom end of the lifting leg extends spaced below the bottom end of the base frame to support the base frame spaced above the ground. A suitable hydraulic actuator may be incorporated into the lifting leg to actuate movement of the lifting leg between storage and lifting positions thereof. As described above with regard to previous embodiments, the lifting leg assemblies can used for assisting in loading the storage system onto a trailer.

A suitable hydraulic assembly 408 is supported on the base frame which includes a suitable motor for driving hydraulic pumps to generate a flow of pressurized hydraulic fluid that can be directed through appropriate valves and controllers to control actuation of various hydraulic equipment on the unit. The hydraulic pumps may be operated by electric motors which can be driven using a site supply of electricity; however included generator motors can be used to provide sufficient electricity to operate the hydraulic assembly to accomplish basic functions of the lifting legs for unloading the unit from a trailer or actuating extension of the upper frame from the transport position to the working position thereof during initial set up before a site supply of electricity is available. A single hydraulic assembly on one unit may provide sufficient power for initially setting up operation of an adjacent unit of similar configuration.

In the illustrated embodiment according to FIG. 29, the telescopic posts 60 include a base sleeve 62 fixed onto the base frame and multiple additional sleeves 64 that are telescopically received within the base sleeve. In the illustrated example, four of the intermediate sleeve sections of each post are rigidly connected to a respective one of the intermediate frames 78 at the top end thereof. In this manner, as the telescopic posts are retracted, the top ends of all of the sleeve sections are situated in close proximity to one another such that the intermediate frames 78 are in turn stacked directly adjacent to one another adjacent the top of the hopper cones 24; however as the posts are extended, the top ends of all of the sleeve sections are extended and spaced apart from one another such that the intermediate frames are supported at corresponding spaced apart positions along the height of the storage silos. Suitable pins 66 are again provided for securing adjacent sections of the post extended relative to one another in the working position.

One auxiliary intermediate frame 410 is provided at an intermediate location between the two lowermost intermediate frames 78 by suspending the auxiliary intermediate frame 410 from the intermediate frame thereabove instead of being rigidly connected to one of the sections of the support post 60. More particularly, the auxiliary intermediate frame comprises a similar arrangement of rigid hoops 80, however the brackets that would otherwise couple the intermediate frames to each of the respective posts 60 instead are formed for relative sliding along the respective post. A series of flexible members 412 are coupled between the corner brackets of the auxiliary intermediate frame 410 and the corresponding brackets of the intermediate frame 78 thereabove. In the working position, the auxiliary intermediate frame 410 is suspended by the flexible members under tension, however as the storage system is collapsed into the transport position, the flexible members 412 are collapsed as the auxiliary intermediate frame 410 is stacked together with the other intermediate frames 78. The corner brackets of the auxiliary intermediate frame are shaped around each of the post such that the mating profile of the brackets and the posts enables the auxiliary intermediate frames to be supported and aligned in the longitudinal and lateral directions of the base frame relative to the hopper cones 24 while the auxiliary intermediate frame remains freely slidable relative to the post 60 in the vertical direction.

In the embodiment of FIG. 29, rigid paneling 54 on the upper frame 48 again encloses the top ends of the storage silos, however suitable openings are provided in the paneling for communication of the upper conveyors 86 with each of the storage silos. More particularly, each upper conveyor 86 includes a suitable discharge opening in the housing 402 of the conveyor which is aligned with a corresponding duct or tube 88 communicating through a corresponding opening in the paneling 54. The branch ducts 88 in this instance communicate independently through the roof of each silo before being redirected inwardly by a corresponding set of baffles 414 which redirect flow to a centralized chute 416 centrally located relative to the tubular wall assembly within the interior of the silo. Suitable discharge gates 90 control the discharge of material from each upper conveyor to each silo at the communication of the branch tube 88 through the bottom wall of the conveyor housing 402. As described in previous embodiments, in this instance a height actuator 118 is again located in proximity to the outlet end of the upper conveyors for raising the upper conveyors into an inclined position so as to be suitable for a cascading configuration with another storage system of identical configuration positioned in series therewith if desired. In this instance, the ducts or tubes 88 in communication between the upper conveyors in the respective openings in the top wall of the respective silos may be formed of telescoping sections to be adjustable in length or may be adjusted by simply replacing individual duct sections with different lengths of duct sections to enable the ducts to be adjustable in height.

The use of two upper conveyors 86 again provides a degree of redundancy in the event of any failure of any components. To provide further redundancy, the housing 402 of each upper conveyor 86 may be further provided with an access opening 418 with a removable cover thereon which may be in alignment with the corresponding discharge gate 90 that each conveyor uses for communication with each silo therebelow. When the cover of a selected access opening 418 is removed, the discharge chute from an elevator assembly may be directed into the access opening 418 with the gate 90 of the associated silo therebelow being opened so that material can flow directly through the housing 402 of the upper conveyor even if the auger 400 is not rotating due to the upper conveyor not being operational. To provide yet further redundancy, the paneling 54 enclosing the top side of each storage silo may be further provided with an auxiliary opening 420 with a respective removable cover panel thereon at a location which is offset from either of the upper conveyors. When the cover panel is removed from the auxiliary opening 420 associated with any one of the storage silos, material can be discharged from an adjacent elevator assembly directly into a selected one of the storage silos, again if the upper conveyors are not operational.

The hopper cones 24 are again configured as in previous embodiments with a divider 40 which separates the discharge material towards two laterally spaced apart discharge openings 42. Each discharge opening is provided with a respective gate 94 which is operable between open and closed positions relative to the discharge opening. A discharge collar 422 directly communicates with the respective discharge opening 42 and locates the discharge gate 94 therein. An intermediate collar 424 is suspended below each discharge collar with the upper rim of the intermediate collar being situated above the angle of repose of any material being deposited into a pile below the discharge collar 422 to prevent spillage of material through the gap between the discharge collar 422 and the intermediate collar 424. The intermediate collar 424 associated with each discharge opening 422 includes a bottom opening which in turn lies in sufficiently close proximity to an upper surface of the upper run of a belt 426 supported on rollers 428 which define the lower conveyors 92 so that an angle of repose of material deposited onto the lower conveyors from the bottom openings of the intermediate collars 424 will not spill over the edges of the belt 426 of each lower conveyor.

As noted above, the two lower conveyors 92 in this instance comprise belt conveyors with main sections 124 extending along the bottom of the base frame and discharge sections 126 which are inclined upwardly and outwardly beyond the outlet end of the base frame. A discharge chute receives material discharge from the outlet end of the discharge sections 126 of the lower conveyors which gathers each discharge material centrally to a laterally centred outlet which in turn deposits the material into the collection hopper 128 therebelow which is supported on a swivel to redirect the discharge of material therefrom as may be desired depending upon the location and/or orientation of downstream equipment.

Figure 37:
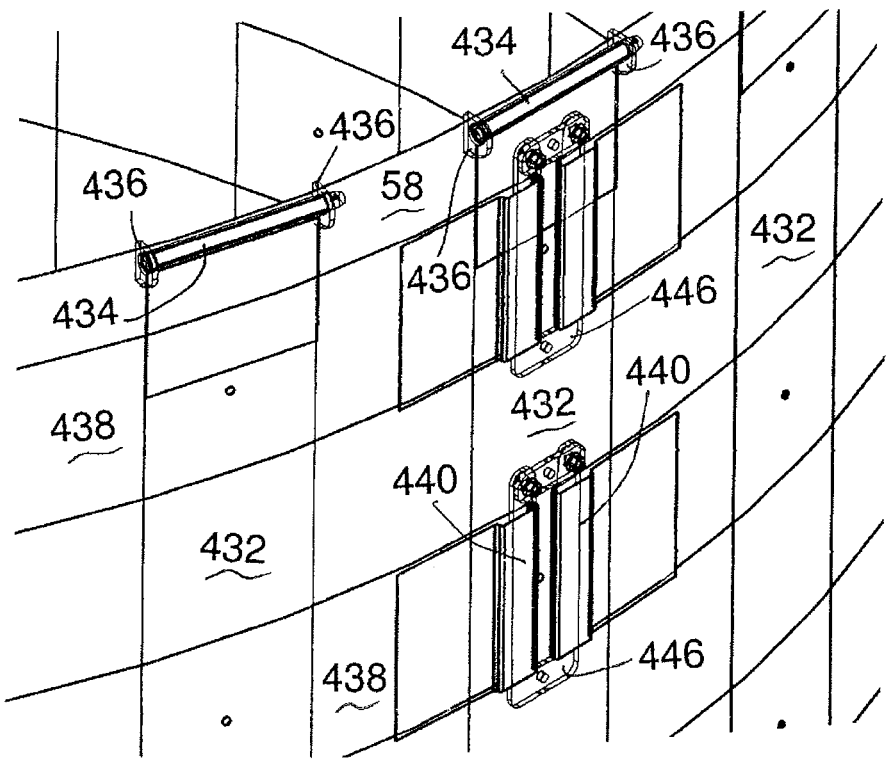
FIG. 37 is an enlarged perspective view of a portion of the tubular wall assembly of FIG. 36.

Turning now to FIGS. 36 and 37, the second layer 76 of reinforcing material that surrounds the liner 70 of the tubular wall assembly 68 according to any of the previous embodiments will now be described in further detail. The reinforcing layer in this instance includes a plurality of longitudinal straps 432, each spanning the full height of the tubular wall assembly, such as at evenly spaced apart positions, in the longitudinal direction. In the illustrated embodiment, each longitudinal strap may be approximately 12 inches in width with a corresponding 12 inch spacing being provided between each adjacent pair of longitudinal straps in the circumferential direction. Each longitudinal strap is formed with a loop sewn into the top end thereof which is used for securing the strap to the upper rim 58 of the respective storage silo on the upper frame 48.

In one embodiment, at the connection of each longitudinal strap to the upper rim 58, a horizontal support pin 434 is selectively received through apertures in a pair of mounting flanges 436 fixed onto the upper rim at a spacing corresponding to the width of the strap. The pin 434 includes a head at one end and a releasable connector at the opposing end to selectively retain the pin extending between the two flanges 436 while being received within a corresponding loop at the top of the respective longitudinal strap 432 with which it is associated. Removal of the pin from the loop of the longitudinal strap and the flanges 436 on the upper rim of the upper frame remits the longitudinal strap to be separated from the upper frame.

The reinforcing layer also includes a plurality of circumferential straps 438 in which each circumferential strap is located at a respective elevation to extend substantially the full circumference of the tubular wall assembly between two opposing ends 440 of the circumferential strap. For example, each circumferential strap may be approximately 12 inches in width with the vertical space between adjacent straps being approximately 12 inches to form a square grid together with the longitudinal straps 432. Each circumferential strap is joined to each longitudinal strap at the intersection thereof using stitching and/or mechanical fasteners penetrated therethrough. Both of the opposing ends of each circumferential strap also includes loops integrally formed therein, for example by stitching to enable an annular link 446 to be selectively received through both loops at the ends 440 of each circumferential strap so that the circumferential strap forms a complete hoop about the tubular wall assembly. Each link forms a closed loop using threaded fasteners such that the link can be released from the loops of the respective circumferential strap at any time if desired. The ends of all circumferential straps are aligned with one another along a common vertical axis such that the corresponding annular links are all accessible at a common location along one side of the resulting tubular wall assembly.

To enable the conveyors to operate at full capacity when comprising augers rotatable within respective auger housings, the augers 400 are supported within the respective housings 402 by respective bearing assemblies 448 which are provided with some form of deflecting member to deflect the conveyed material away from the bearing members to extend the operating life thereof. In one example shown in FIG. 40, a hanger bracket 450 is fixed relative to the housing 402 to support a bearing member 452 thereon which in turn rotatably receives a portion of the shaft of the auger rotatably therethrough. More particularly, two adjacent auger sections may be coupled by a shaft connecting member fastened between the open ends of two shaft sections of the auger as illustrated. In this instance the shaft member between the two shaft sections is rotatably supported within the bearing member or bushing 452. The bushing is fully surrounded by the hanger bracket 450 that is fixed relative to the auger housing. A bearing casing 454 is supported on each of the two shaft sections of the auger shaft for covering axially opposing ends of the bushing 252. More particularly, each casing member 454 protrudes circumferentially beyond and overlaps inwardly in the axial direction over the respective end of the bushing 452. A resilient sealing material 455, for example Teflon or a packing of felt and the like is contained in a ring within each casing in a sealing relationship with a surface of the hanger bracket surrounding the bushing and/or in sealing relationship with a respective external face of the bushing 452 to prevent entry of debris into the gap between the auger shaft member and the bushing 452 within the hanger bracket 450. In this instance, the casing 454 rotatable with each shaft section forms the deflecting member to deflect material away from the bushing 452.

Figure 40:
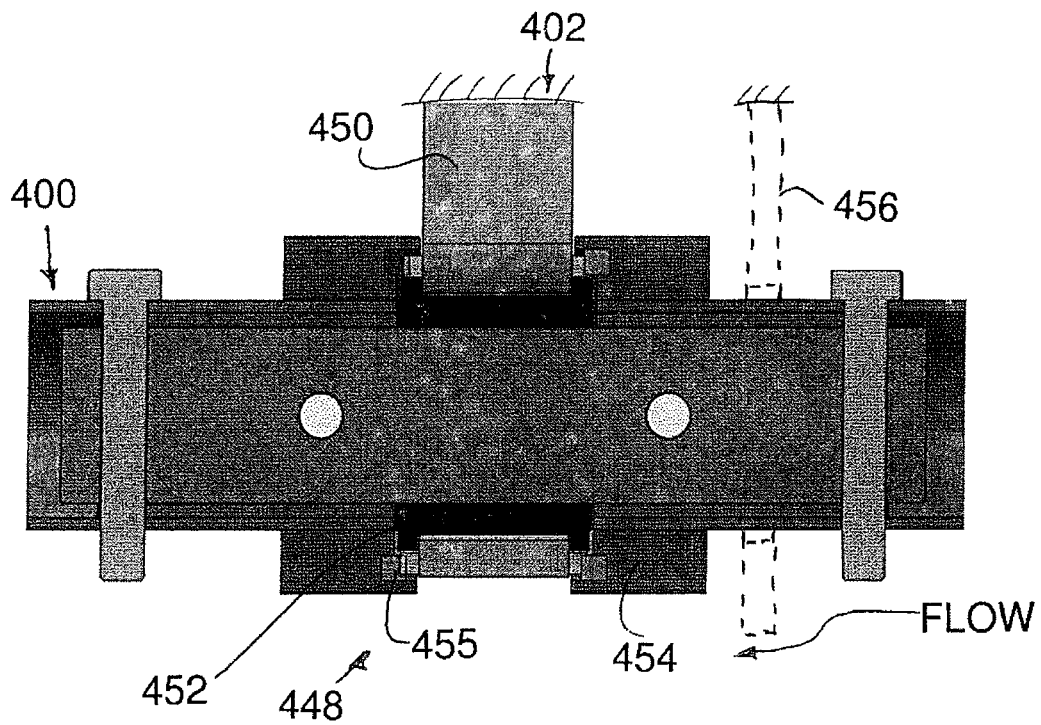
FIG. 40 is a sectional view of one of the bearings of the upper and/or lower conveyors according to the storage system of FIG. 29 in which an additional variant of the bearings is illustrated in broken line.

In addition to the casing 454, as shown in broken line in FIG. 40 the bearing assembly may be further protected by providing a deflecting member in the form of a rigid plate 456 which is supported in fixed relation to the auger housing 402 to fully surround the shaft of the auger 400 in close proximity to the upstream side of the bearing assembly. This instance flow is directed around the rigid plate 456 as it approaches the bearing assembly so that the rigid plate deflects some of the flow of conveyed material away from the bushing member 452.

Figure 41:
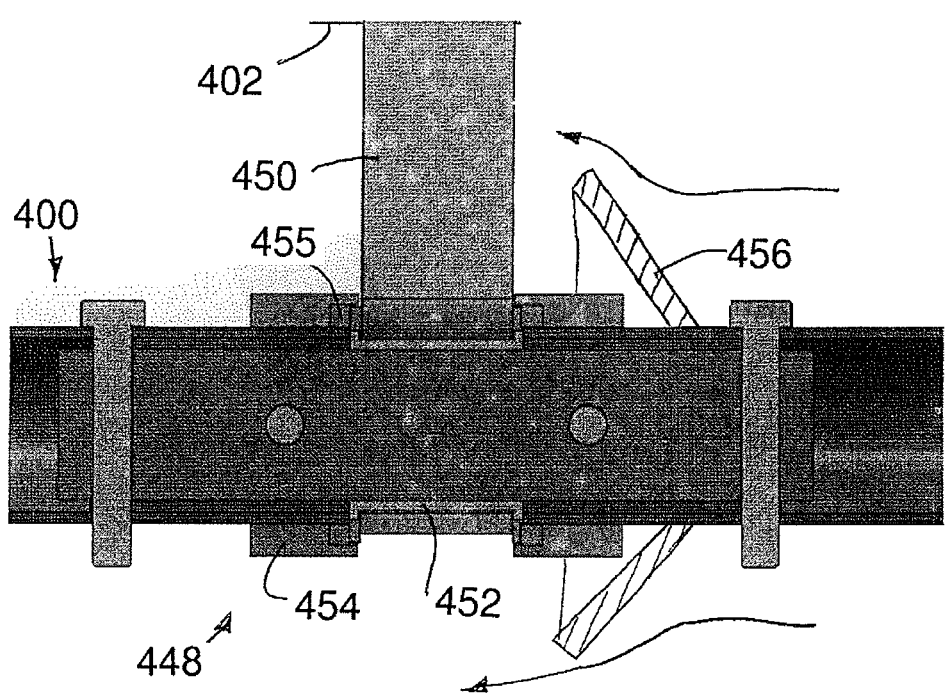
FIG. 41 is a sectional view of an alternative arrangement of the bearings of the upper and/or lower conveyors according to the storage system of FIG. 29.
Figure 42:
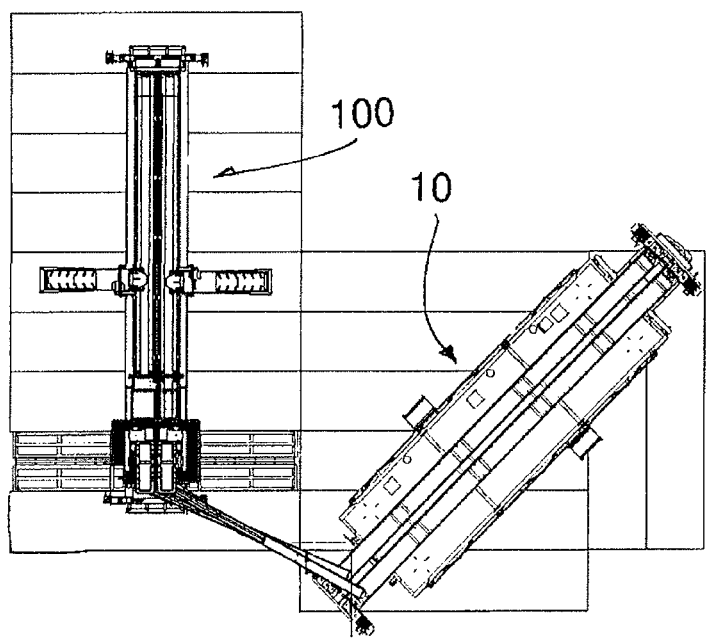
FIGS. 42, 43, and 44 illustrate exemplary site layouts of the storage system cooperating with an elevator assembly.
Figure 43:
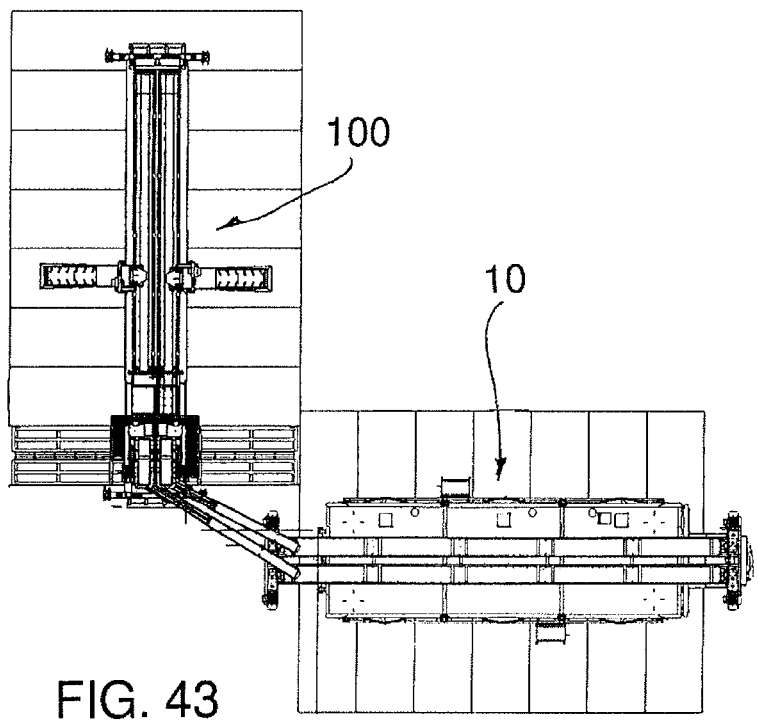
Figure 44:
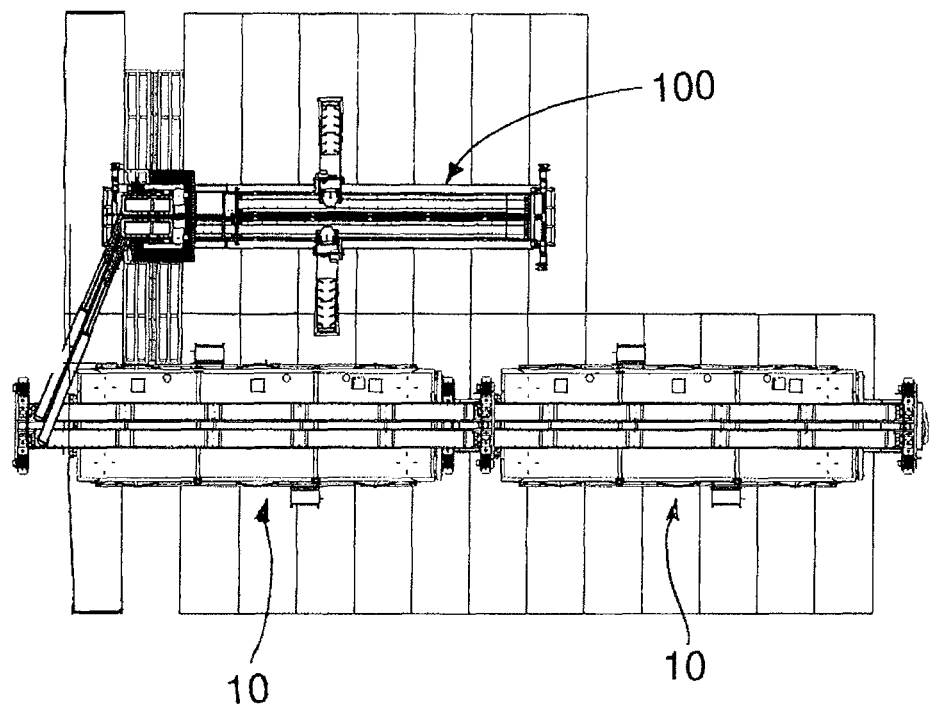

In an alternative arrangement shown in FIG. 41, in addition to the casing 454, a deflecting member in the form of a rigid cone 458 may be mounted in fixed relation to the shaft of the auger 400 at the upstream side of the bearing assembly. The cone is oriented to be concentrically aligned with the auger shaft to extend radially outward from the shaft of the auger at a slope oriented in the flow direction to at least partially surround the casing 454 of the bearing assembly. In this manner, flow of conveyed material by the auger again encounters the deflecting member before the bearing assembly so that the deflecting member redirects the flow of conveyed material away from the bushing 452.

Any of the embodiments noted above may be readily used for powdered materials substantially in the form described. In a preferred arrangement for use with powdered materials a system of air injectors communicates with the interior of each silo in proximity to the discharge outlets of the hopper cones to assist the flow of material towards the discharge outlets. In addition, the discharge collar in communication with each discharge opening 42 may be connected to an airlock assembly 460 of the type conventionally used in the handling of powdered materials. The airlock assembly 460 in turn communicates with the lower conveyor 92 of the storage system to further convey the powdered materials downstream in the usual manner. The air injectors would typically include a supply line 462 communicating through the hopper wall or through the tubular wall assembly from a suitable supply external of the storage silo to the interior of the store silo. The supply lines 462 in turn communicate with the air injectors 464 located internally within the storage silo. Each air injector may comprise any suitable duct or envelope which is perforated in a manner which allows the escape of air from the supply line into the interior of the silo while minimizing the opportunity for powdered material to escape through the supply line 462. In one example, the air injectors comprise air pads inserted into the hopper in which porous or fine mesh filter materials are used to distribute the air into the hopper. In an alternative arrangement, a liner comprised of two sandwiched fabrics may be provided along the interior of the hopper wall in which one of the fabrics is a tighter mesh than the supermesh so that air would come out of it into the interior of the silo. Once discharging into the airlock assembly 460, the material can then be collected by a pneumatic blower and pipe to convey the powdered material to the blender unit, or the airlock assembly can discharge material with a screw or air slide to convey the powdered material into a blender unit.

Figures 38, 39:
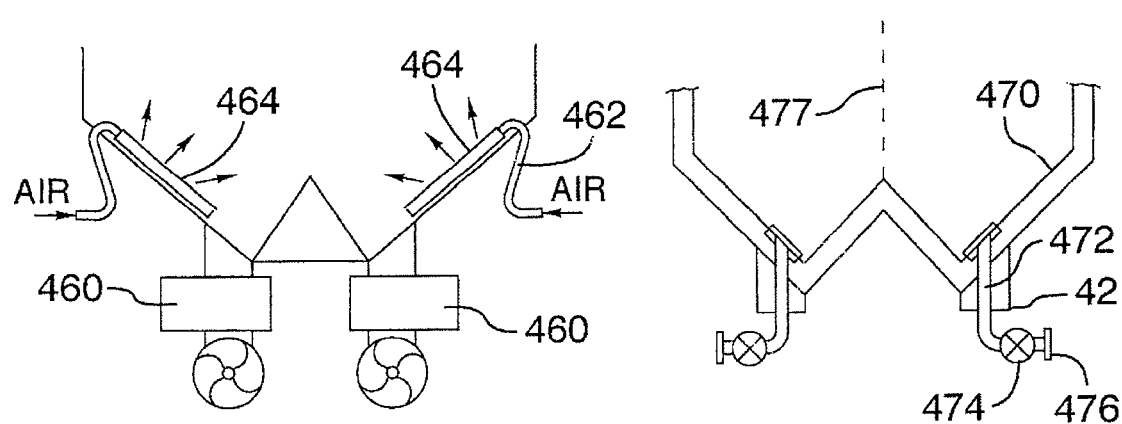
FIG. 38 is a schematic representation of a modified version of the storage system to aid in storage and discharging of powdered materials.
FIG. 39 is a schematic representation of a modified version of the storage system to aid in storage and discharging of liquid materials.

Any of the embodiments noted above may also be readily used for storing and discharging liquid materials with minor modifications according to FIG. 39. In this instance a liner 470 is provided of a flexible waterproof material which fully lines the hopper cone and the tubular wall assembly thereabove of each silo. An outlet line 472 is connected in sealed communication through the liner 470 at the location of each discharge outlet 42 such that the outlet line can communicate externally of the storage silo through the discharge opening 42. The outlet line would typically be connected in series with a shut off valve 474 and terminate at a suitable pipe flange 476 or other quick-attach connector such as a camlock connector for connection to suitable downstream equipment. The insert liner for liquid materials could be fabric or other materials which are impervious to liquids. The discharge actuator gates would be opened to enable the discharge lines to be communicated through the discharge openings 42. Quick connection points on the line could go tie into a flow meter and pump system. The liner may discharge on the opposite side of the normal conveyor location and the live connection to the quick connect would likely be removed prior to shuttling the conveyor to be operated on that side. In some embodiments, the liner within each silo may include divider members 477 or partitions. These divider members 477 may be formed of the same flexible material as the liner. Further these divider members 477 may be integrally joined with the outer boundary walls to form a unitary liner structure therewith. The partitions separate the liner into separate containment portions for storing liquid therein in isolation from the other containment portions. Each separated containment portion communicates through one of the discharge openings 42 using its own dedicated outline line 472 as described above.

Any of the above noted embodiments may be arranged to be lifted from the collapsed or transport position to the raised and working position by a variety of means. Hydraulic lift cylinders may be incorporated into the structure of the frame in preferred arrangements. Other methods for erecting may include scissor structures, or other folding structures. In other instances, reinforcement structure may be provided by tilt up or swing up frames in place of the telescoping posts to provide stability in addition to hydraulic lifting rams. The tension cables 100 noted above provide support to stiffen and straighten the frame once erected. The cables may also be used to provide stability while lifting.

Once erected, grounding equipment may be installed in addition to lightning rods which articulate and fold down for shipping but are connected to grounding pins in the ground once erected.

To ensure containment of dust and prevent environmental contamination to the material being conveyed, various flexible tarps and enclosures can be provided on the frame to fully surround each transfer point from conveyors to silos and from silos to conveyors for example. In some instances, cables may be tensioned on the frame for use in mounting or hanging tarps for dust control. In other instances, releasable magnets or other releasable fasteners may be used to secure tarps and other flexible enclosures to reduce potential for water or contaminants to get into the material being conveyed. The flexible tarps may be provided with transparent viewing panes therein to enable various transfer points to be visually monitored without requiring removal of the dust control abilities of the tarp.

When multiple units are provided in proximity to one another, a single hydraulic assembly and powerpack may be used to erect one or both units and operate the components thereof. There is an option to have a detachable hydraulic pack to accomplish erecting the unit and also assist in offloading the equipment from trucks or for repositioning them on site using the lifting legs for example. When two storage systems are provided in parallel to one another, a single operator platform may be used to access pins in the telescoping legs of the two adjacent units. The adjacent units may also be attached together with additional frame structures such as interconnecting frame members between the upper frames or the base frames thereof for added stability and for shared use of access ladders or roof access walkways and railings and the like.

Although various examples of lower conveyors having a main section and a discharge section are illustrated herein, in some embodiments the discharge section 126 may be separable from the main section to permit nesting below the silos alongside the lower conveyors in a transport position. The separate discharge conveyor may also be longitudinally retracted into the base frame between the lower conveyors and the hopper cones thereabove into a storage position for transport.

In further embodiments, the lower conveyors may comprise various types of conveyors other than the belt conveyors illustrated herein, including auger conveyors, pneumatic conveyors, gravity discharge chutes and the like.

When transporting the unit, various protruding equipment including the operator support platform, handrails along roof walkways, and protruding conveyor components can all be folded, retracted, or otherwise displaced inwardly towards the collapsed frame of the storage unit to minimize the overall dimensions of the storage unit for transport.

Also, in addition to the various sensors noted above, the storage system may further include a display monitor supported on the base frame or another location which is visible to operators in the vicinity for displaying various sensed data. The sensed data includes data from level sensors, and loading rates of upstream or downstream equipment, in addition to the discharge rate of material from the silos. This allows the discharging of material from any one silo to be readily controlled in response to downstream conditions of downstream equipment. The storage levels of the storage silos can also be communicated to other equipment for taking appropriate actions to refill the silos as required. When it is desired to discharge a continuous flow of material from the storage system, the system may initially discharge material from a first one of the storage silos; however when the bin sensors detect that the level inside the actively discharging silo reaches or falls below a lower level threshold, the system may automatically begin discharging from a subsequent storage silo that has a higher level of material in it while ceasing to discharge from the storage silo which has reached the lower level threshold.

Since various modifications can be made in my invention as herein above described, and many apparently widely different embodiments of same made, it is intended that all matter contained in the accompanying specification shall be interpreted as illustrative only and not in a limiting sense.

The invention claimed is:

1. A collapsible storage system for flowable material, for use with an auxiliary system which is identical in configuration to the storage system, the storage system comprising:
   a base frame;
   an upper frame supported above the base frame such that the upper frame is movable relative to the base frame between a collapsed position and a working position in which the upper frame is spaced upwardly in relation to the collapsed position;
   at least one storage silo comprising:
      a discharge mechanism supported on the base frame comprising a rigid wall extending downwardly from an upper perimeter edge to a bottom end locating at least one discharge opening therein; and
      a tubular wall assembly extending from a bottom end connected to the upper perimeter edge of the discharge mechanism to a top end connected to the upper frame so as to be extendable in overall height relative to the base frame with the upper frame between said collapsed position and said working position, in which a hollow interior of said tubular wall assembly is in open communication with the discharge mechanism to define the storage silo in the working position thereof;
   wherein said at least one storage silo comprises a plurality of storage silos supported on the base frame in a longitudinal row;
   wherein the storage system further comprises an unloading conveyor assembly extending along the base frame in a longitudinal direction of the longitudinal row in communication with each of the storage silos; and
   wherein the unloading conveyor assembly protrudes longitudinally outward from at least one end of the base frame such that the unloading conveyor assembly is arranged for discharging onto the unloading conveyor assembly of the auxiliary system when the storage system and the auxiliary system are positioned longitudinally end to end with one another.

2. The storage system according to claim 1 further comprising a plurality of intermediate frames at respective intermediate locations between the discharge mechanism of said at least one storage silo and the upper frame in the working position, each intermediate frame comprising a rigid support hoop extending about a circumference of the tubular wall assembly of said at least one storage silo in which the intermediate frames, and a plurality of telescopic support posts each comprising a plurality of telescoping sections connected between the base frame and the upper frame, each intermediate frame being supported on respective one of the telescoping sections of the telescopic support posts.

3. The storage system according to claim 1 wherein the tubular wall assembly of said at least one storage silo comprises a continuous liner membrane defining an inner surface of the tubular wall assembly and a second layer of reinforcing material having a higher tensile strength than the liner member surrounding the liner membrane between the top and bottom ends of the tubular wall assembly and wherein the continuous liner member is disconnected from and suspended in floating relationship to the second layer of reinforcing material.

4. The storage system according to claim 1 wherein the tubular wall assembly of said at least one storage silo includes a flexible continuous liner membrane defining an inner surface of the tubular wall assembly in which a bottom edge of the liner membrane includes a bead extending about a perimeter of the wall assembly and wherein the discharge mechanism of the silo includes a clamping member selectively clamped against a corresponding surface of the discharge mechanism at the upper perimeter edge of the discharge mechanism such that the line membrane is received therebetween and such that the bead is retained below the clamping member.

5. The storage system according to claim 1 further comprising two loading conveyor assemblies supported on the upper frame to extend longitudinally alongside one another in which each loading conveyor assembly is in communication with each of the storage silos.

6. A collapsible storage system for flowable material comprising:
- a base frame;
- an upper frame supported above the base frame such that the upper frame is movable relative to the base frame between a collapsed position and a working position in which the upper frame is spaced upwardly in relation to the collapsed position;
- at least one storage silo comprising:
  - a discharge mechanism supported on the base frame comprising a rigid wall extending downwardly from an upper perimeter edge to a bottom end locating at least one discharge opening therein; and
  - a tubular wall assembly extending from a bottom end connected to the upper perimeter edge of the discharge mechanism to a top end connected to the upper frame so as to be extendable in overall height relative to the base frame with the upper frame between said collapsed position and said working position, in which a hollow interior of said tubular wall assembly is in open communication with the discharge mechanism to define the storage silo in the working position thereof;
- wherein said at least one storage silo comprises a plurality of storage silos having respective discharge mechanisms supported on the base frame in a longitudinal row, the storage system further comprising two unloading conveyors supported on the base frame to extend longitudinally alongside one another in which each discharge mechanism is arranged to discharge material onto each of the unloading conveyors.

7. The storage system according to claim 1 wherein the discharge mechanisms of the storage silos define respective hoppers supported on the base frame and wherein each hopper comprises a conical outer wall supported on the base frame by a plurality of support legs at circumferentially spaced apart positions about a perimeter of the hopper cone in which an end pair of the supports legs at each of the opposing sides of the hopper cone in the longitudinal direction of the base frame being spaced apart from one another at a greater distance than a distance between remaining ones of the support legs, and wherein an unloading conveyor extends longitudinally along the base frame between the support legs of each end pair of support legs.

8. The storage system according to claim 1 wherein the unloading conveyor assembly comprises a main section spanning the longitudinal row of discharge mechanisms and a discharge section receiving material from the main section and protruding beyond one end of the base frame to an outlet end thereof, the outlet end being adjustable in height relative to the main section.

9. The storage system according to claim 8 wherein the unloading conveyor assembly comprises two unloading conveyors extending parallel and alongside one another, each unloading conveyor including a main section spanning the longitudinal row of discharge mechanism so as to be arranged to receive material from each of the discharge mechanisms, the main sections discharging onto a common discharge section that protrudes beyond the end of the base frame so as to be adjustable in height relative to the main sections at the outlet end thereof.

10. A collapsible storage system for flowable material, for use with an auxiliary system which is identical in configuration to the storage system, the storage system comprising:
- a base frame;
- an upper frame supported above, the base frame such that the upper frame is movable relative to the base frame between a collapsed position and a working position in which the upper frame is spaced upwardly in relation to the collapsed position;
- at least one storage silo comprising:
  - a discharge mechanism supported on the base frame comprising a rigid wall extending downwardly from an upper perimeter edge to a bottom end locating at least one discharge opening therein; and
  - a tubular wall assembly extending from a bottom end connected to the upper perimeter edge of the discharge mechanism to a top end connected to the upper frame so as to be extendable in overall height relative to the base frame with the upper frame between said collapsed position and said working position, in which a hollow interior of said tubular wall assembly is in open communication with the discharge mechanism to define the storage silo in the working position thereof;
- wherein said at least one storage silo comprises a plurality of storage silos supported on the base frame in a longitudinal row extending in a longitudinal direction;
- wherein the storage system further comprises a loading conveyor assembly extending along the upper frame in the longitudinal direction in communication with each of the storage silos; and
- wherein the loading conveyor assembly protrudes longitudinally outward from at least one end of the base frame such that the loading conveyor assembly is arranged for discharging onto the loading conveyor assembly of the auxiliary system when the storage system and the auxiliary system are positioned longitudinally in series with one another.

11. The storage system according to claim 10 wherein the loading conveyor assembly is longitudinally retractable relative to the base frame.

12. The storage system according to claim 10 wherein the loading conveyor assembly is arranged to be supported on the upper frame to extend at an upward inclination from an inlet end to an outlet end of the loading conveyor assembly.

13. The storage system according to claim 12 wherein the loading conveyor assembly is supported on the upper frame so as to be adjustable in height at the outlet end relative to the inlet end of the loading conveyor assembly.

14. The storage system according to claim 1 further comprising, a loading conveyor assembly supported on the upper frame for loading said at least one silo, the loading conveyor assembly comprising at least one belt conveyor having a lower run in open communication the hollow interior of said at least one silo therebelow.

15. The storage system according to claim 14 further comprising a cover member spanning over said at least one storage silo, the loading conveyor assembly being received between the cover member and an open top end of said at least one storage silo.

16. The storage system according to claim 1 wherein said at least one storage silo comprises a plurality of storage silos, further comprising an unloading conveyor assembly in communication with a discharge of each storage silo for unloading the storage silos, the unloading conveyor being arranged to receive material being discharged simultaneously from more than one of the storage silos.

17. A collapsible storage system for flowable material comprising:
a base frame;
an upper frame supported above the base frame such that the upper frame is movable relative to the base frame between a collapsed position and a working position in which the upper frame is spaced upwardly in relation to the collapsed position;
at least one storage silo comprising:
a discharge mechanism supported on the base frame comprising a rigid wall extending downwardly from an upper perimeter edge to a bottom end locating at least one discharge opening therein; and
a tubular wall assembly extending from a bottom end connected to the upper perimeter edge of the discharge mechanism to a top end connected to the upper frame so as to be extendable in overall height relative to the base frame with the upper frame between said collapsed position and said working position, in which a hollow interior of said tubular wall assembly is in open communication with the discharge mechanism to define the storage silo in the working position thereof; and
a liquid storage vessel supported within a boundary volume defined by the upper frame and the lower frame and which is not occupied by said at least one storage silo.

18. A collapsible storage system for flowable material comprising:
a base frame;
an upper frame supported above the base frame such that the upper frame is movable relative to the base frame between a collapsed position and a working position in which the upper frame is spaced upwardly in relation to the collapsed position;
at least one storage silo comprising:
a discharge mechanism supported on the base frame comprising a rigid wall extending downwardly from an upper perimeter edge to a bottom end locating at least one discharge opening therein; and
a tubular wall assembly extending from a bottom end connected to the upper perimeter edge of the discharge mechanism to a top end connected to the upper frame so as to be extendable in overall height relative to the base frame with the upper frame between said collapsed position and said working position, in which a hollow interior of said tubular wall assembly is in open communication with the discharge mechanism to define the storage silo in the working position thereof;
wherein the tubular wall assembly comprises at least one section formed of a rigid tubular material and at least one section formed of a flexible tubular material, in which the sections are connected in, series with one another along a height of the tubular wall assembly.

19. The storage system according to claim 10 further comprising an unloading assembly comprising an unloading conveyor in association with each storage silo so as to be in alignment with the discharge opening of the associated storage silo, the unloading conveyors being arranged to discharge material laterally to one side of the base frame transversely to the longitudinal direction.

20. A collapsible storage system for flowable material comprising:
a base frame;
an upper frame supported above the base frame such that the upper frame is movable relative to the base frame between a collapsed position and a working position in which the upper frame is spaced upwardly in relation to the collapsed position; and
at least one storage silo comprising:
a discharge mechanism supported on the base frame comprising a rigid wall extending downwardly from an upper perimeter edge to a bottom end locating at least one discharge opening therein; and
a tubular wall assembly extending from a bottom end connected to the upper perimeter edge of the discharge mechanism to a top end connected to the upper frame so as to be extendable in overall height relative to the base frame with the upper frame between said collapsed position and said working position, in which a hollow interior of said tubular wall assembly is in open communication with the discharge mechanism to define the storage silo in the working position thereof:
wherein said at least one storage silo comprises a plurality of storage silos in a row extending in a longitudinal direction along the base frame, further comprising an unloading assembly comprising an unloading conveyor in association with each storage silo so as to be in alignment with the discharge opening of the associated storage silo, the unloading conveyors being arranged to discharge material laterally to one side of the base frame transversely to the longitudinal direction; and
wherein the unloading conveyors are pivotal between a lateral configuration discharging laterally to one side of the base frame and a longitudinal configuration in which the unloading conveyors communicate in series with one another in the longitudinal direction.

21. The storage system according to claim 1 wherein the tubular wall assembly of said at least one storage silo comprises a continuous liner membrane defining an inner surface of the tubular wall assembly and a second layer of reinforcing material having a higher tensile strength than the liner member surrounding the liner membrane between the top and bottom ends of the tubular wall assembly, the second layer of reinforcing material comprising a plurality of longitudinal straps spanning a height of the tubular wall assembly at circumferentially spaced apart positions and a plurality of circumferential straps connected to the longitudinal straps at different elevations, each longitudinal strap having a loop formed at a top end thereof that is selectively retained on a releasable pin that is releasably mounted on the upper frame to suspend the second layer from the upper frame.

22. The storage system according to claim 1 wherein the tubular wall assembly of said at least one storage silo comprises a continuous liner membrane defining an inner surface of the tubular wall assembly and a second layer of reinforcing material having a higher tensile strength than the liner member surrounding the liner membrane between the top and bottom ends of the tubular wall assembly, the second layer of reinforcing material comprising a plurality of longitudinal straps spanning a height of the tubular wall assembly at circumferentially spaced apart positions and a plurality of circumferential straps connected to the longitudinal straps at different elevations, each circumferential strap extending about a circumference of the tubular wall assembly between two opposing ends of the circumferential strap having loops formed therein respectively, the opposing ends of each circumferential strap being selectively coupled together by a releasable mechanical coupling.

23. The storage system according to claim 1 wherein the storage system further comprises an unloading conveyor assembly extending along the base frame in the longitudinal direction in communication with each of the storage silos, and wherein the unloading conveyor assembly comprises a main section spanning the longitudinal row of storage silos and a discharge section receiving material from the main section, the discharge section being movable between a working position protruding beyond one end of the base frame to an outlet end thereof and a transport position in which the discharge section is retracted inwardly into the base frame relative to the working position for transport.

24. The storage system according to claim 1 further comprising a plurality of telescopic support posts connected between the base frame and the upper frame and a plurality of intermediate frames at respective intermediate locations between the discharge mechanism of said at least one storage silo and the upper frame in the working position, each intermediate frame comprising a rigid support hoop extending about a circumference of the tubular wall assembly of said at least one storage silo in which the intermediate frames and each intermediate frame being vertically slidable relative to the telescopic support posts while being constrained relative to the base frame in the longitudinal direction and in a lateral direction perpendicularly to the longitudinal direction by the support posts.

25. The storage system according to claim 24 wherein each intermediate frame includes a plurality of channels formed thereon which receive respective ones of the telescopic support posts therein for relative vertical sliding movement.

\* \* \* \* \*